United States Patent
Dupuis et al.

(10) Patent No.: US 7,515,672 B2
(45) Date of Patent: *Apr. 7, 2009

(54) DIGITAL ACCESS ARRANGEMENT CIRCUITRY AND METHOD FOR CONNECTING TO PHONE LINES HAVING A DC HOLDING CIRCUIT WITH PROGRAMMABLE CURRENT LIMITING

(75) Inventors: Timothy J. Dupuis, Austin, TX (US);
George Tyson Tuttle, Austin, TX (US);
Jeffrey W. Scott, Austin, TX (US);
Navdeep S. Sooch, Austin, TX (US);
David R. Welland, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1260 days.

This patent is subject to a terminal disclaimer.

(21) Appl. No.: 10/679,013

(22) Filed: Oct. 3, 2003

(65) Prior Publication Data

US 2005/0100104 A1    May 12, 2005

Related U.S. Application Data

(63) Continuation of application No. 10/292,290, filed on Nov. 12, 2002, which is a continuation of application No. 09/098,489, filed on Jun. 16, 1998, now Pat. No. 6,498,825, which is a continuation-in-part of application No. 08/841,409, filed on Apr. 22, 1997, now Pat. No. 6,137,827, and a continuation-in-part of application No. 08/837,702, filed on Apr. 22, 1997, now Pat. No. 5,870,046, and a continuation-in-part of application No. 08/837,714, filed on Apr. 22, 1997, now Pat. No. 6,430,229, said application No. 09/098,489 is a continuation-in-part of application No. 09/034,687, filed on Mar. 4, 1998, now Pat. No. 6,359,983, and a continuation-in-part of application No. 09/034,456, filed on Mar. 4, 1998, now Pat. No. 6,144,326, and a continuation-in-part of application No. 09/034,455, filed on Mar. 4, 1998, now Pat. No. 6,480,602, and a continuation-in-part of application No. 09/035,779, filed on Mar. 4, 1998, now Pat. No. 6,389,134, and a continuation-in-part of application No. 09/034,683, filed on Mar. 4, 1998, now Pat. No. 6,167,134, and a continuation-in-part of application No. 09/034,620, filed on Mar. 4, 1998, now Pat. No. 6,160,885, and a continuation-in-part of application No. 09/034,682, filed on Mar. 4, 1998, now Pat. No. 6,408,034, and a continuation-in-part of application No. 09/035,175, filed on Mar. 4, 1998, now Pat. No. 6,385,235.

(51) Int. Cl.
*H04L 23/00* (2006.01)
(52) U.S. Cl. ............... 375/377; 375/257; 375/220; 375/285; 379/412; 379/90.01; 379/399.01
(58) Field of Classification Search ........ 375/257, 375/220, 377, 285; 379/350, 412, 90.01, 379/399.01
See application file for complete search history.

(56) References Cited

U.S. PATENT DOCUMENTS

| | | |
|---|---|---|
| 3,750,024 A | 7/1973 | Dunn et al. |
| 3,904,833 A | 9/1975 | Beene et al. |
| 3,981,006 A | 9/1976 | Takayama et al. |
| 4,053,720 A | 10/1977 | Wycheck |
| 4,054,941 A | 10/1977 | Shichman |
| 4,066,843 A | 1/1978 | Waks et al. |
| 4,118,603 A | 10/1978 | Kumhyr |
| 4,192,978 A | 3/1980 | Vincent |
| 4,224,478 A | 9/1980 | Fahey et al. |
| 4,292,595 A | 9/1981 | Smith |
| 4,349,821 A | 9/1982 | Vancsa |
| 4,384,274 A | 5/1983 | Mao |
| 4,393,516 A | 7/1983 | Itani |
| 4,415,777 A | 11/1983 | Agnew |
| 4,417,099 A | 11/1983 | Pierce |
| 4,465,903 A | 8/1984 | Barber |
| 4,475,208 A | 10/1984 | Ricketts |
| 4,528,664 A | 7/1985 | Cheng et al. |
| 4,529,845 A | 7/1985 | Boeckmann |
| 4,540,854 A | 9/1985 | Beirne |
| 4,541,104 A | 9/1985 | Hirosaki |

| | | | | | |
|---|---|---|---|---|---|
| 4,567,331 A | 1/1986 | Martin | 5,533,053 A | 7/1996 | Hershbarger |
| 4,594,577 A | 6/1986 | Mao | 5,544,241 A | 8/1996 | Dibner et al. |
| 4,607,170 A | 8/1986 | Wickman | 5,546,448 A | 8/1996 | Caswell et al. |
| 4,644,526 A | 2/1987 | Wu | 5,555,100 A | 9/1996 | Bloomfield et al. |
| 4,656,661 A | 4/1987 | Carbrey | 5,561,712 A | 10/1996 | Nishihara |
| 4,686,697 A | 8/1987 | Shapiro et al. | 5,577,104 A | 11/1996 | Knuth et al. |
| 4,686,699 A | 8/1987 | Wilkie | 5,592,529 A | 1/1997 | Linsker |
| 4,712,233 A | 12/1987 | Kuo | 5,598,157 A | 1/1997 | Kornblum et al. |
| 4,720,811 A | 1/1988 | Yamaguchi et al. | 5,600,551 A | 2/1997 | Luscher, Jr. |
| 4,741,031 A | 4/1988 | Grandstaff | 5,602,912 A | 2/1997 | Hershbarger |
| 4,757,528 A | 7/1988 | Falater et al. | 5,644,629 A | 7/1997 | Chow |
| 4,835,486 A | 5/1989 | Somerville | 5,654,984 A | 8/1997 | Hershbarger et al. |
| 4,843,339 A | 6/1989 | Burt et al. | 5,655,010 A | 8/1997 | Bingel |
| 4,864,605 A | 9/1989 | Ramsay et al. | 5,659,608 A | 8/1997 | Stiefel |
| 4,901,217 A | 2/1990 | Wilson | 5,675,640 A | 10/1997 | Tappert et al. |
| 4,901,275 A | 2/1990 | Hardie et al. | 5,692,041 A | 11/1997 | Torazzina |
| 4,943,807 A | 7/1990 | Early et al. | 5,694,465 A | 12/1997 | Apfel |
| 4,993,063 A | 2/1991 | Kiko | 5,705,978 A | 1/1998 | Frick et al. |
| 4,995,111 A | 2/1991 | Tojo et al. | 5,721,774 A | 2/1998 | Stiefel |
| 4,996,529 A | 2/1991 | Connell | 5,737,411 A | 4/1998 | Apfel et al. |
| 5,020,102 A | 5/1991 | Schorr | 5,740,241 A | 4/1998 | Koenig et al. |
| 5,021,950 A | 6/1991 | Nishikawa | 5,745,060 A | 4/1998 | McCartney et al. |
| 5,032,819 A | 7/1991 | Sakuragi | 5,751,803 A | 5/1998 | Shpater |
| 5,051,799 A | 9/1991 | Paul et al. | 5,790,656 A | 8/1998 | Rahamim et al. |
| 5,058,129 A | 10/1991 | Gupta et al. | RE35,901 E | 9/1998 | Wilkison et al. |
| 5,068,659 A | 11/1991 | Sakaguchi | 5,805,687 A | 9/1998 | Westergaard et al. |
| 5,086,454 A | 2/1992 | Hirzel | 5,818,923 A | 10/1998 | Consiglio et al. |
| 5,097,503 A | 3/1992 | Cotty | 5,841,840 A | 11/1998 | Smith et al. |
| 5,136,630 A | 8/1992 | Breneman et al. | 5,848,133 A | 12/1998 | Kuwahara et al. |
| 5,204,896 A | 4/1993 | Oliver | 5,859,584 A | 1/1999 | Counsell et al. |
| 5,224,154 A | 6/1993 | Aldridge et al. | 5,870,046 A | 2/1999 | Scott et al. |
| 5,235,634 A | 8/1993 | Oliver | 5,875,235 A | 2/1999 | Mohajeri |
| 5,237,511 A | 8/1993 | Caird et al. | 5,881,102 A | 3/1999 | Samson |
| 5,245,654 A | 9/1993 | Wilkison et al. | 5,881,129 A | 3/1999 | Chen et al. |
| 5,258,721 A | 11/1993 | Zanders | 5,883,907 A | 3/1999 | Hoekstra |
| 5,260,941 A | 11/1993 | Wilder et al. | 5,901,210 A | 5/1999 | Schley-May |
| 5,262,779 A | 11/1993 | Sauer | 5,907,596 A | 5/1999 | Karnowski |
| 5,287,107 A | 2/1994 | Gampell et al. | 5,912,513 A | 6/1999 | Hollenbach et al. |
| 5,311,588 A | 5/1994 | Polcyn et al. | 5,914,671 A | 6/1999 | Tuttle |
| 5,323,398 A | 6/1994 | Wake et al. | 5,917,364 A | 6/1999 | Nakamura |
| 5,323,451 A | 6/1994 | Yatsunami | 5,940,459 A | 8/1999 | Hsu et al. |
| 5,329,281 A | 7/1994 | Baumgartner et al. | 5,946,393 A | 8/1999 | Holcombe |
| 5,329,585 A | 7/1994 | Susak et al. | 5,959,372 A | 9/1999 | Every |
| 5,333,196 A | 7/1994 | Jakab | 5,974,139 A | 10/1999 | McNamara et al. |
| 5,337,338 A | 8/1994 | Sutton et al. | 5,982,317 A | 11/1999 | Steensgaard-Madsen |
| 5,343,514 A | 8/1994 | Snyder | 5,991,335 A | 11/1999 | Price |
| 5,343,516 A | 8/1994 | Callele et al. | 5,999,619 A | 12/1999 | Bingel |
| 5,355,407 A | 10/1994 | Lazik | 6,005,923 A | 12/1999 | Lee |
| 5,355,468 A | 10/1994 | Jeppesen, III et al. | 6,061,051 A | 5/2000 | Chan et al. |
| 5,361,067 A | 11/1994 | Pinckley | 6,072,778 A | 6/2000 | Labedz et al. |
| 5,361,296 A | 11/1994 | Reyes et al. | 6,081,586 A | 6/2000 | Rahamim et al. |
| 5,369,666 A | 11/1994 | Folwell et al. | 6,088,446 A | 7/2000 | Huang |
| 5,375,051 A | 12/1994 | Decker et al. | 6,091,806 A | 7/2000 | Rasmus et al. |
| 5,377,260 A | 12/1994 | Long | 6,107,948 A | 8/2000 | Scott et al. |
| 5,384,808 A | 1/1995 | Van Brunt et al. | 6,111,939 A | 8/2000 | Brabanec |
| 5,390,249 A | 2/1995 | Park | 6,124,756 A | 9/2000 | Yaklin et al. |
| 5,406,283 A | 4/1995 | Leung | 6,128,373 A | 10/2000 | Mathe et al. |
| 5,410,594 A | 4/1995 | Maruyama | 6,137,827 A | 10/2000 | Scott et al. |
| 5,426,698 A | 6/1995 | Reymond | 6,188,764 B1 | 2/2001 | Huang et al. |
| 5,428,682 A | 6/1995 | Apfel | 6,191,717 B1 | 2/2001 | Scott et al. |
| 5,438,678 A | 8/1995 | Smith | 6,201,865 B1 | 3/2001 | Dupuis et al. |
| 5,442,694 A | 8/1995 | Chitrapu et al. | 6,205,219 B1 | 3/2001 | Hollenbach et al. |
| 5,459,721 A | 10/1995 | Yoshida | 6,225,927 B1 | 5/2001 | Scott et al. |
| 5,465,298 A | 11/1995 | Wilkison et al. | 6,297,755 B2 | 10/2001 | Scott et al. |
| 5,467,385 A | 11/1995 | Reuben et al. | 6,430,229 B1 | 8/2002 | Scott et al. |
| 5,473,552 A | 12/1995 | Chen et al. | 6,498,825 B1 | 12/2002 | Dupuis et al. |
| 5,500,894 A * | 3/1996 | Hershbarger ............ 379/399.02 | 6,516,024 B1 | 2/2003 | Dupuis et al. |
| 5,500,895 A | 3/1996 | Yurgelites | 6,570,513 B2 | 5/2003 | Scott et al. |
| 5,506,900 A | 4/1996 | Fritz | 6,724,890 B1 | 4/2004 | Bareis |
| 5,506,903 A | 4/1996 | Yamashita | 6,973,183 B1 | 12/2005 | Garcia |
| 5,509,068 A | 4/1996 | Bayless et al. | | | |
| 5,511,118 A | 4/1996 | Gores et al. | | | |
| 5,521,967 A | 5/1996 | Novas et al. | | | |

| | | | |
|---|---|---|---|
| 2002/0030579 A1 | 3/2002 | Albert et al. | |

FOREIGN PATENT DOCUMENTS

JP          8-335994         12/1996

OTHER PUBLICATIONS

Boser et al., *The Design of Sigma-Delta Modulation Analog-to-Digital Converters*, IEEE J. Solid-State Circuits, vol. SC-23, pp. 1298-1308, Dec. 1988.

Candy, *A Use of Double Integration in Sigma Delta Modulation*, IEEE Trans. Commun., vol. COM-33, pp. 249-258, Mar. 1985.

Naus, et al., *A CMOS Stereo 16-bit D/A Converter for Digital Audio*, IEEE J. Solid-State Circuits, vol. SC-22, pp. 390-395, Jun. 1987.

Silicon Systems, *SSI 73D2950/2950T, Low Power FAX/Data Modem Chip Set Advance Information*, pp. 4-75-4-105, Dec. 1993.

Siemens, *"Ics For Communications" Analog Line Interface Solution ALIS*, PSB 4595 Version 2.0 and PSB 4596 Version 2.1 Product Overview 08.97, 19 pages (1997).

Krypton, "*K-930G Functional and Electrical Descriptions*", 10 pages (1997).

Lucent Technologies, *LUCL8576 Dual Subscriber Line Interface Circuit*, Advanced Data Sheet Issue 1.3, 16 pages, Jan. 8, 1997.

Information Sheet—Siemens, *DAA2000 Optical DAA Kit—Preliminary*, pp. 1-21; Jun. 13, 1997.

Siemens Press Release, *Siemens Pioneers Programmable Front End For Analog Modems Single Design For Worldwide Standards*, Aug. 6, 1997.

Information Sheet—Siemens, *ICs for Communications, ALIS Reference Board*, SIPB 4595 Version 1.0, Technical Description 06.97, Q67220-H1014, Jun. 1997.

Information Sheet—Siemens, *ICs for Communications, ALIS Evaluation Board*, SIPB 45900 Version 1.1, Technical Description 06.97, Q67220-H1047, Jun. 1997.

Information Sheet—Siemens, *ALIS—Development Tools Evaluation Board*, pp. 1-3, Jul. 21, 1997.

International Search Report (Dec. 21, 1998).

Crystal Semiconductor CS4303 (CDB4303) Datasheet "107db, D/A Converter for Digital Audio," pp. 2.3-2.29 (Aug. 1993).

Crystal Semiconductor CS5326 (CDB5326), CS 5327 (CDB5327), CS5328 (CDB5328), CS5329 (CDB5239), Datasheet, "16 and 18-Bit, Stereo A/D Converters for Digital Audio," pp. 3.5-3.37 (Mar. 1992).

Crystal Semiconductor CDB5345 Datasheet, "Evaluation Board for CS5345," pp. 3.73-3.99 (Aug. 1993).

Crystal Semiconductor CS8411, CS8412 Preliminary Product Information "Digital Audio Interface Receiver," pp. 6.35-6.67 (Nov. 1993).

Crystal Semiconductor (Division of Cirrus Logic) CS8401A, CS84102A Datasheet, "Digital Audio Interface Transmitter," pp. 6.3-6.33 (Nov. 1993).

Burr-Brown ISO122 Datasheet, "Precision Lowest Cost Isolation Amplifier," pp. 1-15 (Nov. 1993).

Burr-Brown Application Bulletin, "Single-Supply Operation of Isolation Amplifier," pp. 1-4 (Aug. 1991).

Burr-Brown Application Bulletin, "Boost ISO120 Bandwidth to More than 100kHz," pp. 1-3 (Sep. 1990).

Burr-Brown Application Bulletin, "Simple Output Filter Eliminates ISO AMP Output Ripple and Keep's Full Bandwidth," pp. 1-3 (Jan. 1991).

Burr-Brown Application Bulletin, "Very Low Cost Analog Isolation with Power," pp. 1-4 (Mar. 1991).

Burr-Brown Application Bulletin, "IC Building Blocks form Complete Isolated 4-20mA Current-Loop Systems," pp. 1-9 (Jun. 1992).

Burr-Brown Application Bulletin, "Single Supply 4-20mA Current Loop Receiver," pp. 1-2 (Jun. 1992).

Audio Codec '97 Component Specification Rev 1.03, pp. 1-50 (Sep. 15, 1996).

Crystal Semiconductor Corp., "A Family of AES-EBU Interface Devices," David Knapp et al., pp. 1-8.

Rockwell International Digital Communications Division, RC144Aci and RC144ACL Modem Designer's Guide (Preliminary), Order No. 876, Rev. 1, Nov. 1994.

Burr-Brown Application Bulletin "High-Voltage, Internally Powered Isolation Amplifier," pp. 1-7 (Oct. 1993).

Copending U.S. Appl. No. 10/292,290, filed Nov. 11, 2002, "Digital Access Arrangement Circuitry And Method For Connecting To Phone Lines Having A DC Holding Circuit With Switchable DC Termination Impedance".

Copending U.S. Patent Application, filed currently herewith, "Digital Access Arrangement Circuitry And Method For Connecting To Phone Lines Having A DC Holding Circuit With Switchable Time Constants".

\* cited by examiner

*Primary Examiner*—Mohammad H Ghayour
*Assistant Examiner*—Leila Malek
(74) *Attorney, Agent, or Firm*—O'Keefe, Egan, Peterman & Enders LLP

(57) ABSTRACT

A digital direct access arrangement (DAA) circuitry may be used to terminate the telephone connections at the user's end that provides a communication path for signals to and from the phone lines. Briefly described, the DAA provides a programmable circuit for the DC termination for a variety of international phone standards. The invention may also be utilized with circuitry for transmitting and receiving a signal across a capacitive isolation barrier. More particularly, a DC holding circuit is provided in which a programmable DC current limiting mode is available. In the current limiting mode, power may be dissipated in devices external to a DAA integrated circuit. Moreover, much of the power may be dissipated in external passive devices, such as resistors.

68 Claims, 23 Drawing Sheets

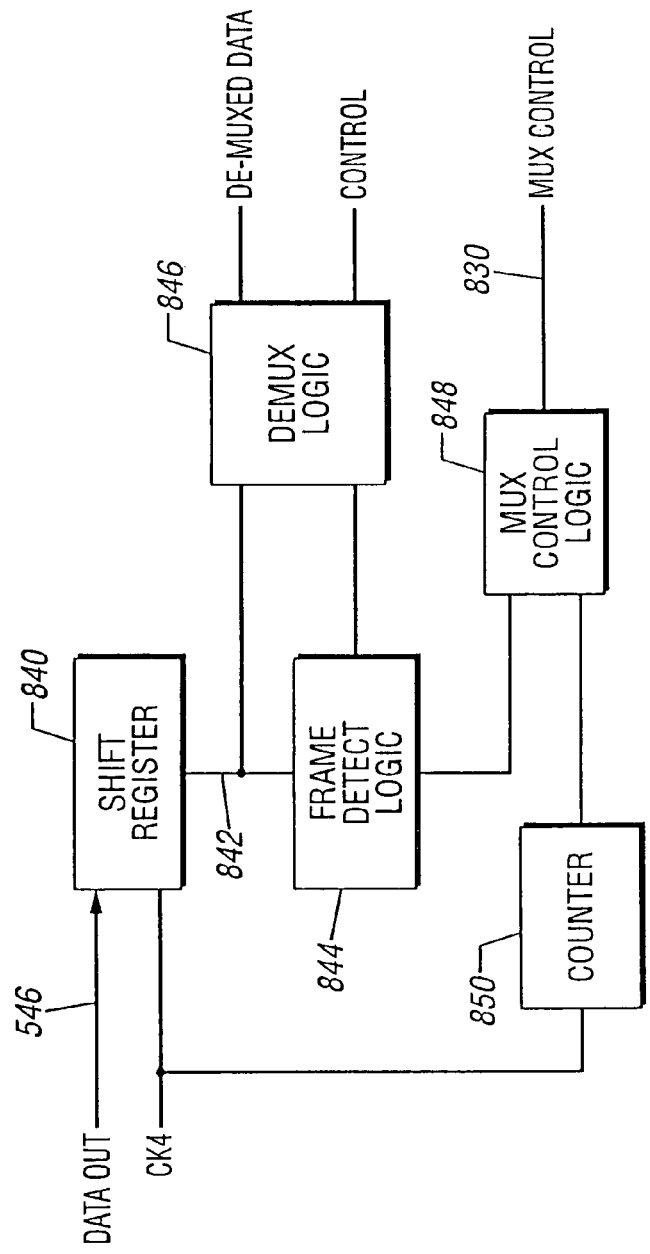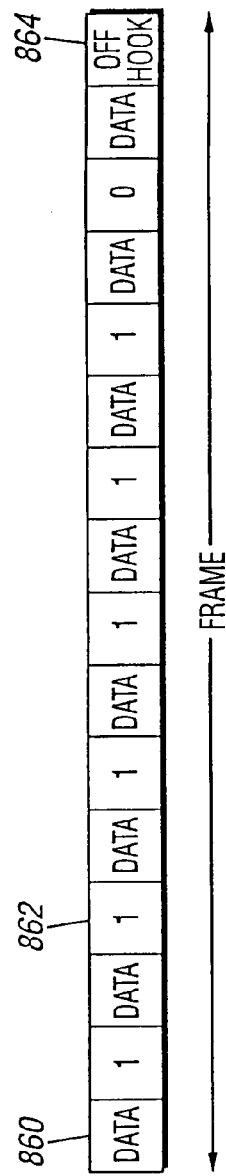

DIGITAL ACCESS ARRANGEMENT CIRCUITRY AND METHOD FOR CONNECTING TO PHONE LINES HAVING A DC HOLDING CIRCUIT WITH PROGRAMMABLE CURRENT LIMITING

This application is a continuation of U.S. Ser. No. 10/292,290, filed Nov. 12, 2002 entitled "Digital Access Arrangement Circuitry and Method for Connecting to Phone Lines Having a DC Holding Circuit with Switchable DC Termination Impedance" which is a continuation of U.S. Ser. No. 09/098,489, filed Jun. 16, 1998 now U.S. Pat. No. 6,498,825 entitled "Digital Access Arrangement Circuitry and Method for Connecting to Phone Lines Having a DC Holding Circuit with Programmable Current Limits" (now U.S. Pat No. 6,498,825) which is a continuation-in-part application of U.S. Ser. No. 08/841,409 (now U.S. Pat. No. 6,137,827), Ser. No. 08/837,702 (now U.S. Pat. No. 5,870,046) and Ser. No. 08/837,714 (now U.S. Pat. No. 6,430,229) all filed on Apr. 22, 1997, and the following U.S. patent applications filed on Mar. 4, 1998: Ser. No. 09/034,687, entitled "Digital Isolation System With Data Scrambling" by Andrew W. Krone et al (now U.S. Pat. No. 6,359,983); Ser. No. 09/034,456, entitled "Digital Isolation With ADC Offset Calibration; by, Andrew W. Krone et al. (now U.S. Pat. No. 6,144,326); Ser. No. 09/034,455, entitled "Ring-Detect Interface Circuitry and Method for a Communication System" by Timothy J. Dupuis et al. (now U.S. Pat. No. 6,480,602); Ser. No. 09/035,779, entitled "Call Progress Monitor Circuitry and Method for a Communication System" by Timothy J. Dupuis et al. (now U.S. Pat. No. 6,389,134); Ser. No. 09/034,683, entitled "External Resistor and Method to Minimize Power Dissipation in DC Holding Circuitry for a Communication System" by Jeffery W. Scott et al. (now U.S. Pat. No. 6,167,134); Ser. No. 09/034,620, entitled "Caller ID Circuit Powered Through Hookswitch Devices" by Jeffrey W. Scott et al (now U.S. Pat. No. 6,160,885); and Ser. No. 09/034,682, entitled "Framed Delta Sigma Data With Unlikely Delta Sigma Data Patterns" by Andrew W. Krone et al. (now U.S. Pat. No. 6,408,034); and Ser. No. 09/035,175, entitled "Direct Digital Access Arrangment Circuitry and Method For Connecting To Phone Lines" by Jeffery W. Scott, Navdeep S. Sooch and David R. Welland (now U.S. Pat. No. 6,385,235), all of which are expressly incorporated herein by reference.

TECHNICAL FIELD OF THE INVENTION

This invention relates to the field of digital access arrangement circuitry. More particularly, this invention relates to digital access arrangement circuitry for connecting to a variety of phone line standards. The digital access arrangement circuitry may further include isolation barrier utilizing a capacitor coupled isolation barrier.

BACKGROUND

Direct Access Arrangement (DAA) circuitry may be used to terminate the telephone connections at a phone line user's end to provide a communication path for signals to and from the phone lines. DAA circuitry includes the necessary circuitry to terminate the telephone connections at the user's end and may include, for example, an isolation barrier, DC termination circuitry, AC termination circuitry, ring detection circuitry, and processing circuitry that provides a communication path for signals to and from the phone lines.

Generally, governmental regulations specify the telephone interface requirements and specifications for a variety of parameters including AC termination, DC termination, ringer impedance, ringer threshold, etc. For example, Federal Communications Commission (FCC) Part 68 governs the interface requirements for telephones in the United States. However, the interface requirements world wide are not standardized, and thus, in countries other than the United States the applicable standards may include the TBR21, NET4, JATE, and various country specific PTT specifications. Because the interface requirements are not standardized from country to country, often different DAA circuitry is required for use in each country in order to comply with the appropriate standard. The requirement for different DAA circuitry, however, limits the use of one phone line interface in a variety of countries. Thus, for example, a modem in a laptop computer configured for interfacing with a phone line in one country may not necessarily operate properly in another country. Further, the requirement for different DAA circuitry in various countries hinders the design of a single integrated cost effective DAA solution for use world wide.

As mentioned above, the telephone interface requirements generally include specifications for DC termination of the telephone line. For example, the DC impedance that the DAA circuitry presents to the telephone line (typically $\leq 300\Omega$) may be required by regulations to be less than the AC impedance that the DAA circuitry presents to the telephone line (typically $\approx 600\Omega$). Consequently, inductive behavior is required from the section of the DAA circuitry that sinks DC loop current, which is typically called the DC termination or DC holding circuitry. This inductive behavior of the DC holding circuitry should provide both high impedance and low distortion for voiceband signals. The DC termination specifications may also include limits for the maximum current and power dissipation. For example, the TBR-21 specification requires the DC holding circuit to limit DC current to less than 60 mA with a maximum power dissipation of approximately 2 watts.

Prior techniques for implementing DC holding circuitry have included bipolar transistor (e.g., PNP transistor) implementations. These prior techniques, however, have suffered from various disadvantages. For example, although bipolar transistor implementations typically present a desired high impedance (e.g., $>>600\Omega$) to the telephone network for voiceband signals, such implementations are limited. In contrast, a CMOS design would be preferable because CMOS technology allows a high level of integration, for example with other phone line interface functions. CMOS implementations on CMOS integrated circuits, however, may face considerable problems in dissipating the power consumed by the DC holding circuitry. The design of a DC holding circuit for use with multiple standards may be further complicated in that the various international specifications may conflict with regards to off-hook settling times and pulse dialing templates (which may require fast settling time constants) and high speed interface designs (such as for use in modems) which require very low frequency operation (i.e. approximately as low as 10 Hz). Furthermore, it is desirable to implement such DC holding circuits in a manner that does not cause excessive distortion at low and high frequencies.

It is also desirable that the DAA circuitry act as an isolation barrier since an electrical isolation barrier must exist in communication circuitry which connects directly to the standard two-wire public switched telephone network and that is powered through a standard residential wall outlet. Specifically, in order to achieve regulatory compliance with Federal Communications Commission Part 68, which governs electrical connections to the telephone network in order to prevent network harm, an isolation barrier capable of withstanding 1000 volts rms at 60 Hz with no more than 10 milliamps current flow, must exist between circuitry directly connected to the two wire telephone network and circuitry directly connected to the residential wall outlet.

There exists a need for reliable, accurate and inexpensive DAA circuitry for effecting the DC termination characteristics for multiple phone line standards and a DAA circuitry which also provides the necessary electrical isolation barrier.

SUMMARY OF THE INVENTION

The above-referenced problems are addressed by the present invention, which provides a reliable, inexpensive, DAA circuit that may be utilized with multiple telephone interface standards and which also provides an isolation system that is substantially immune to noise that affects the timing and/or amplitude of the signal that is transmitted across the isolating element, thus permitting an input signal to be accurately reproduced at the output of the isolation system.

The present invention provides digital direct access arrangement (DAA) circuitry that may be used to terminate the telephone connections at the user's end to provide a communication path for signals to and from the phone lines. Briefly described, the invention provides a means for providing DC termination for a variety of international phone standards. The invention may also be utilized with means for transmitting and receiving a signal across a capacitive isolation barrier. More particularly, a DC holding circuit is provided in which a programmable DC current limiting mode is available. In the current limiting mode, power may be dissipated in devices external to a DAA integrated circuit. Moreover, much of the power may be dissipated in external passive devices, such as resistors In one embodiment, a communication system, comprising phone line side circuitry that may be coupled to phone lines and powered side circuitry that may be coupled to the phone line side circuitry through an isolation barrier is provided. The system may further include a DC holding circuit within the phone line side circuitry, the DC holding circuit being programmable in response to data transmitted across the isolation barrier to operate the DC holding circuit in a plurality of modes. The DC holding circuit may be operable in at least a first mode to meet a first phone line interface standard and a second mode to meet a second phone line interface standard, the second phone line interface standard having a DC current limit requirement.

In another embodiment, a method of providing a communication system that may be coupled to a phone line is provided. The method may include coupling an isolation barrier between powered circuitry and phone line side circuitry and forming a DC holding circuit within the phone line side circuitry, the DC holding circuit comprising a phone line side integrated circuit and external circuitry external to the integrated circuit. The method may further comprise providing a programmable circuit for switching the DC holding circuit between at least a first and second mode of operation, the first mode of operation for at least a first phone line interface standard and the second mode of operation for at least a second phone line interface standard, the second standard having a DC termination current limit. The method may further include coupling the internal circuitry and external circuitry so that if the DC holding circuit is operated in the second mode of operation more power may be dissipated in the external circuitry during the second mode of operation than during the first mode of operation.

In yet another embodiment, a DC holding circuit for reducing power dissipation requirements of an integrated circuit a communication system that may be connected to phone lines is provided. The DC holding circuit may include at least one switchable circuit, the switchable circuit having a first state for a non-current limiting mode of operation and a second state for a current limiting mode of operation; external circuitry external to the integrated circuit; and internal circuitry within the integrated circuit, the external circuitry and the internal circuitry being coupled together wherein the external circuitry dissipates more power in the current limiting mode than in the non-current limiting mode.

In yet another embodiment, a method of providing a DC holding circuit is provided. The method may include forming the DC holding circuit with internal circuitry internal to an integrated circuit and external circuitry external to the integrated circuit. The method may further include providing a programmable circuit for switching the DC holding circuit between at least a first and second mode of operation, the first mode of operation for at least a first phone line interface standard and the second mode of operation for at least a second phone line interface standard, the second standard having a DC termination current limit. The method may further include coupling the internal circuitry and external circuitry so that if the DC holding circuit is operated in the second mode of operation more power may be dissipated in the external circuitry during the first mode of operation than during the second mode of operation.

In another embodiment a method of forming a DC holding circuit is provided. The method may include providing integrated circuitry and non-integrated circuitry to comprise the DC holding circuit, the DC holding circuit capable of meeting at least at least a first and second phone line interface standards, the at least two phone line interface standards having differing current limit specifications, the second standard limiting DC current to a lower amount than the first standard. The method may further comprise utilizing at least one switchable circuit so that the DC holding circuit may be programmed for at least one of the phone line interface standards, and coupling the integrated circuitry and the non-integrated circuitry together so that when the DC holding circuit is programmed for the second phone line interface standard, at least one circuit element of the external circuitry will receive additional DC current as compared to when the DC holding circuit is programmed for the first phone line interface standard.

In an alternative embodiment, there is provided a DC holding circuit compatible with a phone line standard having current limit requirements for reducing power dissipation requirements of an integrated circuit within a communication system that may be connected to phone lines. The DC holding circuit may comprise external circuitry external to the integrated circuit and internal circuitry within the integrated circuit, the external circuitry and the internal circuitry being coupled together wherein the external circuitry dissipates more power in at least one mode of operation.

Another embodiment provides a DC holding circuit. The method includes forming the DC holding circuit with internal circuitry internal to an integrated circuit and external circuitry external to the integrated circuit, the DC holding circuit compatible with at least one phone line interface standard having a DC current limit requirement. The method may further include coupling the internal circuitry and external circuitry so that more power may be dissipated in the external circuitry than in the internal circuitry.

A method of operating a DC holding circuit is provided. The method includes providing integrated circuitry and non-integrated circuitry to comprise the DC holding circuit, coupling the integrated circuitry and the non-integrated circuitry, and dissipating more power in the external circuitry than in the internal circuitry if the DC holding circuit is utilized for a phone line interface standard having a DC current limit requirement.

DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

FIG. 11 is a block diagram of a decoder circuit that may be utilized in a preferred embodiment of the present invention.

FIG. 12 is an illustration representing a framing format that may be beneficially used in preferred embodiments of the present invention.

DESCRIPTION OF PREFERRED EMBODIMENTS

Figure 1:
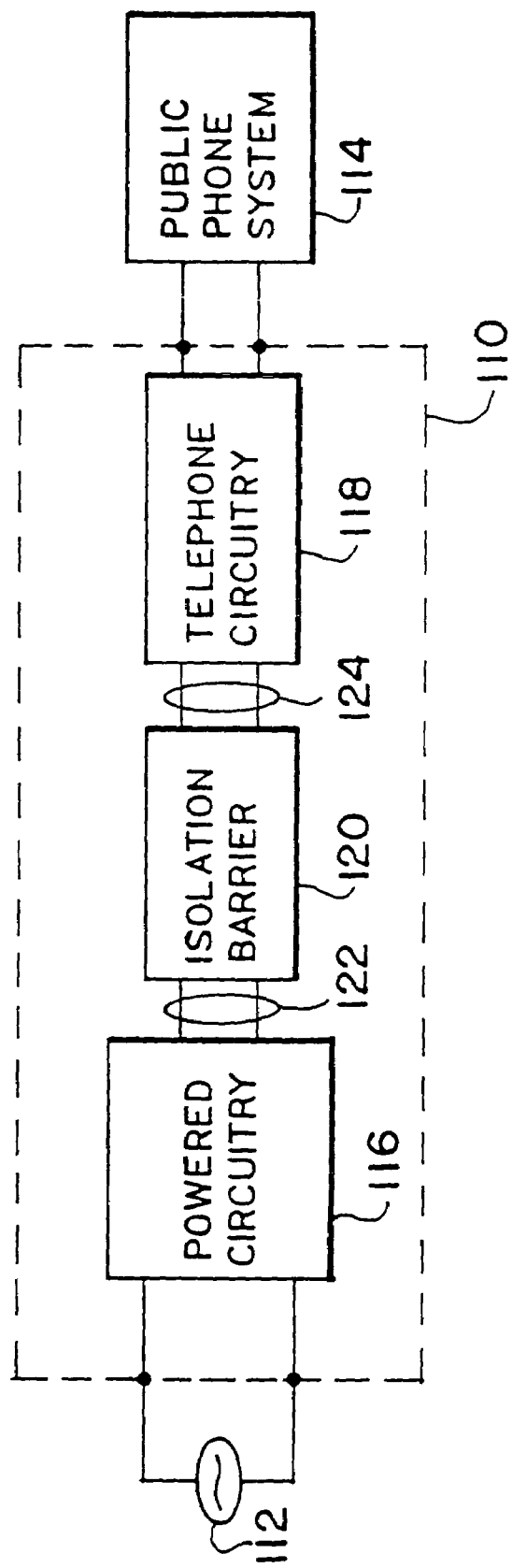
FIG. 1 is a block diagram of a telephone set illustrating a typical application of the present invention.

In order to provide a context for understanding this description, FIG. 1 illustrates a typical application for the present invention: a telephone that includes circuitry powered by a source external to the phone system. A basic telephone circuit 118 is powered by the "battery" voltage that is provided by the public telephone system and does not have a separate power connection. Many modern phones 110, however, include radio (cordless), speakerphone, or answering machine features that require an external source of power 112, typically obtained by plugging the phone (or a power supply transformer/rectifier) into a typical 110-volt residential wall outlet. In order to protect public phone system 114 (and to comply with governmental regulations), it is necessary to isolate "powered circuitry" 116 that is externally powered from "isolated circuitry" 118 that is connected to the phone lines, to prevent dangerous or destructive voltage or current levels from entering the phone system. (Similar considerations exist in many other applications as well, including communication, medical and instrumentation applications in which this invention may be beneficially applied.) The required isolation is provided by isolation barrier 120. The signal that passes through the isolation barrier 120 is an analog voice signal in a typical telephone application, but it may also be a digital signal or a multiplexed signal with both analog and digital components in various applications. In some applications, communication across isolation barrier 120 may be unidirectional (in either direction), but in many applications, including telephony, bidirectional communication is required. Bidirectional communication may be provided using a pair of unidirectional isolator channels, or by forming a single isolation channel and multiplexing bidirectional signals through the channel. The primary requirements placed on isolation barrier 120 are that it effectively prevents harmful levels of electrical power from passing across it, while accurately passing the desired signal from the powered side 122 to the isolated side 124, or in the reverse direction if desired.

Figure 2:
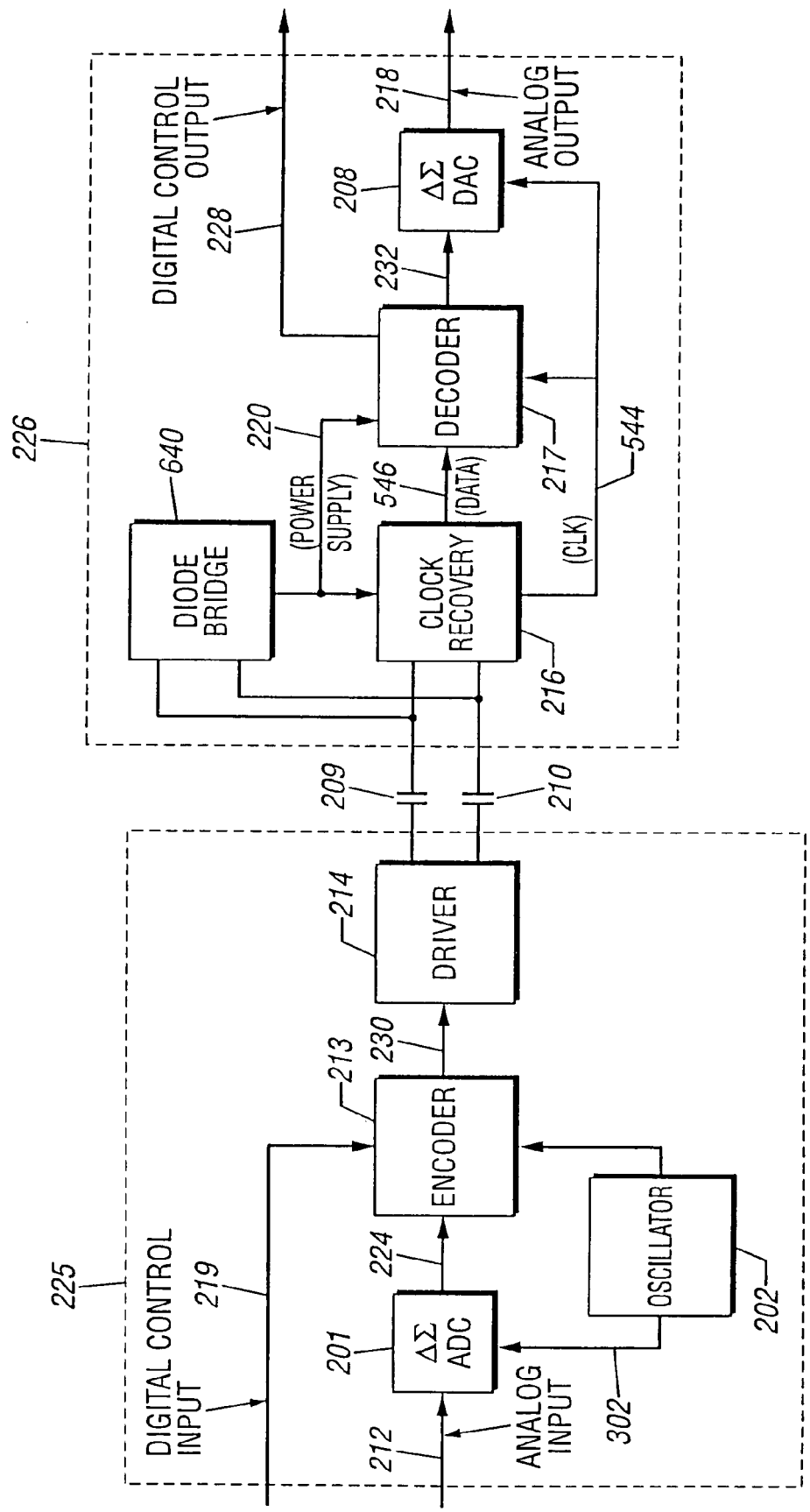
FIG. 2 is a block diagram showing a unidirectional isolation system according to the present invention.

FIG. 2 illustrates a basic block diagram of a preferred embodiment of the present invention. First the overall operation of the invention will be described, and then each component will be described in detail to the extent required to enable a person skilled in the art to make and use the invention. As a matter of terminology, the circuitry shown on the left or powered side of the isolation barrier (capacitors 209 and 210 in FIG. 2) will be referred to as the "powered" circuitry or the "transmit" circuitry or system, and the circuitry on the right side of the isolation barrier will be referred to as the "isolated" or "receive" circuitry or system. The "transmit" side can ordinarily be identified by the location of the dominant master oscillator 202 on that side of the barrier, and the slave oscillator (e.g. clock recovery circuit 216) is located on the receive side. Note, however, that in some embodiments of the present invention signals may be transmitted from the receive system to the transmit system, so these terms do not necessarily indicate the direction of data flow across the barrier. Furthermore, in some embodiments the master oscillator may be on the low-power (e.g. telephone system) side of the barrier, and a clock recovery PLL may be located on the high-power side of the barrier.

Referring to FIG. 2, a preferred unidirectional capacitive isolation system according to the present invention includes a delta-sigma analog to digital converter 201 operable on the analog input 212 and driven by a clock signal from oscillator 202. The digital output of the delta-sigma ADC 224 is synchronous with the operating frequency of oscillator 202 and time division multiplexed with digital control signals 219 by encoder circuit 213. The encoder circuit 213 also formats the resulting digital data stream 230 into a coding scheme or framing format that allows for robust clock recovery on the receiving side of the isolation barrier. The isolation barrier comprises two high voltage capacitors 209 and 210. In one embodiment of the present invention, driver circuit 214 drives the transmit side of capacitor 209 with a digital voltage signal. Clock recovery circuit 216 presents a very high impedance to the receive side of capacitor 209, allowing the digital voltage output of driver 214 to couple across the isolation barrier. In this embodiment, capacitor 210 provides a return current path across the barrier. In another embodiment, capacitors 209, 210 are differentially driven by complementary digital outputs of driver circuit 214. In that embodiment, clock recovery circuit 216 presents a very high impedance to the receive sides of capacitors 209 and 210, allowing the differential digital voltage outputs of driver 214 to couple across the isolation barrier. The input to driver circuit 214 is the output 230 of encoder 213.

The receive side of the isolation barrier includes clock recovery circuit 216, with inputs connected to isolation capacitors 209 and 210. The clock recovery circuit recovers a clock signal from the digital data driven across the isolation barrier. The recovered clock provides clocking signals for decoder 217 and delta-sigma digital-to-analog converter 208. Decoder circuit 217 separates the time division multiplexed data signal from control signals, providing a digital control output 228 and data output 232 that is routed to delta-sigma DAC 208. The delta-sigma DAC 208, with digital input supplied from decoder 217 and clock supplied from clock recovery circuit 216, provides the analog output of the receive side of the isolation system, which closely corresponds to the original analog input 212.

Active diode bridge circuit 640 may also be connected to isolation capacitors 209 and 210 to provide a DC voltage source 220 to clock recovery circuit 216 and decoder circuit 217 derived from energy contained in the signal transmitted across the isolation barrier.

In the descriptions of preferred embodiments that follow, all circuit references are made with respect to MOS (metal oxide-semiconductor) integrated circuit technology, although the invention may be implemented in other technologies as well, as will be understood by one skilled in the art. A preferred embodiment incorporates transmit system 225 consisting of delta-sigma ADC 201, oscillator 202, encoder 213 and driver 214 fabricated on one silicon substrate, and receive system 226 consisting of clock recovery circuit 216, decoder 217, delta-sigma DAC 208 and active diode bridge 640 fabricated on a second silicon substrate. The two separate silicon substrates are required to maintain the high voltage isolation provided by capacitors 209 and 210, since typical MOS technologies cannot provide high voltage isolation of 1000 volts or greater.

The delta-sigma analog-to-digital converter, shown as block 201 of FIG. 2, is well known in the art. See, for example, J. C. Candy, *A Use of Double Integration in Sigma Delta Modulation*, IEEE Trans. On Communication, March 1985, pp. 249-258, and B. E. Boser and B. A. Wooley, *The Design of Sigma-Delta Modulation Analog-to-Digital Converters*, IEEE Journal Solid State Circuits, December 1988, PP. 1298-1308, both of which are incorporated herein by reference. The specific design of ADC 201 will be a matter of design choice depending upon the needs of the particular application in which the isolation barrier will be used.

The use of a delta-sigma converter within the isolation system provides several desirable features. It will be appreciated that the delta-sigma converter uses a high oversampling rate to provide accurate A/D conversion over the input signal bandwidth without the use of precisely matched components or high-order, analog anti-aliasing filters. Moreover, such converters occupy a relatively small amount of space on an integrated circuit and are relatively easy to fabricate on a CMOS chip.

The digital pulse stream 224 output from delta-sigma converter 201 encodes the analog input signal 212 in a pulse density modulation format. In pulse density modulation, the amplitude information of the analog input signal is contained in the density of output pulses generated during a given interval of time.

Figure 3A:
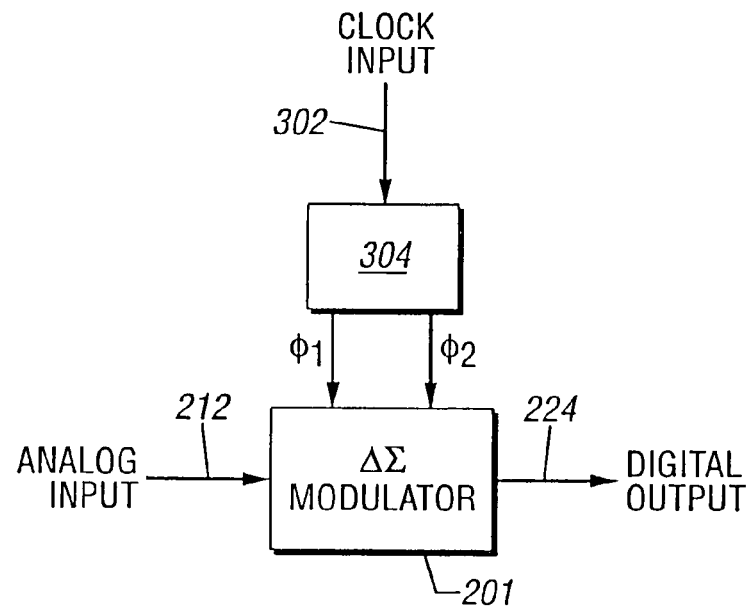
FIG. 3A is a block diagram detailing the circuitry used to provide a two-phase, non-overlapping clock signal to the delta-sigma modulators that are used in preferred embodiments of this invention.

Suitable designs for oscillator circuit 202 are well known in the art and may typically comprise a ring oscillator, relaxation oscillator, or an oscillator based on a piezo-electric crystal disposed external to the integrated MOS circuit. See, for example, A. B. Grebene, *Bipolar and MOS Analog Integrated Circuit Design*, John Wiley and Sons, 1984, which is incorporated herein by reference. FIG. 3A further illustrates the clock signals that may be provided to delta-sigma converter 201 in a preferred embodiment of this invention. Clock signal 302 from oscillator 202 is input to clock divider circuit 304 that divides the frequency of the input clock and provides an output in the form of two phase, non-overlapping clock signals $\emptyset_1$ and $\emptyset_2$ to the delta-sigma modulator circuit. The design and construction of clock divider circuit 304 is within the ordinary skill in the art and is not detailed here. Since encoder circuit 213 may perform time-division multiplexing of the digitized data signal 224 with digital control input data 219 using a time base derived from oscillator 202, clock divider 304 of FIG. 3A must typically divide the frequency of oscillator 202 by at least a factor of two.

Figure 3B:
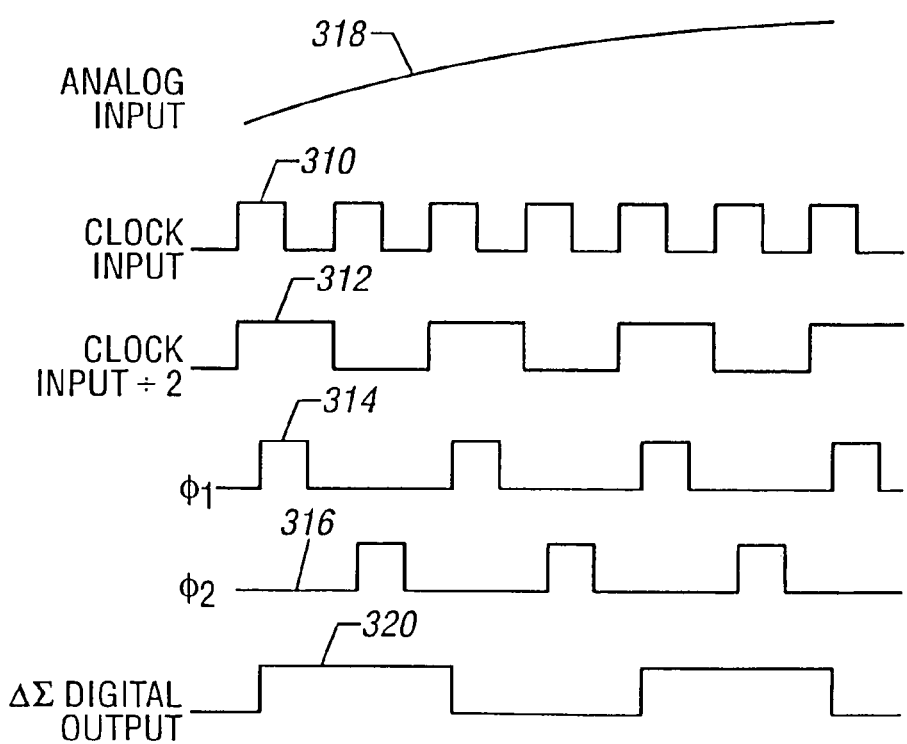
FIG. 3B is a timing diagram that illustrates timing relationships between various clock and data signals that occur in the circuitry of the present invention.

FIG. 3B illustrates exemplary signals associated with clock divider circuit 304 and delta-sigma modulator 201 in FIG. 3A. Trace 310 is the clock signal received from oscillator 202 on line 302. Trace 312 is the "clock divided by 2" signal that is generated by clock divider circuit 304. Traces 314 and 316 illustrate exemplary two phase, non-overlapping clock signals $\emptyset_1$ and $\emptyset_2$, respectively, that may be output from clock divider circuit 304 to delta-sigma modulator 201. Trace 318 represents the analog input to ADC 201, which generally changes very slowly in comparison to the frequency of clock signal 310. This bandwidth relationship is required because the delta-sigma modulator must operate at a sampling rate much higher than a typical Nyquist rate (for example, a 1 MHz sampling rate for a 4 kHz voiceband signal is typical) in order for the information in the analog signal to be accurately represented by the single-bit binary output. Finally, trace 320 represents the digital output of delta-sigma modulator 201, which may, for example, be synchronized to the rising edge of clock signal $\varnothing_1$. (The illustrated output bit pattern 320 is provided to show exemplary timing relationships and does not attempt to accurately reflect the illustrated analog input 318).

Figure 4A:
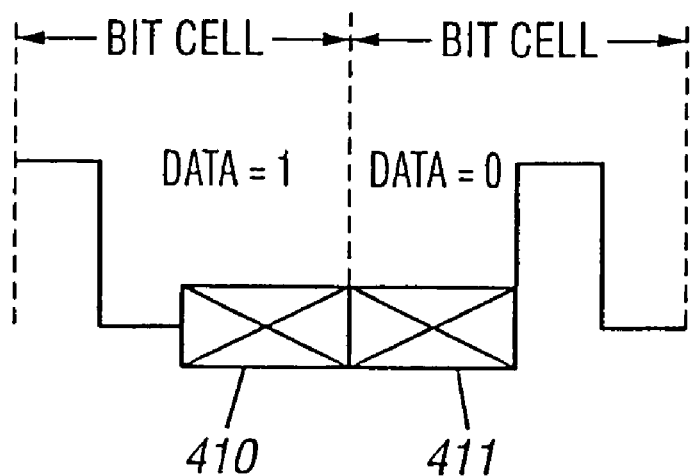
FIGS. 4A and 4B are diagrams that illustrate signal formats that may be produced by the encoders used in this invention.

Referring to FIG. 2, the encoder circuit 213 performs two primary functions in preferred embodiments of this invention. The first function of encoder 213 is time-division multiplexing of control signals 219 from other circuitry and data signals 224 from the delta-sigma modulator 201, an operation that is well known in the art and subject to many suitable implementations. The multiplexing function is synchronized by clock signals from oscillator 202. The second function of encoder 213 is formatting the data for transmission across isolation capacitors 209, 210. FIG. 4 details one coding scheme that may be used to transmit digital pulses across the capacitive isolation barrier. (Another suitable coding scheme is described below with reference to FIG. 14.) FIG. 4A shows the format for data sent from the transmit circuit to the receive circuit. When data=1 for a given bit cell, the output of the encoder is high for the first quarter of the bit cell period. When data=0 for a given bit cell, the output of the encoder is high for the third quarter of the bit cell period. This coding scheme guarantees one low-to-high transition followed by one high-to-low transition for every bit cell period, independent of the data pattern. The resulting data independent transition density allows for robust clock recovery in the receiving circuitry on the other side of isolation capacitors 209, 210. Alternatively, robust clock recovery can also be achieved by use of a preamble used for frequency locking followed by a data pattern which is not of constant average frequency.

In a bidirectional system, as is described below in connection with FIG. 7, the transmit system encoder 702 and driver 703 may cooperate to provide a high-impedance tri-state output to the isolation capacitor 705 during either the last half of the bit cell period 410 (if transmit data=1) or the first half of the bit cell period 411 (if transmit data=0) as shown in FIG. 4A. This permits transmission of information from the receive system to the transmit system during that portion of each bit cell when the transmit driver 703 is tri-stated.

Figure 4B:
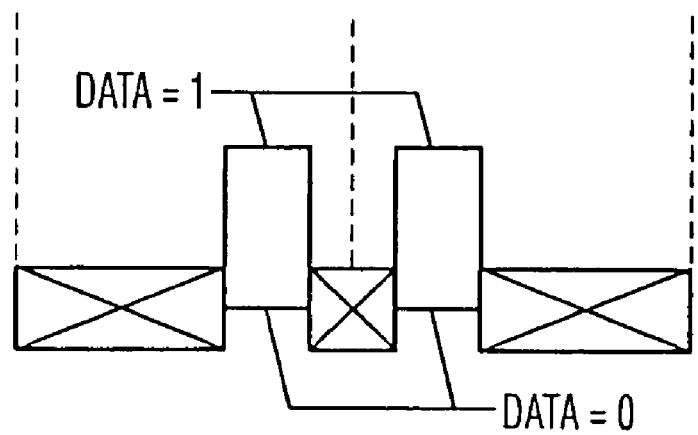

In a preferred embodiment, at the beginning of each bit cell period the receive system decoder section 708 detects whether the transmit circuit has sent a data=1 pulse across the isolation barrier. If a transmit data=1 pulse was sent, the receive driver remains tri-stated until the second half of the bit cell period, during which time a receive data=0 or 1 pulse can be sent back across the isolation barrier to the transmit system. If a transmit data=1 pulse is not detected by the receive circuit the receive driver sends receive data=0 or 1 during the first half of the bit cell period and tri-states for the second half of the bit cell period. This operation is shown in FIG. 4B.

In those embodiments in which the digital, bidirectional communication is differential, capacitors 705 and 706 are driven by complementary digital voltages in both directions, and the driver circuits associated with both capacitors are tri-stated during selected portions of the bit cell period in accordance with the coding scheme shown in FIG. 4.

Figure 13B:
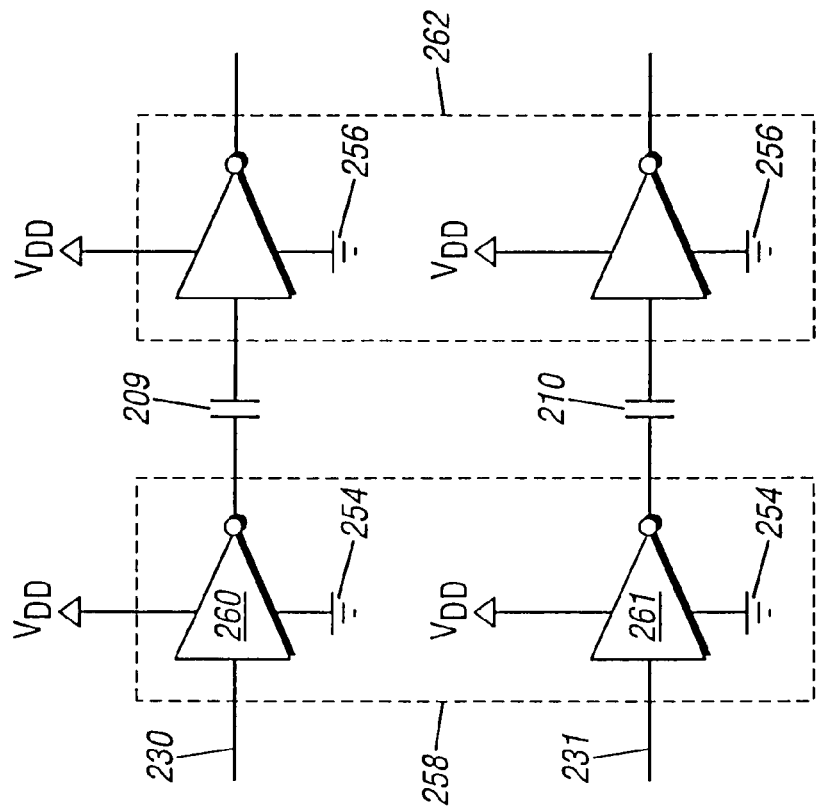
FIGS. 13A and 13B are schematic diagrams of driver circuits that may be utilized to implement the present invention.
Figure 13A:
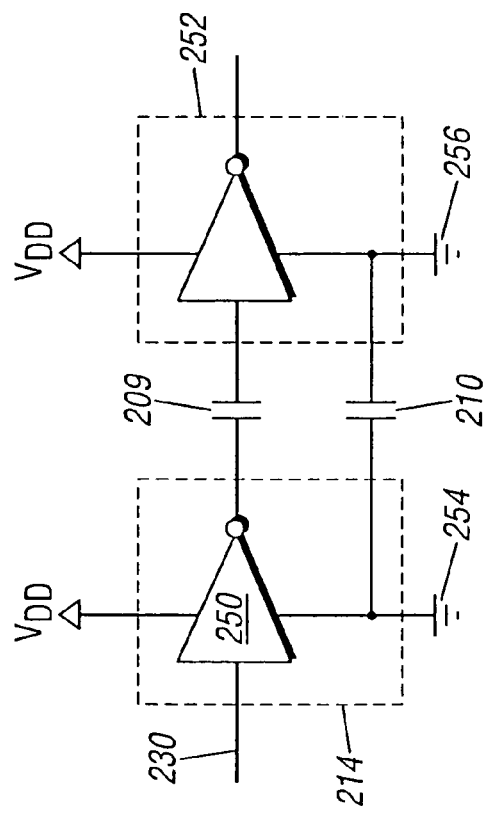

A preferred embodiment of the unidirectional driver circuit 214 of FIG. 2 is detailed in FIG. 13A for single ended (not differential) communication and FIG. 13B for differential communication across the capacitive isolation barrier. Referring to FIG. 13A, the transmit circuit driver 214 may comprise an inverter 250 driven by the encoder output signal 230. The output of inverter 250 drives the transmit circuit side of isolation capacitor 209 to transmit logic levels defined by the transmit $V_{DD}$ and ground voltage levels. The clock recovery input buffer presents a high impedance to the receive side of capacitor 209, thereby allowing the receive side of capacitor 209 to attain substantially the same logic levels as the transmit side of capacitor 209. In this manner the digital logic signal is effectively coupled across the capacitive isolation barrier.

Capacitor 210 is disposed between the transmit circuit ground node 254 and receive circuit ground node 256 in order to form a ground current return path across the isolation barrier. This path is required because the clock recovery buffer input impedance, although high, is not infinite. Therefore a small current must flow across the barrier and back in order to couple the digital logic signal across the barrier. Furthermore, capacitor 209 must deliver charge to the active diode circuit 640 (FIG. 2) in order that a supply voltage for several receive circuit sections can be provided. The current associated with this transfer of charge from the transmit circuit to the receive circuit must have a path to return to the transmit circuit.

The single-ended communication system described above is insensitive to voltage signals that may exist between the transmit circuit ground 254 and receive circuit ground 256 provided that the rate of change of such voltage signals is substantially less than the frequency of the digital signal transmitted across the barrier. The single-ended method is also insensitive to resistive and capacitive impedances that may exist between the transmit circuit ground 254 and receive circuit ground 256. The system can be desensitized to inductive impedances that may exist between the transmit circuit ground 254 and receive circuit ground 256 by adding resistive elements in series with capacitor 210, in series with the transmit ground connection 254, in series with the receive ground connection 256, or any combination of these.

FIG. 13B shows an example of a suitable differential driver 258 for unidirectional digital communication across a capacitive isolation barrier. The inverter 260 that drives capacitor 209 is driven by the digital signal output from the transmit encoder circuit 213, while inverter 261, which drives capacitor 210, is driven by the complement 231 of the digital signal output from transmit encoder circuit 213. Clock recovery input buffer 262 presents high impedances to the receive sides of capacitors 209 and 210, allowing the differential digital transmit voltages to couple across the isolation barrier. In this differential communication method, both capacitors 209 and 210 provide return current paths across the isolation barrier. The differential digital communication system described above is largely insensitive to voltage signals and impedances that may exist between the transmit circuit ground 254 and receive circuit ground 256, since these voltages and impedances appear as common mode influences in differential communication.

Bidirectional communication across the barrier can be supported by additional driver and receive buffer structures, similar to those shown in FIG. 13, without the need for any additional isolation elements, providing that inverters 250, 260, 261, which drive the high voltage isolation capacitors, can be tri-stated generally in accordance with the timing diagram shown in FIG. 4 or any other suitable coding and timing scheme. In some embodiments, additional capacitor driving inverters that can be tri-stated may be provided in a receive-side driver circuit 713 (FIG. 7) and input buffers may be provided in a transmit side decoder circuit 714.

In presently preferred embodiments, the actual isolation barrier comprises a pair of isolation capacitors 209 and 210, which are high voltage capacitors that may be chosen for a particular application to prevent DC and low frequency current flow across the barrier and protect the isolated circuitry from high voltage faults and transients, while permitting data at selected transmission frequencies to cross the barrier. The capacitors must be capable of withstanding anticipated voltages that may appear due to faults in the powered circuitry 225, in order to provide the protective function that is the purpose of the barrier. For example, in preferred embodiments ordinary 2000 volt capacitors with capacitance on the order of 100 pF may be utilized in the isolation barrier. In a barrier system in accordance with the present invention it is not necessary to use high precision capacitors, because the system is very tolerant of variations in capacitor performance due to environmental influences, such as variations in voltage and temperature.

Figure 5:
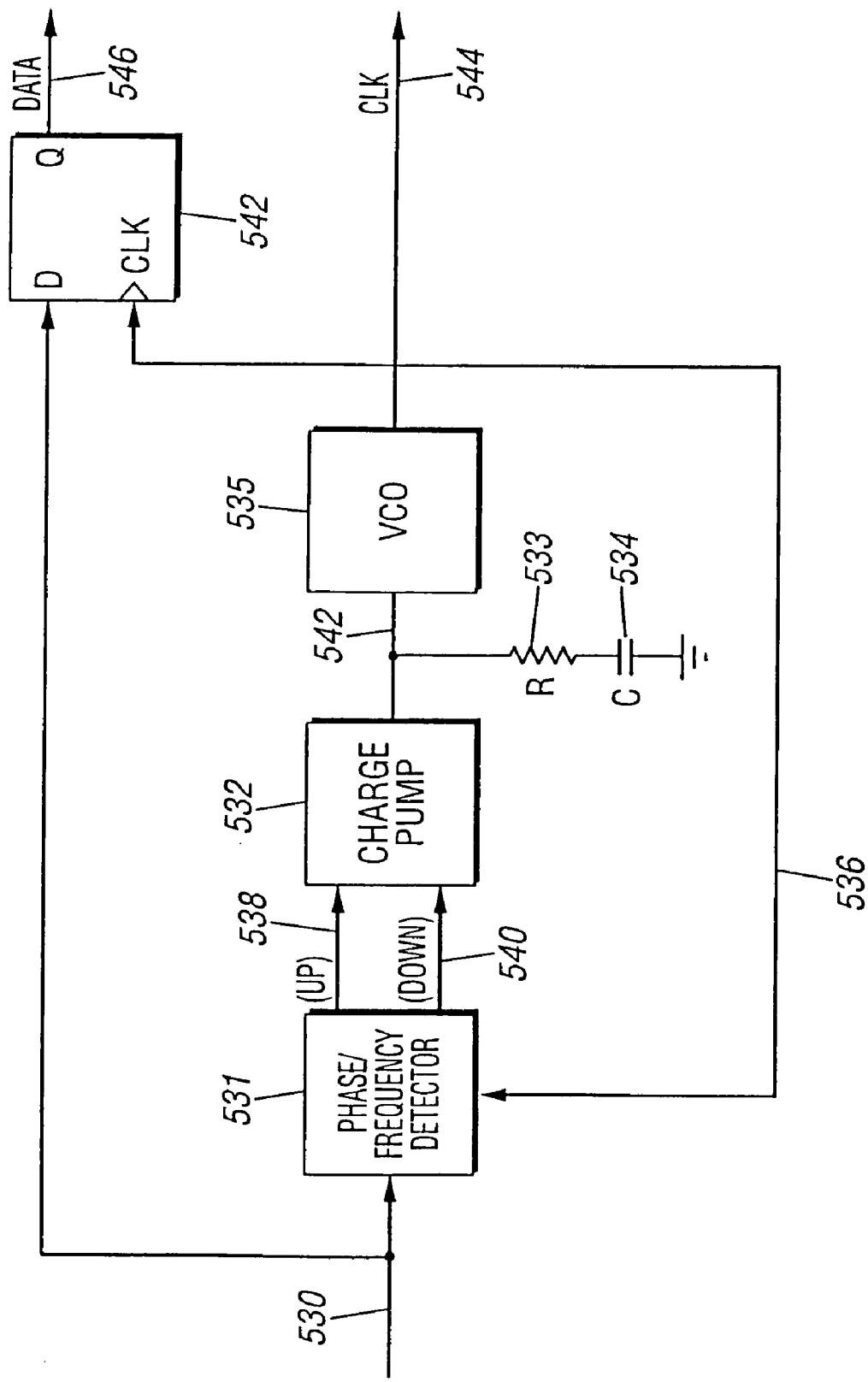
FIG. 5 is a block diagram showing the components of exemplary clock recovery circuit that is used in the present invention.

A preferred embodiment for a clock recovery circuit 216 for use in this invention is detailed in FIG. 5 and described below. One section of the clock recovery circuit may be a phase locked loop ("PLL") circuit, consisting of phase/frequency detector 531, charge pump 532, resistor 533, capacitor 534, and voltage controlled oscillator ("VCO") 535. The other section of the clock recovery block is data latch 542 operating outside the phase locked loop to re-time the digital data received across the isolation barrier. Circuitry for performing these functions is well known to those skilled in the art. See, for example, F. Gardner, *Phaselock Techniques*, 2d ed., John Wiley & Sons, N.Y., 1979; and R. Best, *Phase-Locked Loops*, McGraw-Hill, 1984, which are incorporated herein by reference. The data input to the receive system from the isolation capacitors may be derived from a differential signal present at the barrier by passing the differential signal through MOS input buffers (not shown), which are well known in the art, and providing a single-ended binary output signal 530 to the clock recovery circuit.

The illustrated exemplary phase/frequency detector 531 receives a digital input 530 from the isolation barrier and an input 536 from the output of VCO 535 and performs a phase comparison between these two inputs. If the VCO phase lags the input data phase, a speed up signal 538 is supplied to charge pump 532. If the input data 530 phase lags the VCO output 536 phase, a slow down signal 540 is supplied to charge pump 532. In response to "speed up" inputs from phase/frequency detector 531, charge pump 532 delivers a positive current to the loop filter consisting of resistor 533 and capacitor 534 connected in series. In response to "slow down" inputs from the phase/frequency detector, charge pump 532 sinks a positive current from the loop filter. The output voltage of the loop filter at node 542 drives voltage controlled oscillator 535, which increases its operation frequency as the input voltage increases. The output of VCO 535 is fed back as input 536 to phase/frequency detector 531, and it is also used to re-time the input data 530 by serving as the clock input to flip-flop latch 542, thus providing a clock signal to the isolated circuitry and also providing data signal 546 that is synchronized to clock signal 544. A divider circuit may be included in the feedback path 536.

The phase/frequency detector and charge pump operate to increase loop filter voltage 542 and VCO frequency if VCO phase 536 lags input data phase 530. Conversely, the VCO frequency is decreased if the VCO phase leads input data phase. In this manner, the VCO output phase is adjusted until phase lock is achieved with input data. Consequently, the VCO frequency is driven to be substantially identical to the input data frequency.

If noise interference occurs at the isolation barrier, the input data transitions will occur at points in time that are noisy, or jittered, relative to the transition times of the transmit circuit driver. These jittered data edges will cause a noise component in the charge pump current that drives the loop filter. The loop filter and VCO, however, low-pass filter this noise component, substantially attenuating the effects of this input data jitter. Consequently, the VCO output signal, while frequency locked to the input data, contains substantially less phase noise than the noisy input data. The bandwidth of the phase noise filtering operation may be set independently of the bandwidth of the analog signal to be communicated across the isolation barrier. Since the filtered, phase locked loop output clock signal 544 is used to latch or re-time the noisy input data at flip flop 542, the effects of noise interference at the capacitive isolation barrier are substantially eliminated. Finally, the filtered, phase locked loop output clock signal 544 is used as the timebase or clock for the other receive circuits, including decoder 217 and delta-sigma DAC 208 shown in FIG. 2, resulting in an analog output 218 of the capacitive isolation system that is substantially free from any noise interference that may have been introduced at the capacitive isolation barrier.

Figure 6A:
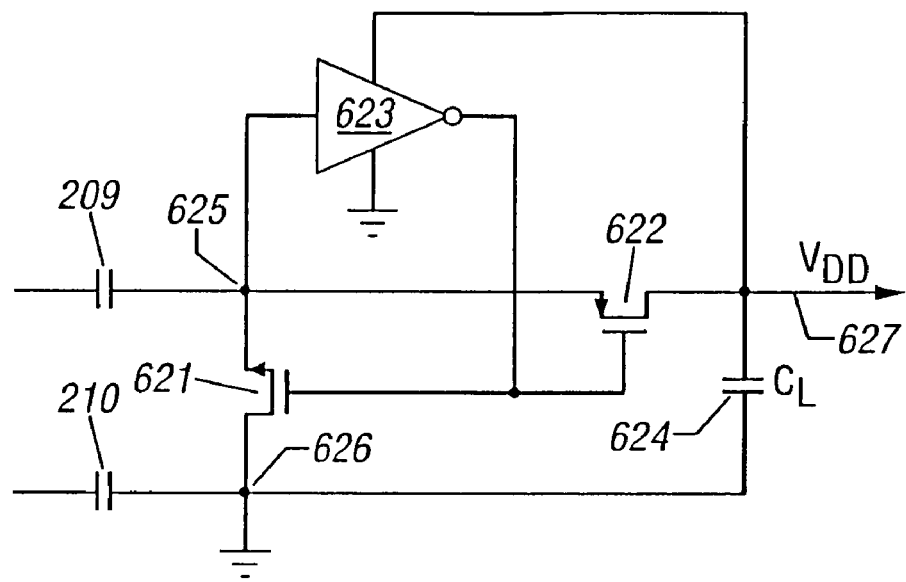
FIGS. 6A and 6B are schematic diagrams of active diode bridge circuits that may be used as power supplies in preferred embodiments of the present invention.
Figure 6B:
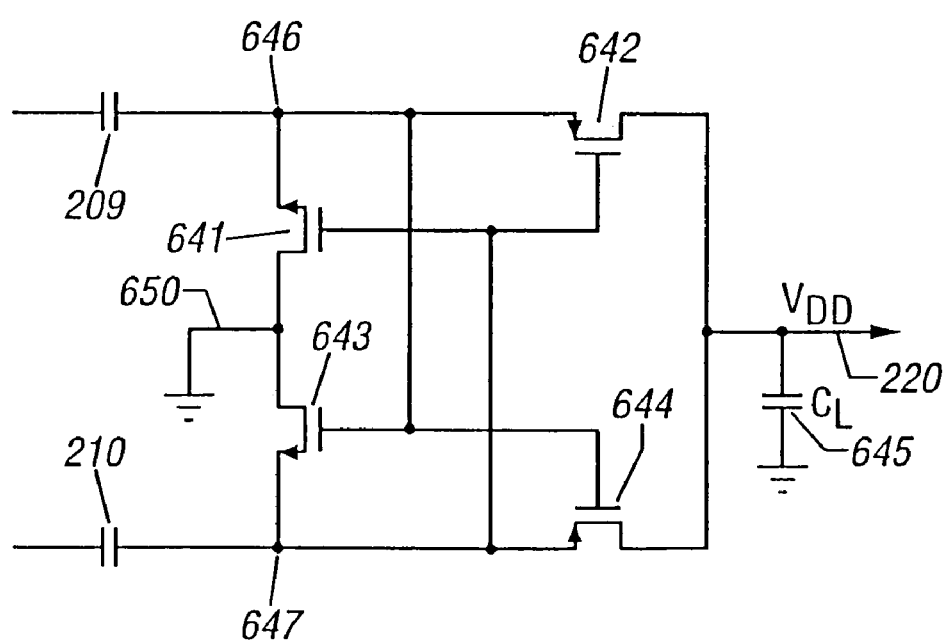

Preferred embodiments of active diode bridge circuit 640 of FIG. 2 are detailed in FIG. 6A for single-ended digital communication and FIG. 6B for differential digital communication across the isolation barrier. The active diode bridge generates a DC power supply voltage $V_{DD}$, which may be used to operate the clock recovery and receiver decoder circuits, in response to the digital data received across the capacitive isolation barrier. An active diode bridge circuit is distinguished from a standard or passive diode bridge in that the gating elements are active transistors rather than passive elements such as bipolar diodes.

Referring to the exemplary circuit illustrated in FIG. 6A, isolation capacitor 209 is connected to node 625 and isolation capacitor 210 is connected to node 626. The source of n-channel MOSFET 621 and the source of p-channel MOSFET 622 are connected to node 625. Also connected to node 625 is the input of standard CMOS inverter 623. The output of inverter 623 drives the gates of MOSFETS 621 and 622. The drain of n-channel MOSFET 621 is connected to node 626, the receive circuit ground node, while the drain of p-channel MOSFET 622 connects to node 627, which provides $V_{DD}$ voltage for the isolated circuitry. Also connected to $V_{DD}$ node 627 are load capacitor $C_L$ 624 and the power supply input of CMOS inverter 623. In a preferred embodiment, the power supply inputs of clock recovery circuit 216 and decoder circuit 217 shown in FIG. 2 are also connected to $V_{DD}$ node 627.

Referring to the exemplary embodiment illustrated in FIG. 6A, the operation of the active diode bridge circuit used in single-ended digital communication will now be described. A digital logic signal is coupled across capacitor 209 from the transmit section. When a digital "high" signal is received through capacitor 209, node 625 goes high. The logic "high" signal on node 625 forces the CMOS inverter 623 output node to go low, turning off device 621 and turning on device 622. Consequently, current flows through capacitor 209, device 622, and from $V_{DD}$ to receive circuit ground through capacitor $C_L$ and through clock recovery and decoder circuitry shown in FIG. 2. The circuit is completed by current flow returning across the isolation barrier through capacitor 210. The current demand by circuitry on $V_{DD}$ through capacitors 209 and 210 must be limited so that the voltage on node 625 relative to node 626 can still be recognized as a digital high logic level. When a digital "low" signal is received through capacitor 209, CMOS inverter 623 turns off device 622 and turns on device 621. Consequently, current flows across the isolation barrier through capacitor 210, through device 621, and returns across the isolation barrier through capacitor 209. Therefore, although no average current flows through capacitors 209 and 210, average current can be supplied from $V_{DD}$ to receive circuit ground to operate clock recovery circuit 216 and decoder. circuit 217. Load capacitor 624 operates to minimize supply ripple on the DC supply voltage established on node $V_{DD}$.

Referring to the embodiment shown in FIG. 6B, isolation capacitor 209 connects to node 646 and isolation capacitor 210 connects to node 647. The source node of n-channel MOSFET 641 and the source node of p-channel MOSFET 642 connect to node 646. Also connected to node 646 are the gates of n-channel MOSFET 643 and p-channel MOSFET 644. The source node of n-channel MOSFET 643 and the source node of p-channel MOSFET 644 connect to node 647. Also connected to node 647 are the gates of n-channel MOSFET 641 and p-channel MOSFET 642. The drains of devices 641 and 643 are connected to the ground node of the receiving circuit. The drains of devices 642 and 644 are connected to the node 220, which provides $V_{DD}$ voltage for the isolated circuitry. Also connected to $V_{DD}$ node 220 are load capacitor $C_L$ 645 and the power supply inputs of clock recovery circuit 216 and decoder circuit 217 as shown in FIG. 2.

Referring to the exemplary embodiment illustrated in FIG. 6B, the operation of the active diode bridge used in differential digital communication will now be described. A differential digital signal is received through capacitors 209 and 210. When a digital 'high' signal is received through capacitor 209, a corresponding digital 'low' signal is received through capacitor 210, and node 646 goes high while node 647 goes low. This condition turns on devices 642 and 643 while turning off devices 641 and 644. Consequently, current flows through capacitor 209, device 642, from $V_{DD}$ to ground through capacitor CL and through clock recovery circuitry 216 and decoder circuitry 217 shown in FIG. 2. The circuit is completed from receive circuit ground 650, through device 643 and finally returning across the isolation barrier through capacitor 210. The current demand on $V_{DD}$ must be limited so that the voltage on node 646 relative to node 650 can be recognized as a high logic level signal by the clock recovery and decoder circuitry.

When a digital 'low' signal is received through capacitor 209, a digital 'high' signal is received through capacitor 210, and node 646 goes low while node 647 goes high. This condition turns on devices 641 and 644 while turning off devices 642 and 643. Consequently current flows through capacitor 210 and device 644 to $V_{DD}$ node 220, and from there to ground through capacitor 645 and through clock recovery and decoder circuitry shown in FIG. 2. The circuit is completed from ground 650, through device 641 and finally returning across the isolation barrier through capacitor 209. Therefore, in either logic state, and independently of the current flow direction through capacitors 209 and 210, current flows in the same direction from $V_{DD}$ to ground. Therefore, an average or DC supply voltage is established on node $V_{DD}$, and adequate current can be supplied to operate clock recovery circuit 216 and decoder circuit 217. Load capacitor 645 operates to minimize power supply ripple, providing a filtering operation on $V_{DD}$. An added benefit of the ability to power sections of the isolated circuitry from the digital signal transmitted across the capacitive isolation barrier from the powered circuitry is that it allows isolated power-up and power-down control of isolated circuitry sections on an as-needed basis.

Parasitic bipolar transistors may result from typical CMOS processes. If they are not controlled, these bipolar transistors can discharge the power supply 627 shown in FIG. 6A during the initial power up time. If the discharge current from the parasitic bipolar transistors is larger than the current delivered to the power supply 627 through transistor 622, then the circuit may not power up to the desired full voltage level. The beta of a lateral bipolar transistor in any CMOS process is a function of layout. With appropriate layout (i.e., large base region), the beta can be kept small enough to minimize undesired discharge currents. Further care needs to be taken in the design of any circuit that is connected to power supply 627. The circuits connected to power supply 627 cannot draw more current from the power supply than is available from the active diode bridge, even before the supply has ramped to the full value. Circuit design techniques to address these issues are common and well known in the art.

In the illustrative embodiment shown in FIG. 2, delta-sigma digital to analog converter (DAC) 208 receives input data from decoder 217 and synchronous clock input from clock recovery circuit 216. Analog output signal 218 is generated by DAC 208 in response to the digital data that is communicated across the capacitive isolation barrier. The output signal 218 is highly immune to amplitude and phase noise that may be introduced in the barrier circuitry because the signal that is communicated across the isolation capacitors is a synchronous digital signal, and because the received data is resynchronized to the recovered, jitter-filtered clock signal. The DAC is also timed by that clock signal. Delta-sigma DAC technology is well known in the art, and selecting a suitable DAC circuit will be a matter of routine design choice directed to the intended application of the barrier circuit. See, for example, P. Naus et al., *A CMOS Stereo 16-Bit D/A Converter for Digital Audio*, IEEE Journal of Solid State Circuits, June 1987, pp. 390-395, which is incorporated herein by reference.

Figure 7:
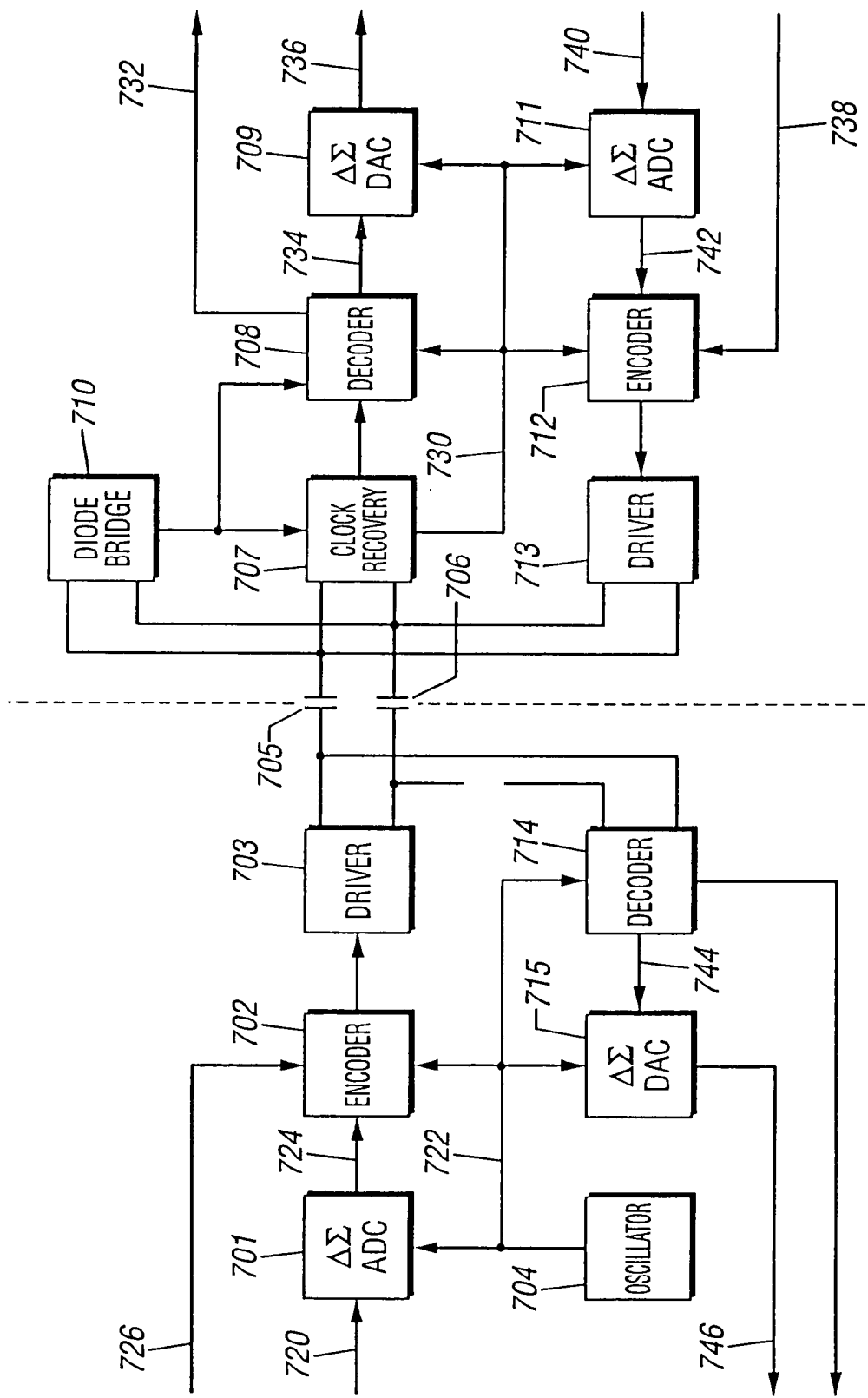
FIG. 7 is a block diagram illustrating a bidirectional isolation system according to the present invention.

FIG. 7 illustrates a preferred bidirectional embodiment of the present invention. It will be recognized that other unidirectional and bidirectional isolation barriers may be designed by persons skilled in the art using the principles described herein, and that such barriers will fall within the scope of this invention. In the illustrated and described embodiment, the capacitive isolation system comprises a "transmit" system to the left of center, a "receive" system to the right of center, and a capacitive isolation barrier in the center of the figure comprising two high voltage capacitors 705 and 706. Note that the terms "transmit" and "receive" are used to identify the powered and isolated sides of the barrier, respectively, and that in this embodiment data may be conveyed across the barrier in both directions. Many of the components in this bidirectional embodiment are identical or similar to those in the unidirectional embodiment described above with reference to FIG. 2.

The transmit system includes delta-sigma analog-to-digital converter 701 operable on the analog input 720 of the transmit circuit and synchronized to clock signal 722 from oscillator 704. The analog input 720 of the transmit system is an analog signal containing information to be transmitted across the isolation barrier, which may be for example an analog voice signal to be coupled to a telephone system. Digital output 724 of the delta-sigma ADC may be time-division multiplexed with digital control input 726 by the encoder circuit 702. Digital control input 726 is a digital signal containing additional information to be transmitted across isolation barrier 705, 706. Digital control input 726 may include control information for analog circuitry on the receiving side of the isolation barrier. Encoder circuit 702 also formats the resulting data stream into a coding scheme that allows for robust clock recovery on the receiving side of the isolation barrier, as is described above.

Encoder circuit 702 also receives a clock signal 722 from oscillator 704. Driver circuit 703 of the transmit system drives the encoded signal to isolation capacitors 705 and 706 in response to the output of encoder circuit 702.

The isolation barrier comprises two high voltage capacitors 705, 706. In one embodiment, capacitor 705 is driven bidirectionally by drivers 703, 713 while capacitor 706 provides a return path across the isolation barrier. In another embodiment of the present invention, capacitors 705 and 706 are differentially driven by digital driver circuits 703, 713.

A preferred embodiment of the receive system, shown to the right of isolation capacitors 705, 706 in FIG. 7 includes clock recovery circuit 707, whose inputs are connected to isolation capacitors 705, 706. The clock recovery circuit recovers a clock signal from the digital data driven across the isolation barrier and provides synchronized clock signal 730 to the various circuits in the receive system. The recovered clock operates as the time base for decoder 708 and delta-sigma digital-to-analog converter 709. Decoder section 708 separates the time division multiplexed data and control information, providing digital control output 732 to other circuitry, and providing synchronous data signal 734 as an input to delta-sigma DAC 709. The delta-sigma DAC 709, with digital input 734 supplied by decoder 708, and clock signal 730 supplied by clock recovery section 707, operates synchronously with the transmit system delta-sigma ADC 701 and provides analog output 736 on the receiving side of the isolation baffler. Active diode bridge 710 is connected to isolation capacitors 705 and 706 and supplies a DC power supply voltage to clock recovery circuit 707 and decoder circuit 708 by drawing current from the digital signal transmitted across the isolation baffler, as is described in detail above. Driver 713 must remain tri-stated until decoder 708 has detected a valid frame, indicating successful power-up of the receive circuit sections.

The embodiment shown in FIG. 7 also enables communication from the receive system to the transmit system, or from right to left across the isolation capacitors as illustrated. The receive system encoder circuit 712 and driver circuit 713 cooperate to communicate information back from the receive system to the decoder circuit 714 in the transmit system. Receive system encoder section 712 receives a clock input 730 from clock recovery section 707, and is thereby synchronized to the transmit system oscillator 704 and encoder 702. This synchronization allows transmission in each direction to occur in distinct time slots. In time slots where transmit driver 703 is operable to transmit information from the transmit system to the receive system, receive driver 713 is tri-stated or disabled. Alternatively, in time slots where receive driver 713 is operable to transmit information back from the receive system to the transmit system, transmit driver 703 is tri-stated or disabled. In this manner, bidirectional communication may be established across a single pair of high voltage isolation capacitors.

Digital control input 738 of the receive system is a digital signal containing information to be communicated across the isolation barrier, including control information for analog circuitry on the transmit system side of the barrier. The receive system also includes delta-sigma ADC 711 operable on analog input signal 740 so that the information contained in analog signal 740 on the receive system side of the isolation barrier can be conveyed across the barrier in digital form and then accurately reproduced on the transmit system side of the barrier. The receive system delta-sigma ADC 711 receives its clock input from clock recovery circuit 707, and is thereby synchronized with transmit system oscillator 704. Digital output signal 742 generated by receive system ADC 711 may be time-division multiplexed with receive system digital control input 738 in encoder section 712.

In the transmit system, decoder circuit 714 is connected to isolation capacitors 705, 706 to receive signals therefrom, identify signals representing information coming from the receive system. Decoder 714 then extracts the digital control information from the data stream received from the receive circuit, and passes data signal 744 generated by delta-sigma ADC 711 to transmit system delta-sigma DAC 715. Decoder 714 also latches and retimes the data received across the barrier to synchronize it with clock signal 722, which is generated by oscillator 704, thereby eliminating the effects of phase noise interference and other sources of jitter in the synchronous digital signal. Circuits that are suitable for performing these decoder functions are well known in the art.

Transmit system delta-sigma DAC 715 receives its clock input from oscillator 704 and is thereby synchronized to receive system ADC 711. Transmit system DAC 715 provides a reconstructed analog data output signal 746, thereby completing the communication of analog information back from the receive system to the transmit system.

In summary, FIG. 7 describes a bidirectional communication system for conveying analog and digital information across a capacitive isolation barrier. The barrier itself is inexpensive, since only two high voltage isolation capacitors are required for synchronous, bidirectional communication. The barrier is a reliable communication channel because the digital signals communicated across the barrier are insensitive to amplitude and phase noise interference that may be introduced at the isolation barrier.

Figure 8:
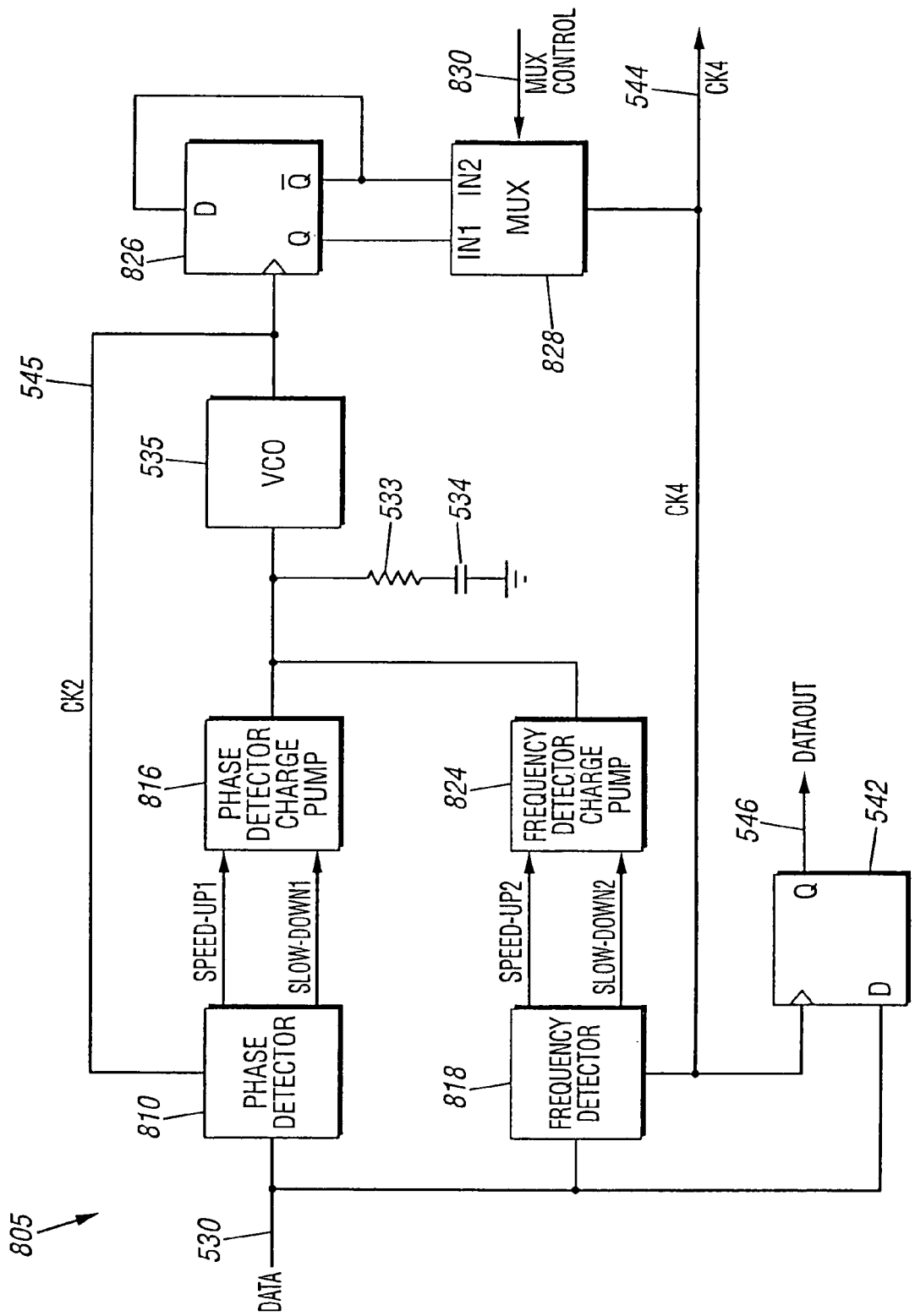
FIG. 8 is a block diagram of a clock recovery and data synchronization circuit according to a preferred embodiment of the present invention.

A more detailed description of a clock recovery circuit suitable for use in this invention with the coding scheme of FIG. 4 will now be provided, with reference to FIG. 8. Clock recovery PLL 805 has data input 530, data output 546 and recovered clock signal output 544. Phase detector 810 has inputs DATA 530 and feedback clock signal CK2 545. The outputs of phase detector 810 are SPEED-UP1 and SLOW-DOWN1 signals, both of which are connected to inputs of phase detector charge pump 816. Frequency detector 818 has inputs DATA 530 and output clock signal CK4 544. The outputs of frequency detector 818 are signals designated SPEED-UP2 and SLOW-DOWN2, which are connected to the inputs of frequency detector charge pump 824. The outputs of phase detector charge pump 816 and frequency detector charge pump 824 are connected together and are also connected to the input of voltage controlled oscillator ("VCO") 535 and one terminal of resistor 533. The other terminal of resistor 533 is connected to one terminal of capacitor 534. The other terminal of capacitor 534 is connected to ground. The output of VCO 535 is the CK2 signal 545. The clock input of flip-flop 826 is connected to CK2 545. The Q-bar output of flip-flop 826 is connected to the D input of flip-flop 826. The Q and Q-bar outputs of flip-flop 826 are connected to the inputs of multiplexer (mux) 828. The control input 830 of mux 828 is called MUX CONTROL and comes from the framing logic, which is described elsewhere in this specification. The output of mux 828 is the CK4 signal 544. The D input of flip-flop 542 is connected to data input 530. The clock input of flip-flop 542 is connected to the CK4 signal 544. The Q output of flip-flop 542 is the resynchronized DATAOUT signal 546, which is sent to the frame detect logic.

Frequency detector 818 is dominant over phase detector 810 when the frequency of the DATA and CK4 signals are different. Once the frequency of the DATA and CK4 signals are substantially similar, the SPEED-UP2 and SLOW-DOWN2 signals become inactive and phase detector 810 becomes dominant. Separate charge pumps for the phase detector and frequency detector allow for independent control of the gain of the phase detector and frequency detector circuits. Alternatively, if independent gains are not required, then the SPEED-UP1 and SPEED-UP2 signals could be logically ORed together to drive one charge pump. And likewise the SLOW-DOWN1 and SLOW-DOWN2 signals could be logically ORed together to drive the other input to the charge pump.

The output of VCO 535 is the CK2 signal, which is divided by two in frequency by flip-flop 826. Since CK2 is divided by two to generate the bit rate clock signal CK4, there can be two phases of CK4 with respect to the start of a bit period. The phase of CK4 that will yield correct operation of the frequency detector is the one where the rising edge of CK4 aligns with the start of a bit period. The frame-detect logic is needed to detect the start of a bit interval and is used to select the appropriate phase of CK4 using mux 828.

Figure 15:
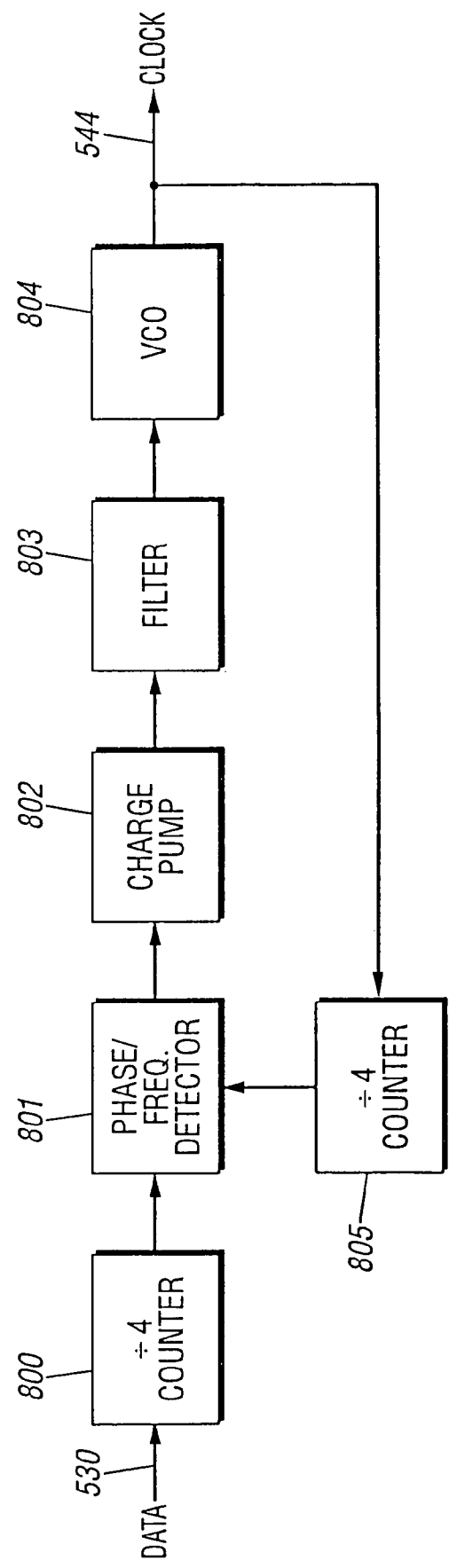
FIG. 15 is a block diagram of a clock recovery circuit that may be employed for use with the framing format of FIG. 14.

It will be appreciated that a clock recovery circuit according to this invention, such as that illustrated in FIG. 8 or FIG. 15, maybe beneficially used to recover and stabilize a clock signal on the isolated side of the baffler where the clock signal is conveyed via isolation elements that are separate from the isolation elements that are used to transfer the data signal.

A preferred embodiment of a decoder circuit 708 is shown in FIG. 11. Shift register 840 has an input connected to the DATAPOUT signal 546 from clock recovery circuit 805 and is clocked by recovered clock signal CK4. Multi-bit output 842 of shift register 840 is connected to frame-detect logic 844 and to demux logic 846. Frame detect logic 844 has one output connected to mux control logic 848 and one output connected to demux logic 846. Demux logic 846 is clocked by CK4. Counter 850 is also clocked by CK4. The output of counter 850 is connected to mux control logic 848. The output of mux control logic 848 is the MUX-CONTROL signal 830 sent to the clock recovery PLL 805 to select the proper phase for the CK4 signal. The outputs of demux logic 846 are the DEMUXED DATA signal and the CONTROL signal.

Shift register 840 stores a predetermined number of bits of the serial DATAOUT signal 546. Frame-detect logic 844 operates on this data and detects when a frame signal is received. Many possible framing signal formats can be used. A format that may be used in a presently preferred embodiment is shown in FIG. 12. Data 860 is alternated with framing signals 862 and control signals. In the framing format shown in this figure, one control signal (off hook) 864 is sent for every eight data bits. The remaining seven bits in the frame of sixteen are used for frame synchronization. The illustrated framing signal is six ones followed by a zero in the control signal field. The data signal may be guaranteed to not have more than five ones in a row so that it will not be mistaken for a framing signal. Many other framing formats are possible to allow for different data signal properties and to permit the use of additional control bits.

Once the frame detect logic 844 detects six one's followed by a zero in the control signal field, mux control logic 848 is set to maintain the phase of the CK4 signal. If after a predetermined number of CK4 clock cycles a framing signal is not detected, then counter 850 will cause mux control logic 848 to change the phase of CK4 using mux 828 (FIG. 8). Counter 850 will then be reset, and frame detect logic 844 will again attempt to detect the selected framing signal so as to achieve synchronization. Only the correct phase of CK4 will achieve frame synchronization. Once frame synchronization is achieved, demux logic 846 can correctly decode control and data signals.

The specific structure and operation of frame detect logic 844, demux logic 846, and mux control logic 848 is dependent upon the selected framing format, the selected multiplexing scheme, and other design choices. The detailed design of this circuitry is within the ordinary skill in the art and is omitted from this description of a preferred embodiment.

Figure 9:
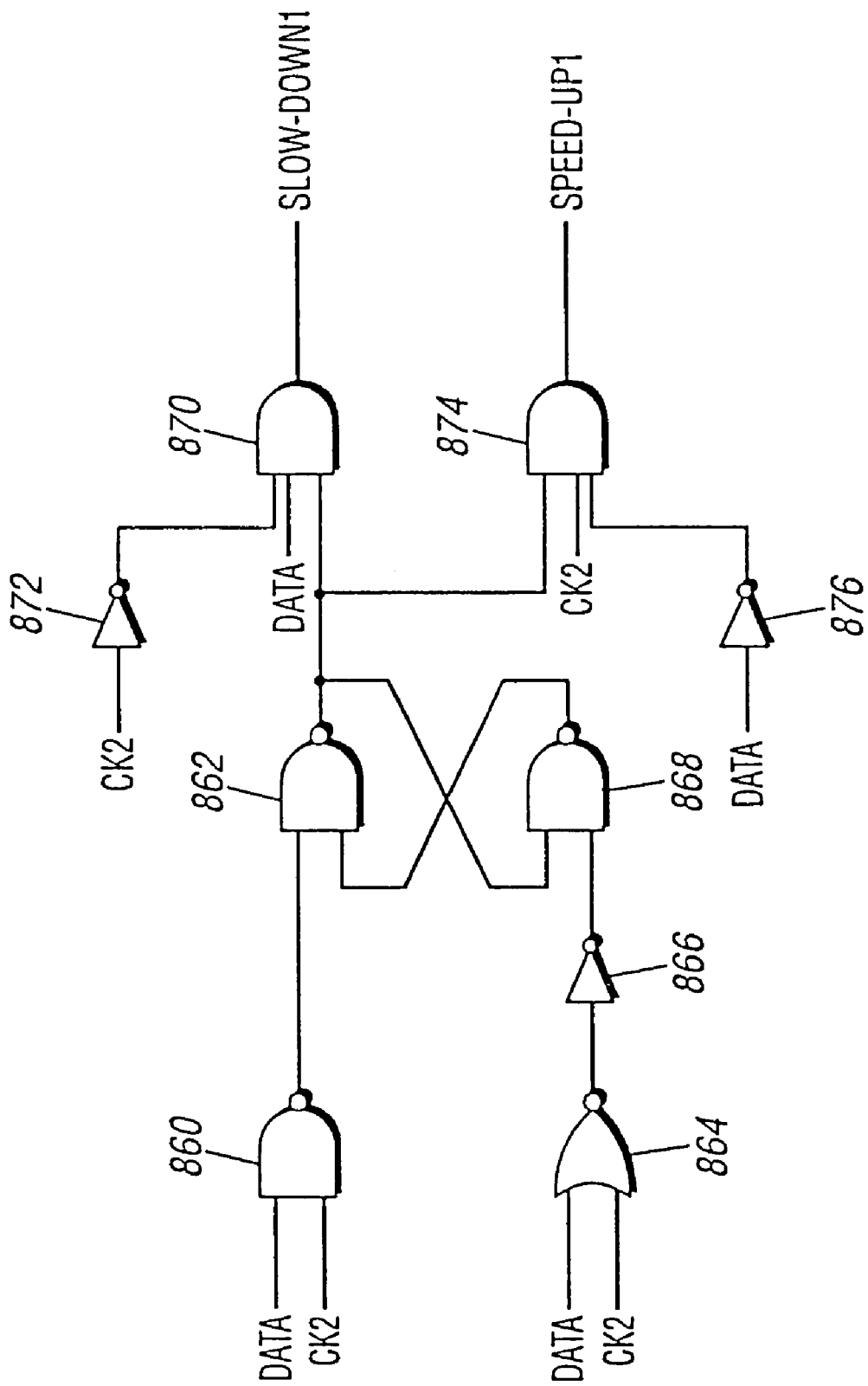
FIG. 9 is a schematic diagram of a phase detector circuit that may be used in a clock recovery circuit according to a preferred embodiment of the present invention.
Figure 10:
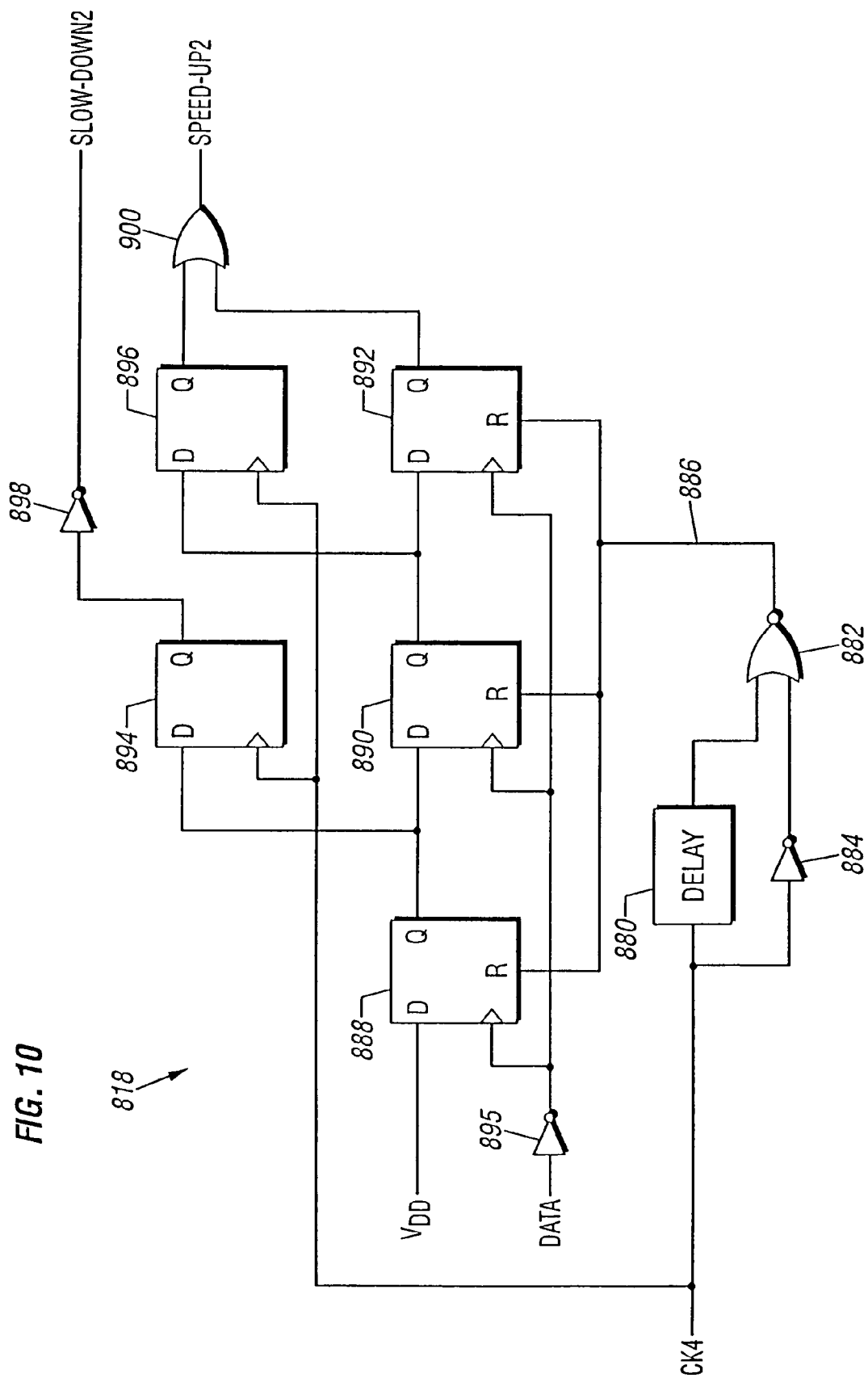
FIG. 10 is a schematic diagram of a frequency detector circuit that may be used in a clock recovery circuit according to a preferred embodiment of the present invention.

Exemplary embodiments of phase and frequency detectors 810, 818 are shown in FIGS. 9 and 10. Referring to FIG. 9, phase detector 810 has input signals CK2 and DATA and output signals SPEED-UP1 and SLOW-DOWN1. A two input NAND gate 860 has inputs DATA and CK2 and its output is connected to one input of NAND gate 862. A two input NOR gate 864 also has inputs DATA and CK2 and its output is connected to the input of inverter 866. A two input NAND gate 868 has one input connected to the output of the inverter 866 and one input connected to the output of NAND gate 862. NAND gate 862 has one input that is connected to the output of NAND gate 860 and the other input connected to the output of NAND gate 868. A three input AND gate 870 has one input connected to the output of inverter 872, another input connected to the DATA signal and another input connected to the output of NAND gate 862. The output of AND gate 870 is the SLOW-DOWN1 signal. The input of inverter 872 is connected to the CK2 signal. A three input AND gate 874 has one input connected to the output of NAND gate 862, another input is connected to the CK2 signal and another input is connected to the output of inverter 876. The output of AND gate 874 is the SPEED-UP1 signal. The input of inverter 876 is connected to receive the DATA signal.

In the illustrated embodiment, phase detector 810 compares the phase on the falling edges of DATA and CK2 after both signals are high at the same time. NAND gates 862 and 868 form a set-reset type latch. The latch gets "set" such that the output of NAND gate 862 is high when both the DATA and CK2 signals are high. The latch gets "reset" such that the output of NAND gate 862 is low when both DATA and CK2 are low. When the latch is "set" (i.e., both DATA and CK2 are high), AND gates 870 and 874 are enabled. Once the AND gates 870 and 874 are enabled they can compare the falling edges of CK2 and DATA to determine which signal goes low first. If DATA goes low first, then the SPEED-UP1 signal will go high until CK2 also goes low, indicating that oscillator 535 needs to oscillate faster in order to achieve phase alignment with the DATA signal. If the CK2 signal goes low first then the SLOW-DOWN1 signal will go high until DATA also goes low, indicating that oscillator 535 should oscillate slower in order to achieve phase alignment with the DATA signal. The SPEED-UP1 and SLOW-DOWN1 signals are connected to phase detector charge-pump 816.

A preferred embodiment of frequency detector 818 is shown in FIG. 10. The inputs to frequency detector 818 are the DATA and CK4 signals and the outputs are the SPEED-UP2 and SLOW-DOWN2 signals. Delay cell 880 has its input connected to CK4 and output connected to one input of NOR gate 882. The delay cell 880 consists of an even number of capacitively loaded inverter stages or other delay generating circuitry and is well known in the art. The output of inverter 884 is connected to the other input of NOR gate 882 and the input of inverter 884 is connected to CK4. The output 886 of NOR gate 882 is reset pulse that occurs on the rising edge of CK4, and is connected to the reset input of D flip-flops 888, 890, and 892. The input of inverter 895 is connected to DATA. The output of inverter 895 is connected to the clock input of D flip-flops 888, 890, and 892. The D input of flip-flop 888 is connected to $V_{DD}$. The D-input of flip-flop 890 is connected to the Q-output of flip-flop 888. The D-input of flip-flop 892 is connected to the Q-output of flip-flop 890. D flip-flops 894 and 896 have their clock inputs connected to CK4. The D input of flip-flop 894 is connected to the Q output of flip-flop 888. The D-input of flip-flop 896 is connected to the Q-output of flip-flop 890. The input of inverter 898 is connected to the Q-output of flip-flop 894, and the output of inverter 898 is the SLOW-DOWN2 signal. OR gate 900 provides the SPEED-UP2 signal. One input of OR gate 900 is connected to the Q-output of flip-flop 896, and the other input is connected to the Q-output of flip-flop 892. The SPEED-UP2 and SLOW-DOWN2 signals are connected to the frequency-detector charge pump 824.

The illustrated embodiment of frequency detector 818 counts the number of DATA pulses within one CK4 cycle. The frequency of CK4 should equal to the bit rate of the DATA pattern. Suitable encoding used for the DATA signal will ensure that there will be only one CK4 rising edge for each data pulse falling edge, if the frequency of CK4 is equal to the data rate. If the CK4 frequency is equal to the data rate then the Q-output of flip-flop 888 will be high prior to each rising edge of CK4 and the Q-outputs of flip-flops 890 and 892 will be low prior to each rising edge of CK4. If the Q-output of flip-flop 888 is low prior to the rising edge of CK4 then the SLOW-DOWN2 signal will go high for the duration of the next CK4 cycle, signaling that oscillator 535 should slow down. If the Q-output of flip-flop 890 is high prior to the rising edge of CK4, then the SPEED-UP2 signal will go high for the duration of the next CK4 cycle signaling that the oscillator should speed up.

Figure 14:
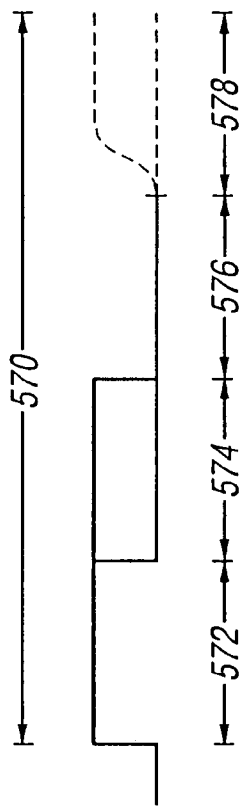
FIG. 14 is a timing diagram illustrating an alternative framing format that may be used in bidirectional embodiments of the present invention.

Another exemplary data coding scheme that may be used in an isolation system constructed in accordance with this invention is shown in FIG. 14. In this scheme, each bit period 570 is split into four fields. The first field 572 is referred to as the clock field and is always high independent of the data being transferred. The second field 574, which may occupy the second quarter of the bit period 570, contains the forward-going (from transmit side to receive side) data bit. This data bit can be either the delta-sigma data bit or a control bit or any desired type of encoding bit, in accordance with the requirements of the application in which the invention is used. The third field 576, which may occupy the third quarter of the bit period, is always low to ensure enough signal transitions to provide for power transmission in the forward path along with the first two fields, at least one of which is high in each bit period. The forward (transmit side) driver circuit is tri-stated during the fourth field 578, thus allowing for data transmission in the opposite direction across the isolation capacitor. Of course, this particular coding scheme is provided as an example, and many other coding schemes may be devised that will be operable in the various embodiments of the present invention.

It is desirable to use the logic "1" that is present at the beginning of each bit period for clock recovery, since it is always present at periodic intervals. However, if the reverse data bit from the previous bit period is a one, the rising edge at the beginning of the next bit period will not be readily seen by a logic gate and therefore will not be useful for clock recovery. To mitigate this effect and to allow reliable clock recovery, every fourth bit in the reverse field may be guaranteed to be zero by the encoding algorithms that are employed. The total frame length can be increased if more control bits need to be sent across the barrier in the reverse direction. Every fourth clock edge (the one associated with a zero in the previous reverse bit field) may then be used for clock recovery.

A block diagram of an exemplary PLL circuit that can perform clock recovery in accordance with the coding scheme of FIG. 14 is shown in FIG. 15. The forward data (conveyed from the transmit side to the receive side) is connected to divide-by-four counter 800. The output of counter 800 is connected to phase-frequency detector 801. The output of phase-frequency detector 801 is connected to charge pump 802. The output of charge pump 802 is connected to the input of loop filter 803. The output of loop filter 803 is connected to the input of voltage controlled oscillator (VCO) 804. The output of VCO 804 is the bit clock used for synchronizing the received data signal and for providing a clock signal to the receive side circuitry. The output of VCO 804 is also connected to the input of divide-by-four counter 805. The output of counter 805 is connected to the other input of phase-frequency detector 801. The phase-frequency detector 801 and the other circuits in the illustrated clock recovery circuit of FIG. 15 are well known in the art, and the specific circuitry selected for a particular application would be a matter of routine design choice.

Figure 16:
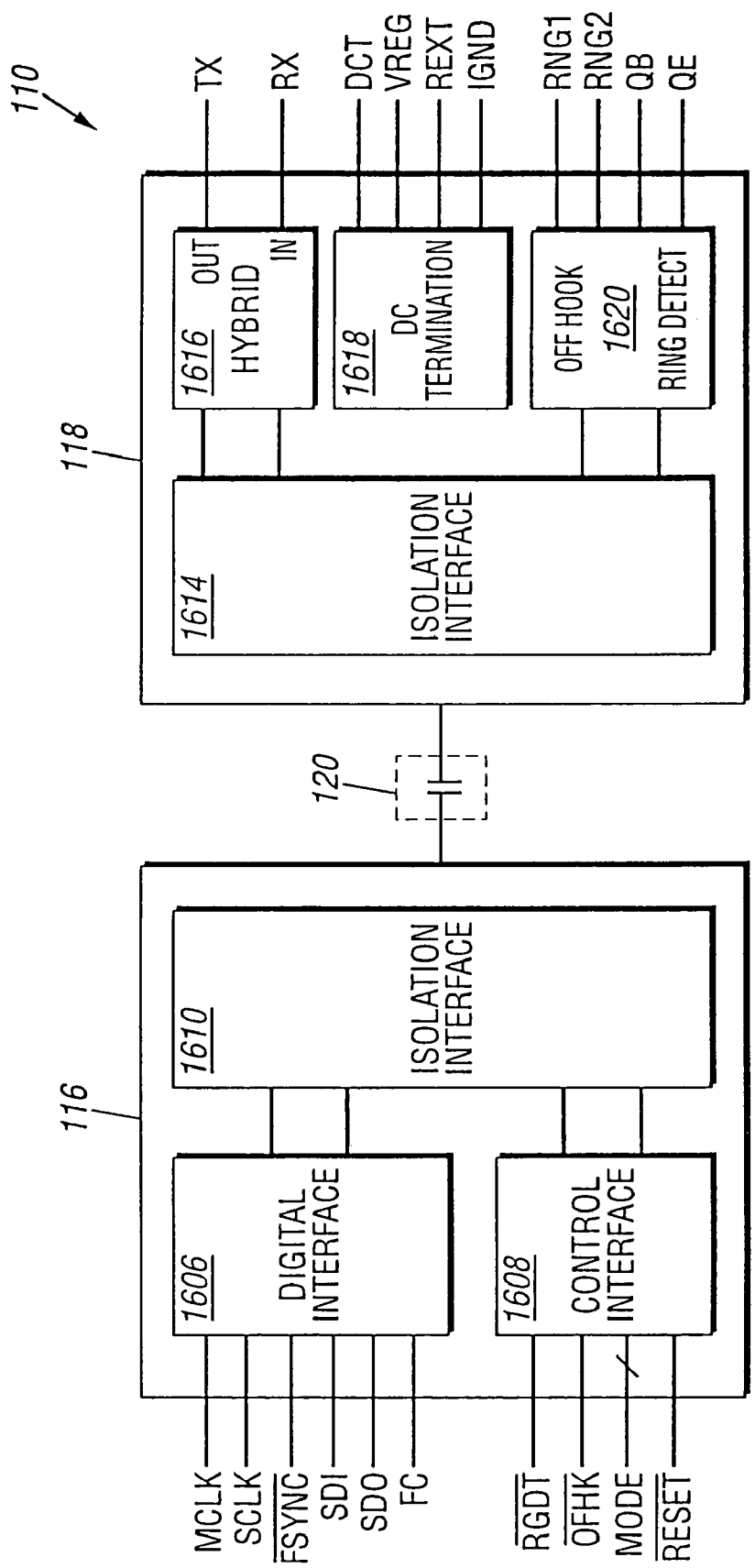
FIG. 16 is a general block diagram of digital DAA circuitry including phone line side circuitry, an isolation barrier, and powered side circuitry according to the present invention.

FIG. 16 is a general block diagram of digital DAA circuitry 110 including phone line side circuitry 118, an isolation barrier 120, and powered side circuitry 116 according to the present invention. The isolation barrier 120 may include one or more capacitors and allow for the transmission of digital information between the isolation interface 1614 in the phone line side circuitry and the isolation interface 1610 in the powered side circuitry. The phone line side circuitry 118 may be connected to phone lines of a telephone network system, and the powered side circuitry 116 may be connected to external controllers, such as digital signal processors (DSP), that may be part of a communication device, such as a phone or modem.

The powered side circuitry 116, which may be implemented as an integrated circuit (IC), may communicate with the external controller through a digital interface 1606 and a control interface 1608. For example, the digital interface 1606 may have a number of external pins providing a serial port interface to the external controller, such as a master clock input pin (MCLK), a serial port bit clock output (SCLK), a serial port data IN pin (SDI), a serial port data OUT pin (SDO), a frame sync output pin (FSYNC_bar), and a secondary transfer request input pin (FC). Similarly, the control interface 1608 may have a number of external pins providing control and status information to and from the external controller, such as a ring detect status pin (RGDT_bar), an off-hook status pin (OFHK_bar), a reset pin (RESET_bar), and multiple mode select pins (MODE). (It is noted that the suffix "_bar" is used to denote a signal that is typically asserted when at a low logic level.) In addition, the digital interface 1606 and the control interface 1608 are connected to the isolation interface 1610 so that control, status, signal and other desired information may be transmitted to and received from the phone line side circuitry 118 across the isolation barrier 120.

The phone line side circuitry 118, which may be implemented as an integrated circuit (IC), may communicate with the phone lines through hybrid circuitry 1616, may receive DC power and provide an internal power supply voltage through DC termination circuitry 1618, and determine ring-detect and off-hook status information through off-hook/ring-detect block 1620. In addition, the hybrid circuitry 1616, the off-hook/ring-detect block 1620, and the DC termination circuitry 1618 are connected to the isolation interface 1614 so that control, status, signal and other desired information may be transmitted to and received from the powered side circuitry 116 across the isolation barrier 120.

In the embodiment depicted, the hybrid circuitry 1616 has an output pin (TX) and an input pin (RX) that may connect to external telephone interface circuitry such as hook-switch circuitry and a diode bridge. The hybrid circuitry 1616 may function to split the differential signal existing on the phone, which typically includes both transmit and receive analog information, into an internal transmit signal ($TX_{INT}$) and receive signal ($RX_{INT}$). It is noted that the TX output pin is labeled to indicate that it is used to transmit analog information to the phone lines, and that the RX pin is labeled to indicate that it is used to receive analog information from the phone lines. These external pin signals are different than the internal analog transmit signal ($TX_{INT}$) and analog receive signal ($RX_{INT}$).

The DC termination circuitry 1618 may have a number of external pins that also connect to external telephone interface circuitry such as hook-switch circuitry and a diode bridge. For example, the DC termination circuitry 1618 may have a DC termination pin (DCT), a voltage regulator pin (VREG), an external resistor pin (REXT), and a isolated ground pin (IGND). The DC termination circuitry 1618 terminates the DC voltage on the phone line and provides an internal power supply for the phone line side circuitry 118. The DC termination pin (DCT) receives the phone line DC current. The voltage regulator pin (VREG) allows external regulator circuitry, such as a capacitor, to be connected to the DC termination circuitry 1618. An external power dissipating resistor may be connected to the external resistor pin (REXT). And the isolated ground pin (IGND) may be connected to the system ground for the powered side circuitry 116 through a capacitor within the isolation barrier 120 and may also be connected to the phone line through a ground connection within external diode bridge circuitry.

The off-hook/ring-detect block 1620 may have external input pins allowing status information to be provided concerning phone line status information (RNG1, RNG2), such as ring and caller identification signals. For example, the first ring detect pin (RNG1) may connect to the tip (T) lead of the phone line through a capacitor (2200 pF), and the second ring detect pin (RNG2) may connect to the ring (R) lead of the phone line through a capacitor (2200 pF). In addition, off-hook/ring-detect block 1620 may have external output pins (QB, QE) that control external off-hook circuitry to enter, for example, an off-hook state or a limited power mode to get caller identification information. In addition, the output pins (QB, QE) may be connected to the base and emitter, respectively, of a bipolar transistor within external hook-switch circuitry.

Figure 17:
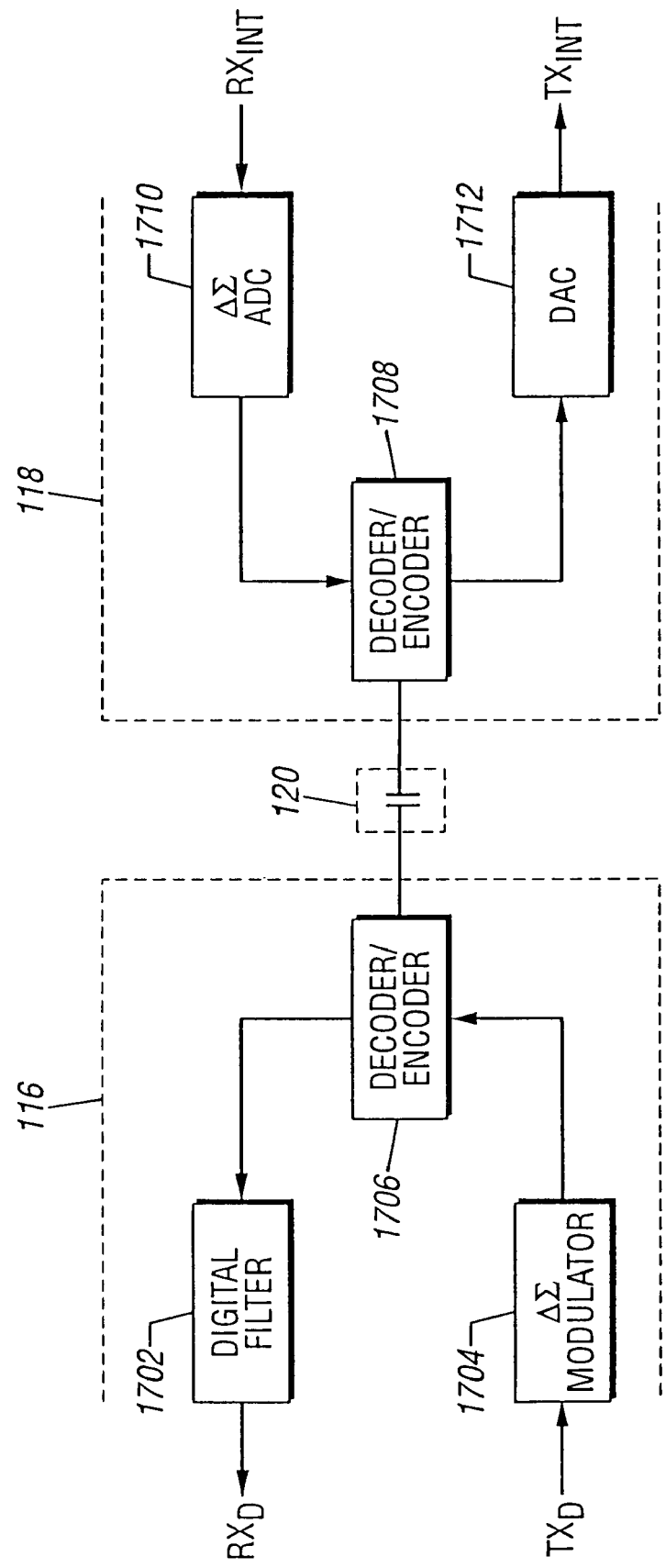
FIG. 17 is a general block diagram of transmit and receive signal paths within digital DAA circuitry according to the present invention.

FIG. 17 is a general block diagram of internal transmit (TX) and receive (RX) signal paths within digital DAA circuitry 110 according to the present invention. In the embodiment depicted, information may communicated in either direction across the isolation barrier 120. It is noted that FIG. 17 does not depict all of the functional blocks within powered side circuitry 116 and phone line side circuitry 118. It is also noted that the blocks depicted may be implemented as numerous additional blocks carrying out similar functions.

In the embodiment of FIG. 17, communications from the phone line side circuitry 118 to the powered circuitry 116 are considered receive signals. Within phone line side circuitry 118, a delta-sigma analog-to-digital converter (ADC) 1710 receives an internal analog receive signal ($RX_{INT}$), which may be provided for example by hybrid circuitry 1616. The output of delta-sigma ADC 1710 is oversampled digital data stream in a pulse density modulation format. The decoder/encoder circuitry 1708 processes and formats this digital information as desired before sending it across the isolation barrier 120 as encoded digital information. For example, decoder/encoder 1708 may multiplex control data with the digital stream before it is sent across the isolation barrier 120. This control data may be a any desired information, such as ring detect signals, off-hook detect signals, or other phone line status information. Within powered side circuitry 116, the decoder/encoder 1706 decodes this encoded digital information received across the isolation barrier 120. The digital filter 1702 processes this decoded digital stream and converts it into internal digital receive data ($RX_D$) that may be provided through the digital interface 1606 to an external controller.

Communications from the powered side circuitry 116 to the phone line side circuitry 118 are considered transmit signals. Within powered side circuitry 116, a delta-sigma modulator 1704 receives an internal digital transmit signal ($TX_D$), which may be provided for example from an external controller through digital interface 1606. The output of delta-sigma modulator 1704 is an oversampled digital data stream in a pulse density modulation format. The decoder/encoder circuitry 1706 processes and formats this digital information as desired before sending it across the isolation barrier 120 as encoded digital information. For example, decoder/encoder 1706 may multiplex control data with the digital stream. This control data may be a any desired information, such as ring detect signals, off-hook detect signals, or other phone line status information. In addition, decoder/encoder 1706 may add framing information for synchronization purposes to the digital stream before it is sent across the isolation barrier 120. Still further, decoder/encoder 1706 may format the digital data stream so that a clock signal may be recovered within the phone line side circuitry 118, for example, as is discussed with respect to FIG. 14 above. Within phone line side circuitry 118, the decoder/encoder 1708 may recover a clock signal and may decode the encoded digital information received across the isolation barrier 120 to obtain framing, control or status information. The digital-to-analog converter (DAC) 1712 converts the decoded digital stream and converts it into internal analog transmit data ($TX_{INT}$) that may be provided as an analog signal through the hybrid circuitry 1616 and ultimately to the phone lines.

Figure 18:
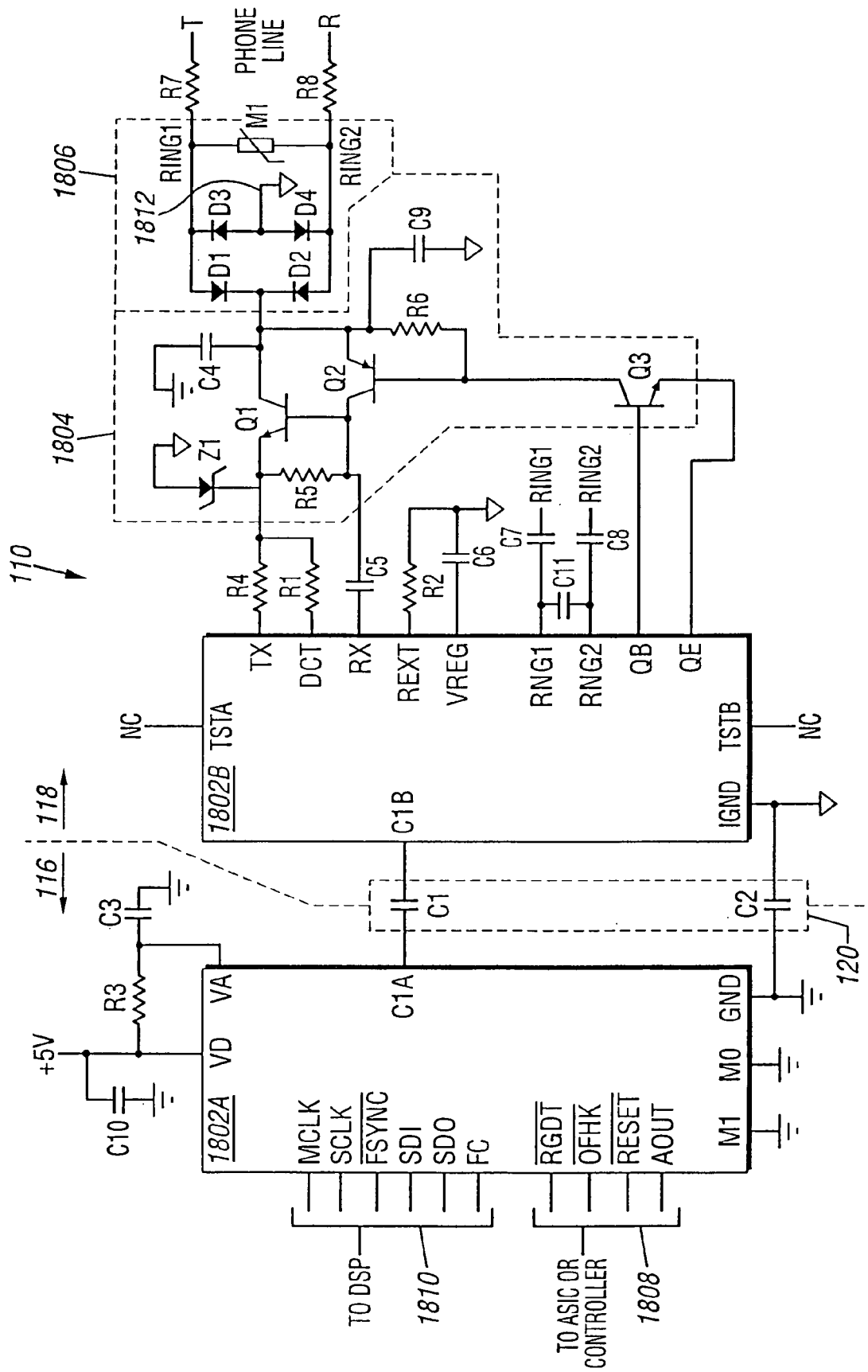
FIG. 18 is a general circuit diagram of digital DAA circuitry implemented with two integrated circuits (ICs) and a capacitive isolation barrier according to the present invention.

FIG. 18 is a general circuit diagram of digital DAA circuitry 110 implemented with a two integrated circuits (ICs) and a capacitive isolation barrier 120 according to the present invention. In particular, powered side circuitry 116 may include a powered side integrated circuit (IC) 1802A, and phone line side circuitry 118 may include a phone line side IC 1802B. External circuitry, such as hook-switch circuitry 1804 and diode bridge circuitry 1806, is also shown connected to external pins of the phone line side IC 1802B. In the embodiment depicted, external pins 1810 of the powered side IC 1802A are connected to an external digital signal processor (DSP) and the external pins 1808 are connected to a external application specific IC (ASIC) or controller. The isolation barrier 120 may include a first capacitor (C1) connecting an external signal (C1A) pin on the powered side IC 1802A to an external signal (C1B) pin on the phone line side IC 1802B. In addition, the isolation barrier 120 may have a second capacitor (C2) connecting the isolated ground (IGND) pin on the phone line side IC 1802B to the system ground (GND) pin on the powered side IC 1802A. In addition, the isolated ground (IGND) pin may be connected to node 1812 within diode circuitry 1806 and thereby be connected to the phone line.

Figure 19:
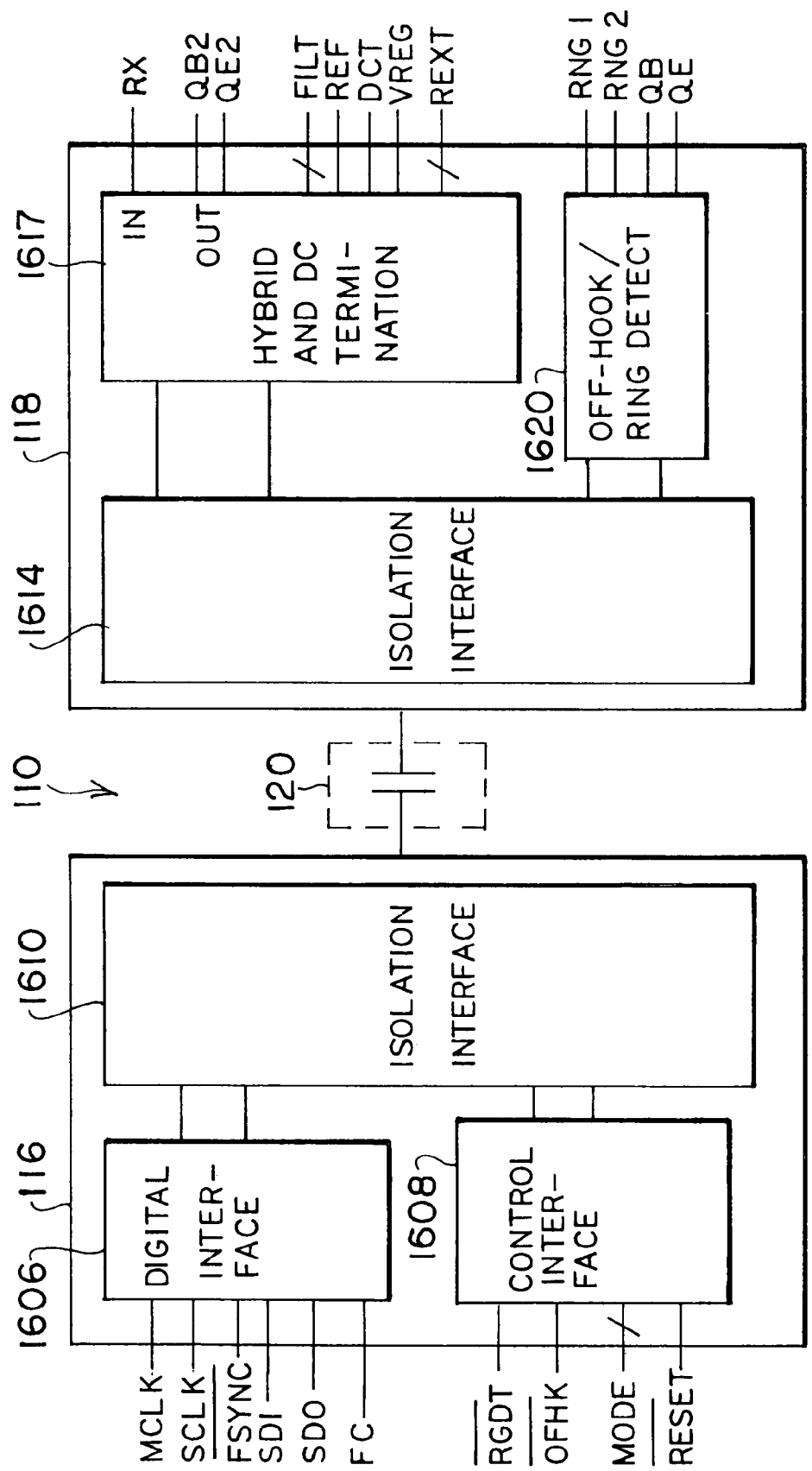
FIG. 19 is a general block diagram of digital DAA circuitry including phone line side circuitry, an isolation barrier, and powered side circuitry according to the present invention.

FIG. 19 is a general block diagram of digital DAA circuitry 110 including phone line side circuitry 118, an isolation barrier 120, and powered side circuitry 116 according to the present invention. The isolation barrier 120 may include one or more capacitors and allow for the transmission of digital information between the isolation interface 1614 in the phone line side circuitry and the isolation interface 1610 in the powered side circuitry. The phone line side circuitry 118 may be connected to phone lines of a telephone network system, and the powered side circuitry 116 may be connected to external controllers, such as digital signal processors (DSP), that may be part of a communication device, such as a phone or modem.

The powered side circuitry 116, which may be implemented as an integrated circuit (IC), may communicate with the external controller through a digital interface 1606 and a control interface 1608. For example, the digital interface 1606 may have a number of external pins providing a serial port interface to the external controller, such as a master clock input pin (MCLK), a serial port bit clock output (SCLK), a serial port data IN pin (SDI), a serial port data OUT pin (SDO), a frame sync output pin (FSYNC_bar) (it is noted that the suffix "_bar"0 is used to denote a signal that is typically asserted when at a low logic level), and a secondary transfer request input pin (FC). Similarly, the control interface 1608 may have a number of external pins providing control and status information to and from the external controller, such as a ring detect status pin (RGDT_bar), an off-hook status pin (OFHK_bar), a reset pin (RESET_bar), and multiple mode select pins (MODE). In addition, the digital interface 1606 and the control interface 1608 are connected to the isolation interface 1610 so that control, status, signal and other desired information may be transmitted to and received from the phone line side circuitry 118 across the isolation barrier 120.

The phone line side circuitry 118, which may be implemented as an integrated circuit (IC), may communicate with the phone lines through hybrid and DC termination circuitry 1617 (the DC termination circuitry provides an internal power supply voltage), and determine ring-detect and off-hook status information through off-hook/ring-detect block 1620. In addition, the hybrid and DC termination circuitry 1617 and the off-hook/ring-detect block 1620 are connected to the isolation interface 1614 so that control, status, signal and other desired information may be transmitted to and received from the powered side circuitry 116 across the isolation barrier 120.

In the embodiment depicted, the hybrid portion of the hybrid and DC termination circuitry 1617 has an output pin QE2 (pin QE2 is also utilized for DC termination functions as described below) and an input pin (RX) that may connect to external telephone interface circuitry such as hook-switch circuitry and a diode bridge. The hybrid circuitry may function to split the differential signal existing on the phone, which typically includes both transmit and receive analog information, into an internal transmit signal ($TX_{INT}$) and receive signal ($RX_{INT}$). It is noted that the QE2 output pin is used to transmit analog information to the phone lines, and that the RX pin is labeled to indicate that it is used to receive analog information from the phone lines. These external pin signals are different than the internal analog transmit signal ($TX_{INT}$) and analog receive signal ($RX_{INT}$).

Figure 21:
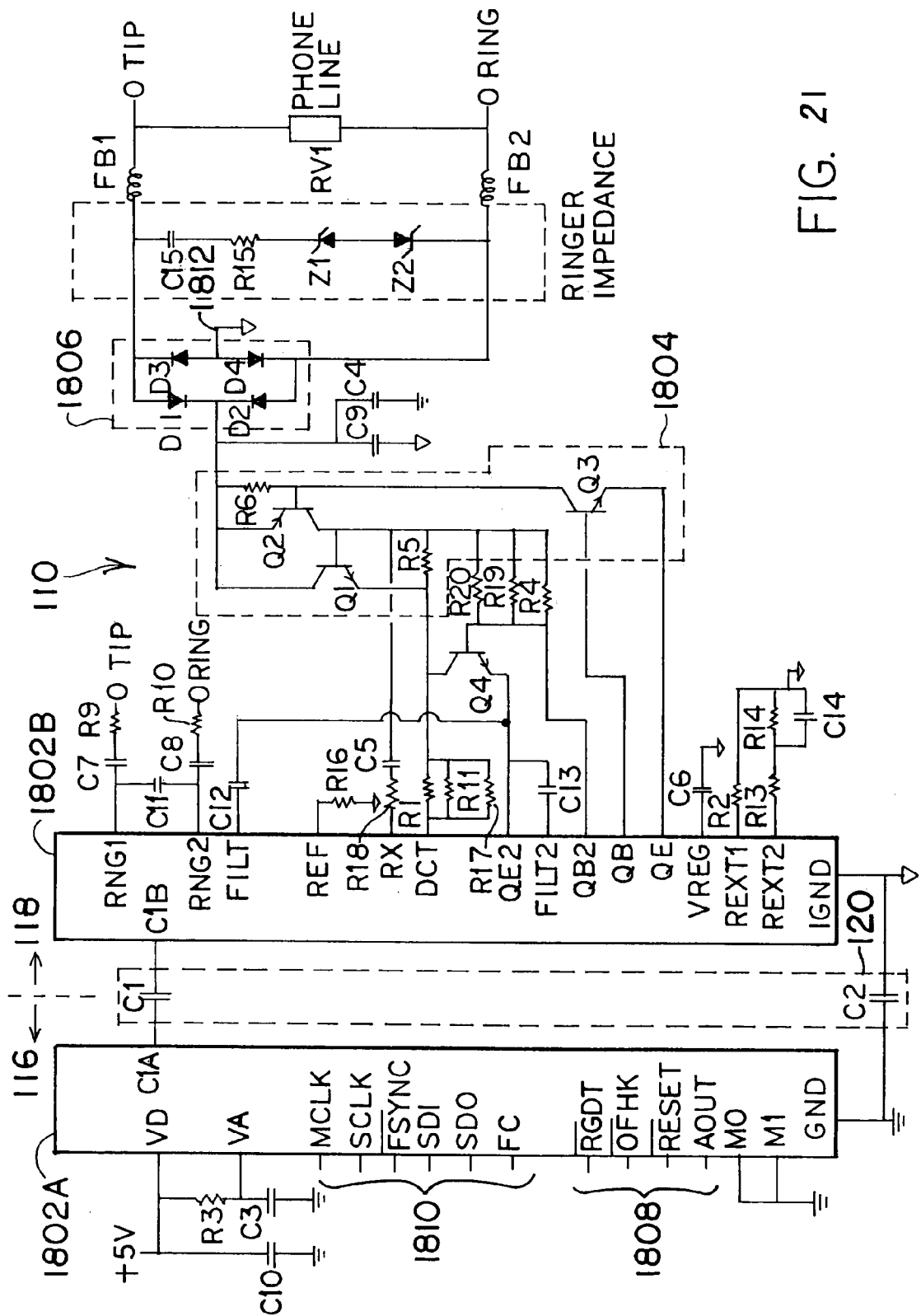
FIG. 21 is a general circuit diagram of digital DAA circuitry implemented with two integrated circuits (ICs), a capacitive isolation barrier, and external circuitry according to the present invention.

The hybrid and DC termination circuitry 1617 may have a number of external pins that also connect to external telephone interface circuitry such as hook-switch circuitry and a diode bridge as shown in FIGS. 19 and 21. For example, the hybrid and DC termination circuitry 1617 may have a DC termination pin (DCT), a voltage regulator pin (VREG), two external resistor pins (REXT and REXT2), two filter pins (FILT and FILT2) and a isolated ground pin (IGND). The DC termination circuitry terminates the DC voltage on the phone line and provides an internal power supply for the phone line side circuitry 118. The DC termination pin (DCT) receives a portion of the phone line DC current with the remainder flowing through pins QE2 and QB2, depending upon the termination mode and DC current level. The voltage regulator pin (VREG) allows external regulator circuitry, such as a capacitor, to be connected to the DC termination circuitry 1617. External resistors and a capacitor may be connected to the two external resistor pins (REXT and REXT2) to set the real and complex AC termination impedance respectively. The filter pin FILT (along with the capacitor C5) sets the time constant for the DC termination circuit. The filter pin FILT2 sets the off hook/on hook transient responses for pulse dialing. The isolated ground pin (IGND) may be connected to the system ground for the powered side circuitry 116 through a capacitor within the isolation barrier 120 and may also be connected to the phone line through a ground connection within external diode bridge circuitry.

Figure 20:
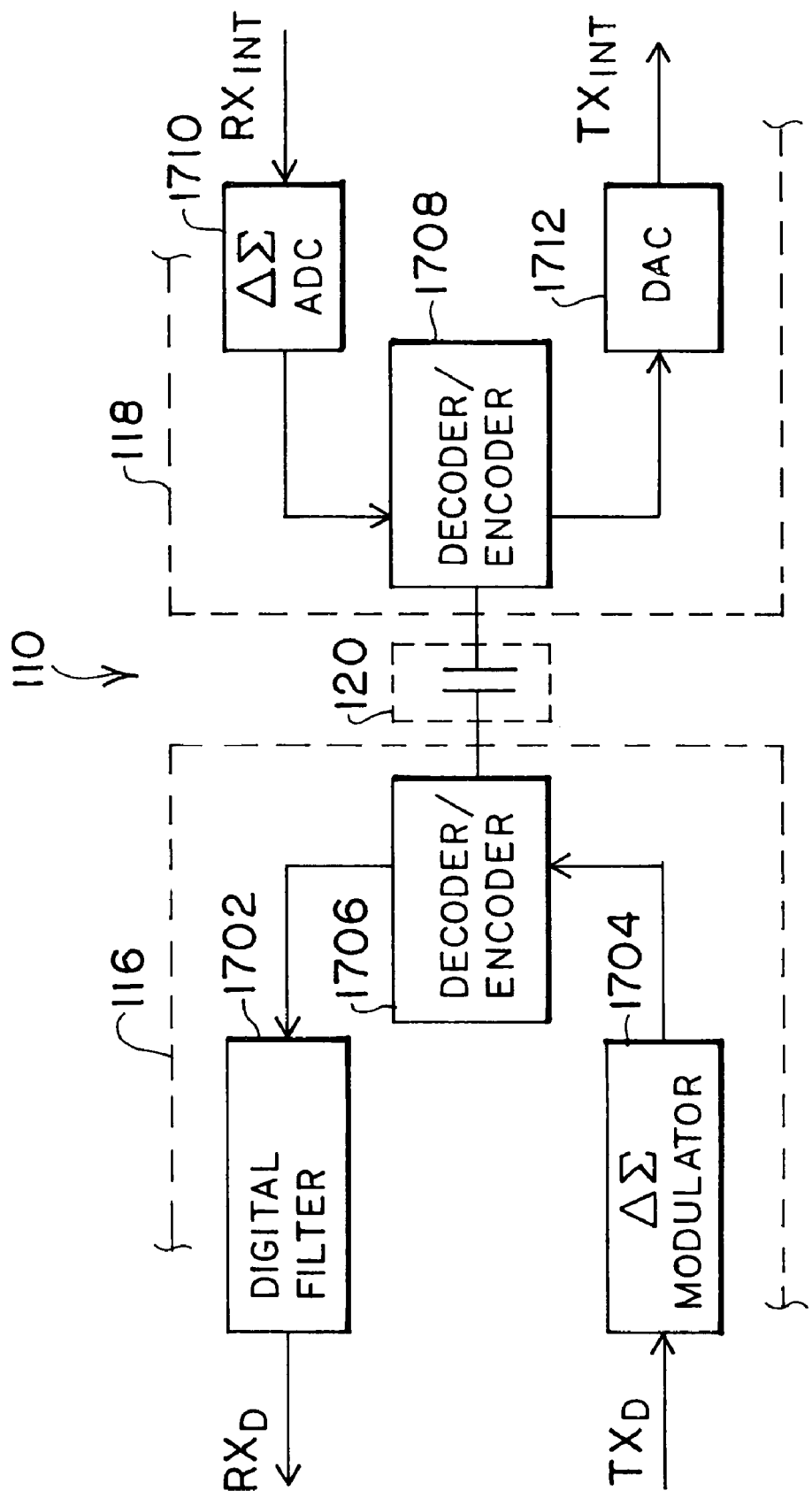
FIG. 20 is a general block diagram of transmit and receive signal paths within digital DAA circuitry according to the present invention.

The off-hook/ring-detect block 1620 may have external input pins allowing status information to be provided concerning phone line status information (RNG1, RNG2), such as ring and caller identification signals. For example, the first ring detect pin (RNG1) may connect to the tip (T) lead of the phone line through a capacitor and resistor, and the second ring detect pin (RNG2) may connect to the ring (R) lead of the phone line through a capacitor and resistor. In addition, off-hook/ring-detect block 1620 may have external output pins (QB, QE) that control external off-hook circuitry to enter, for example, an off-hook state or a limited power mode to get caller identification information. More particularly, the output pins (QB, QE) may be connected to the base and emitter, respectively, of a bipolar transistor within external hook-switch circuitry. FIG. 20 is a general block diagram of internal transmit (TX) and receive (RX) signal paths within digital DAA circuitry 110 according to the present invention. In the embodiment depicted, information may communicated in either direction across the isolation barrier 120. It is noted that FIG. 20 does not depict all of the functional blocks within powered side circuitry 116 and phone line side circuitry 118. It is also noted that the blocks depicted may be implemented as numerous additional blocks carrying out similar functions.

In the embodiment of FIG. 20 communications from the phone line side circuitry 118 to the powered circuitry 116 are considered receive signals. Within phone line side circuitry 118, a delta-sigma analog-to-digital converter (ADC) 1710 receives an internal analog receive signal ($RX_{INT}$), which may be provided for example by hybrid circuitry 1617. The output of delta-sigma ADC 1710 is oversampled digital data stream in a pulse density modulation format. The decoder/encoder circuitry 1708 processes and formats this digital information as desired before sending it across the isolation baffler 120 as encoded digital information. For example, decoder/encoder 1708 may multiplex control data with the digital stream before it is sent across the isolation baffler 120. This control data may be a any desired information, such as ring detect signals, off-hook detect signals, other phone line status information or data indicative of the country in which the DAA will be utilized (so that the appropriate phone line interface standards will be satisfied). Within powered side circuitry 116, the decoder/encoder 1706 decodes this encoded digital information received across the isolation barrier 120. The digital filter 1702 processes this decoded digital stream and converts it into internal digital receive data ($RX_D$) that may be provided through the digital interface 1606 to an external controller.

Communications from the powered side circuitry 116 to the phone line side circuitry 118 are considered transmit signals. Within powered side circuitry 116, a delta-sigma modulator 1704 receives an internal digital transmit signal ($TX_D$), which may be provided for example from an external controller through digital interface 1606. The output of delta-sigma modulator 1704 is an oversampled digital data stream in a pulse density modulation format. The decoder/encoder circuitry 1706 processes and formats this digital information as desired before sending it across the isolation barrier 120 as encoded digital information. For example, decoder/encoder 1706 may multiplex control data with the digital stream. This control data may be a any desired information, such as ring detect signals, off-hook detect signals, or other phone line status information. In addition, decoder/encoder 1706 may add framing information for synchronization purposes to the digital stream before it is sent across the isolation barrier 120. Still further, decoder/encoder 1706 may format the digital data stream so that a clock signal may be recovered within the phone line side circuitry 118. Within phone line side circuitry 118, the decoder/encoder 1708 may recover a clock signal and may decode the encoded digital information received across the isolation barrier 120 to obtain framing, control or status information. The digital-to-analog converter (DAC) 1712 converts the decoded digital stream and converts it into internal analog transmit data ($TX_{INT}$) that may be provided as an analog signal through the hybrid circuitry 1617 and ultimately to the phone lines.

FIG. 21 is a general circuit diagram of digital DAA circuitry 110 implemented with a two integrated circuits (ICs) and a capacitive isolation barrier 120 according to the present invention. In particular, powered side circuitry 116 may include a powered side integrated circuit (IC) 1802A, and phone line side circuitry 118 may include a phone line side IC 1802B. External circuitry, such as hook-switch circuitry 1804 and diode bridge circuitry 1806, is also shown connected to external pins of the phone line side IC 1802B. In the embodiment depicted, external pins 1810 of the powered side IC 1802A are connected to an external digital signal processor (DSP) and the external pins 1808 are connected to a external application specific IC (ASIC) or controller. The isolation barrier 120 may include a first capacitor (C1) connecting an external signal (C1A) pin on the powered side IC 1802A to an external signal (C1B) pin on the phone line side IC 1802B. In addition, the isolation barrier 120 may have a second capacitor (C2) connecting the isolated ground (IGND) pin on the phone line side IC 1802B to the system ground (GND) pin on the powered side IC 1802A. In addition, the isolated ground (IGND) pin may be connected to node 1812 within diode circuitry 1806 (and thereby be connected to the phone line) and the remaining ground connections of the external circuitry of the phone line side circuitry 118. Typical component values for the various external capacitors, resistors, transistors, and diodes for the circuit of FIG. 21 are shown in Table 1.

TABLE 1

External Component Values

| Symbol | Value |
|---|---|
| C1 | 150 pF, 4 kV, X7R, ±20% |
| C2, C4 | 1000 pF, 4 kV, X7R, ±20% |
| C3, C6, C10, C13 | 0.1 µF, 16 V, ±20% |
| C5 | 0.1 µF, 50 V, X7R, ±20% |
| C7, C8 | 680 pF, 300 V, X7R, ±5% |
| C9 | 22 nF, 300 V, X7R, ±20% |
| C11 | 2200 pF, 50 V, X7R, ±5% |
| C12 | 0.22 µF, 16 V, ±20% |
| C14 | 560 nF, 16 V, X7R, ±20% |
| C15 | 0.47 µF, 300 V, ±20% |
| R1, R4, R11, R17, R19, R20 | 4.87 KΩ, ¼ W ±1% |
| R2 | 400 Ω, ¹⁄₁₀ W ±5% |
| R3 | 10 Ω, ¹⁄₁₀ W, ±5% |

TABLE 1-continued

External Component Values

| Symbol | Value |
|---|---|
| R4 | 2.2 kΩ, ½ W, ±5% |
| R5, R6 | 30 kΩ, ¹⁄₁₀ W ±5% |
| R9, R10 | 30 kΩ, ¼ W ±5% |
| R13 | 140 Ω, ¹⁄₁₀ W ±5% |
| R14 | 445 Ω, ¹⁄₁₀ W ±5% |
| R15 | 18.7 kΩ, ¼ W ±5% |
| R16 | 10 kΩ, ¼ W ±5% |
| R18 | 2.2 KΩ, ¹⁄₁₀ W ±5% |
| Q1 | Zetex FMMT 497 |
| Q2 | Motorola MMBTA92LT1 |
| Q3 | Motorola MMBTA42LT1 |
| Q4 | Motorola PZT2222AT1 |
| FB1, FB2 | Ferrite Bead |
| RV1 | Sidactor 270 V |
| D1-D4 | 1N4004 |
| Z1, Z2 | Zener Diode 6 V |

A variety of characteristics of the DAA may be programmable in order to achieve compliance with a variety of regulatory standards. Thus, the DC termination characteristics, AC termination characteristics, ringer impedance, or billing tone detector of the DAA circuitry 110 may be programmable in order to achieve compliance with a variety of regulatory standards. For example, the DC current limiting requirements of French and TBR21 standards may be programmable obtained. Further, the low voltage requirements of Japan, Italy, Norway, and other countries may also be programmable obtained. More particularly, four DC termination modes (modes 0, 1, 2, and 3) may be programmed by setting two bits of a programmable register through use of the serial port data IN pin (SDI). More particularly, mode 2 is the standard loop voltage mode having no current limiting and with the transmit signal limited to −1 dBm. This mode is utilized to satisfy FCC and many European country requirements. FIG. 22C illustrates the I-V characteristics of mode 2. As shown in FIGS. 22A-22D, the DC voltage across the TIP and Ring lines is plotted as a function of the DC loop current from the phone line. Within the operating range of 15 mA to 100 mA, the DC impedance of the DC holding circuit is approximately 50Ω (the slope of the I-V curve). The low voltage standards required for some countries (for example Norway) will be met by the low voltage mode 0 shown in FIG. 22A with the transmit signal limited to −5.22 dBm. The slightly higher (approximately 0.3V higher) low voltage requirements of other countries (for example Japan and Italy) may be met by the low voltage mode 1 shown in FIG. 22B with the transmit level limited to −2.71 dBm. As with mode 2, both low voltage modes 0 and 1 operate with a DC impedance of the DC holding circuit at approximately 50Ω. FIG. 22D illustrates the I-V characteristics of mode 3 which is a current limiting mode as required in France and under the TBR21 standard. As shown in FIG. 22D, a first segment A of the I-V curve operates at a 50Ω impedance and a second segment B of the I-V curve operates at a 3200Ω impedance so that the DC termination will current limit before reaching 60 mA (i.e. less than 60 mA at approximately 35 volts or less. The crossover point between the two portions A and B of the curve is indicated as point C. A third segment D of the I-V curve of FIG. 22D operates at an 800Ω impedance.

The data for the particular country the DAA will be utilized within (and thus the required telephone line interface standards) may be transmitted across the capacitive barrier 120 with the various other DAA control signals. The phone line side circuitry 118 can then be programmably configured to satisfy the different various international DC termination requirements. Thus, a digitally programmable system is provided in which control bits can be provided across the isolation barrier to program the phone line side circuitry 118 in a manner such that a wide variety of phone line interface standards can be satisfied. Moreover, the programmable nature of the phone line side circuitry 118 may minimize the need for changing the external components utilized for coupling the phone line side circuitry 118 to the phone line TIP and RING lines. In this manner a single DAA system may be utilized in a cost effective software programmable manner for world wide use.

Figure 22A:
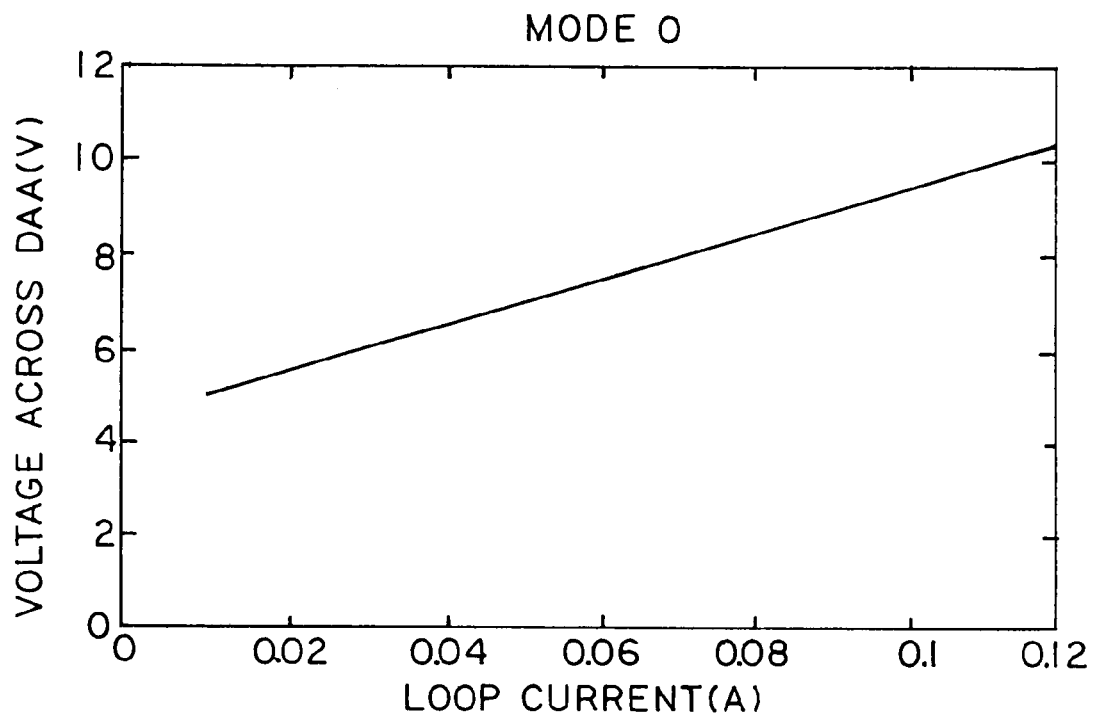
FIG. 22A-22D are DC termination characteristic curves of various DC termination modes of the present invention.
Figure 22B:
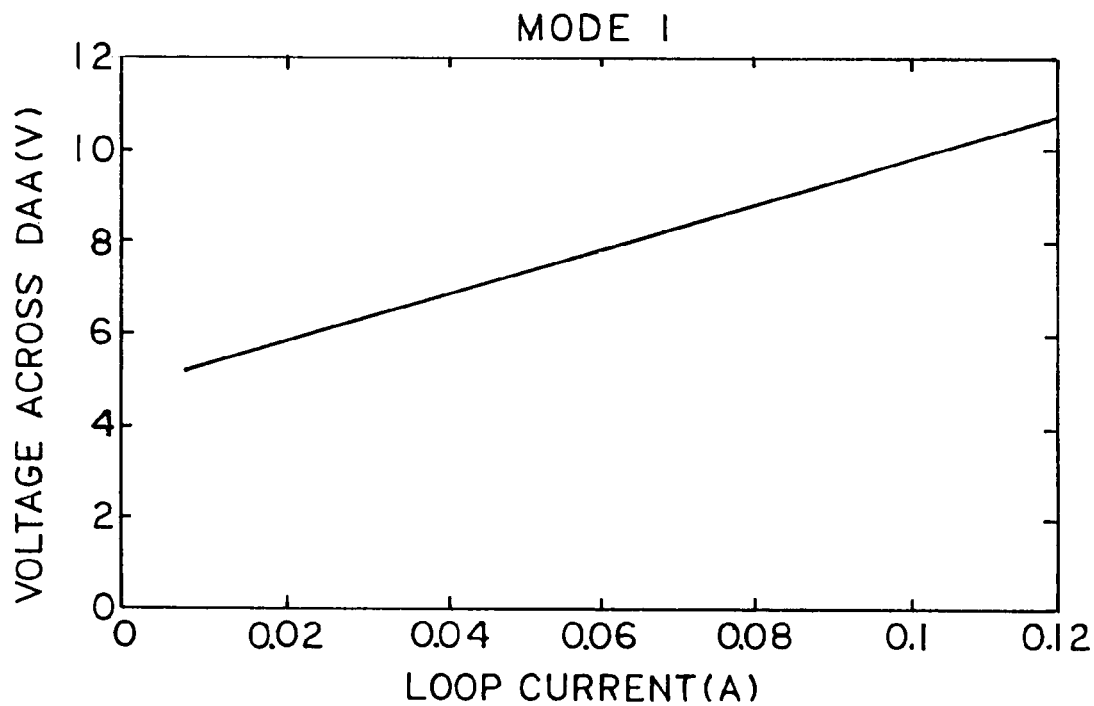
Figure 22C:
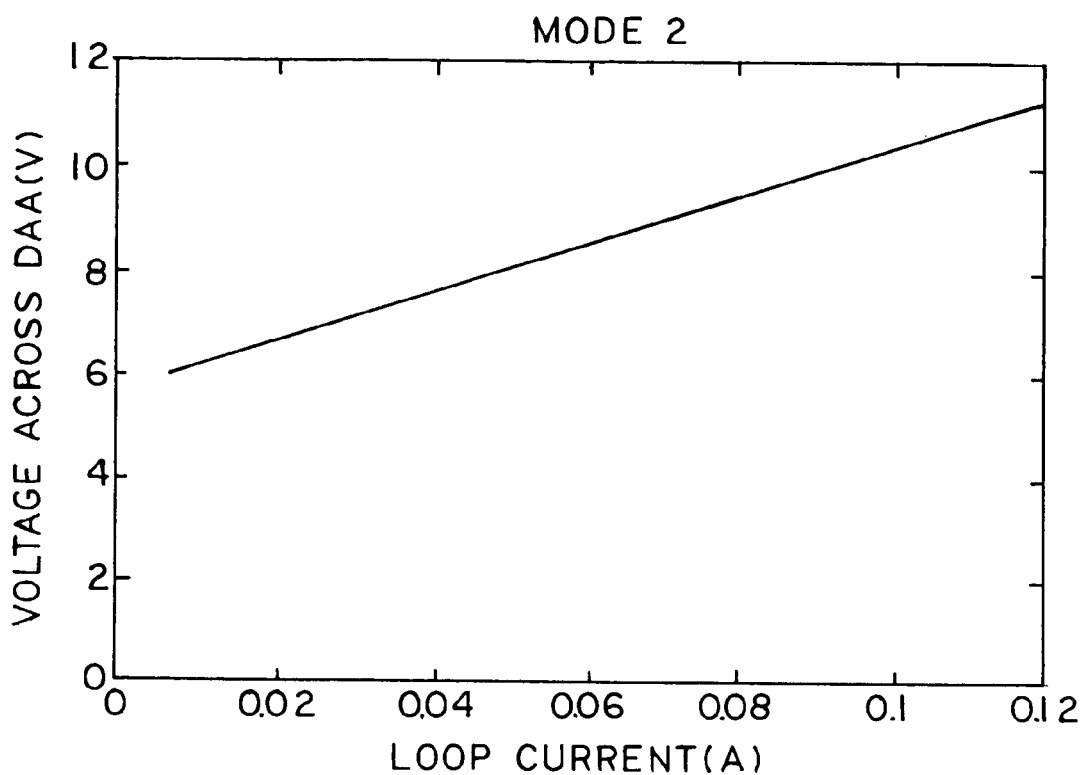
Figure 22D:
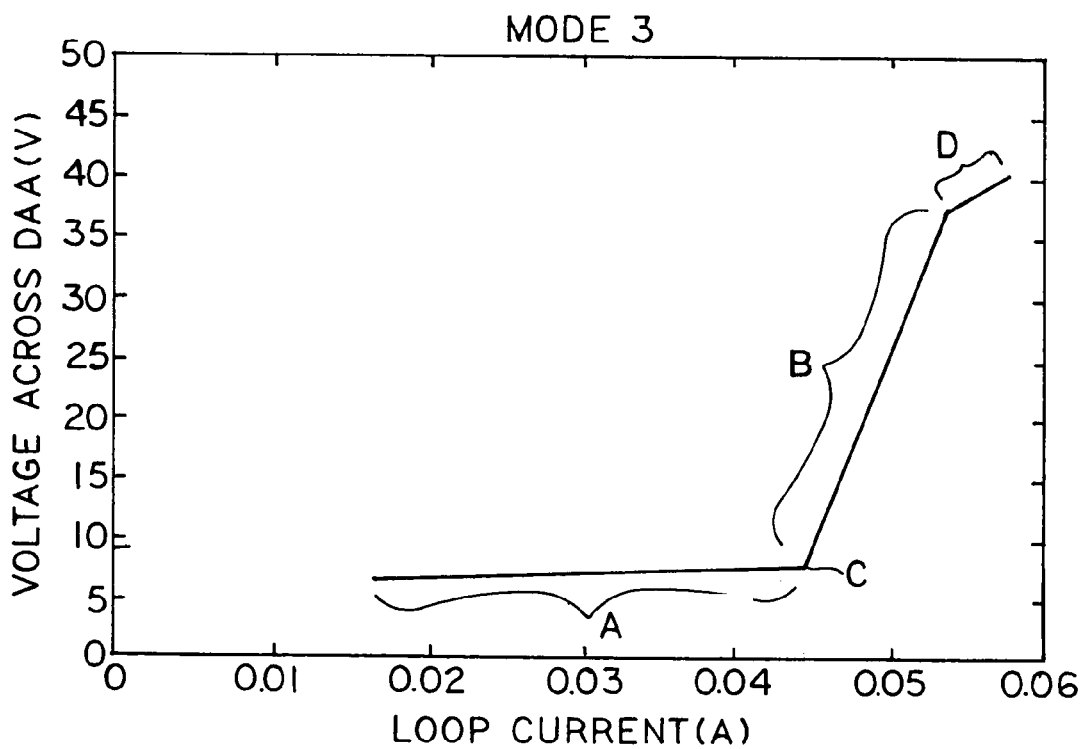
Figure 23:
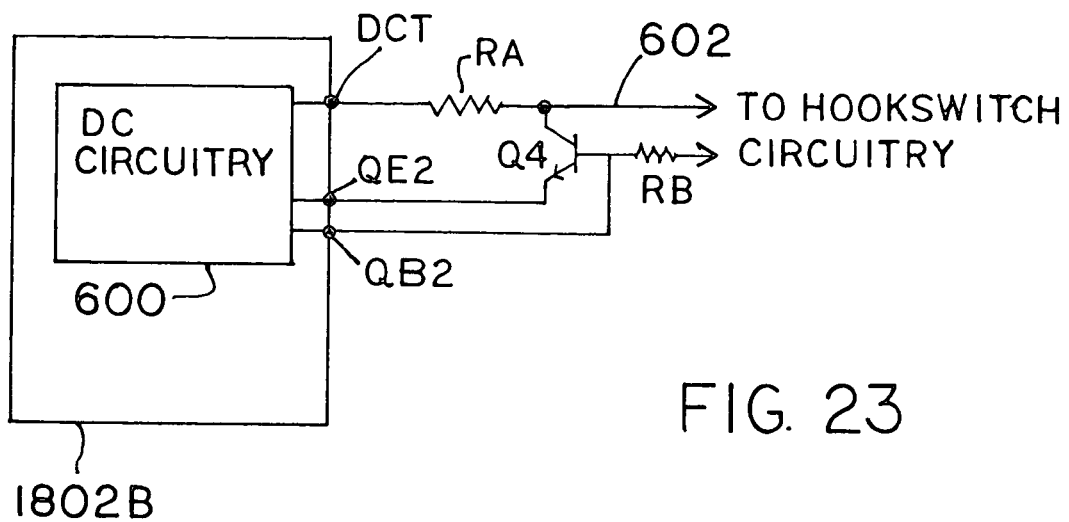
FIG. 23 is a general block diagram of a technique for implementing current limiting according to the present invention.

In order to programmably achieve the DC termination characteristics of FIGS. 22A-22C, the DC termination or DC holding circuit of the present invention provides a variety of improvements over the prior art. For example in order to achieve the current limiting requirements (such as in the TBR21 standard), the phone line side circuitry 118 must dissipate up to approximately two watts of power. Typical non current limiting specifications such as FCC standards will result in only a fraction of that amount of power dissipation to occur. However, it is undesirable to require this increase power dissipation to be performed by the phone line side integrated circuit 1802B. The circuit of FIG. 23 provides a mechanism in which the increased power dissipation requirements of current limiting standards may be achieved by dissipating the additional power external to the integrated circuit. In this manner, a single DAA system may be utilized for both current limiting DC termination standards and non-current limiting standards without requiring excessive power dissipation within an integrated circuit.

As shown in FIG. 23, a phone line side integrated circuit 1802B includes DC termination or DC holding circuitry 600 which is coupled to the DCT, QE2 and QB2 pins. The DCT pin is coupled to a resistor RA, for example a 1600Ω resistor. The QB2 pin is coupled to a resistor RB, for example a 1600Ω resistor. Though shown as single resistors, each resistor RA and RB may be formed from a plurality of resistors such as resistors R1, R11, and R17, and R4, R19, and R20 respectively as shown in FIG. 23. Resistors RA and RB are coupled to the hookswitch circuitry such as shown in FIG. 21. The QE2 and QB2 pins are coupled to the emitter and base of transistor Q4 respectively. In operation, the DC current on from the phone line may be directed through resistors RA and RB in varying amounts through control of transistor Q4 in order to adjust the DC impedance seen by the phone lines. For example, the 50Ω impedance section of the I-V curve of FIG. 22D (segment A) may be obtained when the transistor Q4 is fully on and the bulk of the DC current passes through transistor Q4. The 3200Ω impedance section of the I-V curve of FIG. 22D (segment B) may be obtained while the transistor Q4 is being turned off and thus actively steering current through resistors RA and RB. The 800Ω impedance section of the I-V curve of FIG. 22D (segment D) may be obtained when the transistor Q4 is fully turned off and thus the DC current is split between the resistors RA and RB.

The DC termination mode may be selectably programmed through the powered side circuitry 116 and control information transmitted across the capacitive barrier 120 to the DC holding circuitry 600. More particularly, the DC holding circuitry controls transistor Q4 depending upon the selected mode. Thus when current limiting is desired, additional current may be steered to the resistors RA and RB. In this manner the higher impedance needed for current limiting specifications such as the 3200Ω impedance section of the I-V curve of FIG. 22D may be accurately achieved. Further, the additional power dissipation is performed external to the phone line side integrated circuit 1802B by resistor RA, resistor RB, and transistor Q4. Thus in one exemplary, resistor RA and resistor RB may each dissipate up to approximately three-fourths of a Watt, transistor Q4 up to one-half Watt while the integrated circuit need only dissipate up to three-tenths of a Watt. This technique is particularly advantageous in that much of the power is dissipated in passive elements (resistors) rather than solely in active devices. Thus, more than 50% of the DC power dissipated by the DC holding circuit may be dissipated in devices external to the integrated circuit 1802B, and more particularly, more than 50% of the DC power may be dissipated in passive resistor devices.

Figure 24:
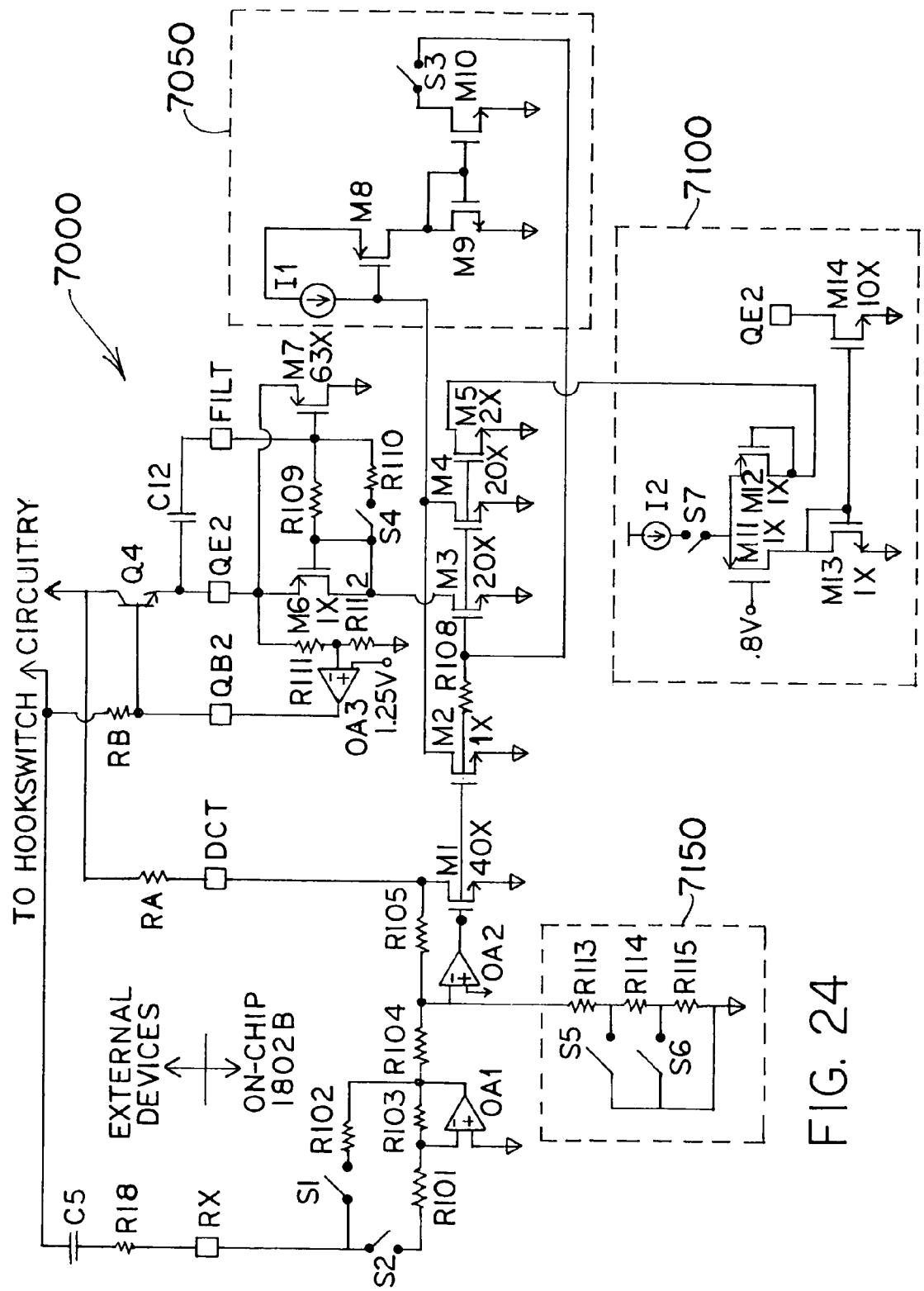
FIG. 24 is a circuit diagram of a DC holding circuit according to the present invention.

A DC holding circuit 7000 for implementing the DC termination characteristics discussed above is shown in FIG. 24. FIG. 24 illustrates portions of the DAA system with like reference numbers and letters as shown in FIG. 21. As can be seen, FIG. 24 includes circuitry both internal and external to the phone side integrated circuit 1802B. More particularly, FIG. 24 includes the RX, DCT, QB2, QE2, and FILT pins and associated internal and external circuits (the hookswitch circuitry is not being shown). As shown in FIG. 24, the DC holding circuit 7000 includes switches S1, S2, S3, S4, S5, S6, and S7. As discussed in detail below, the switches may be utilized to select the current limiting or non-current limiting modes of operation, to switchably operate the DC holding circuit in order to achieve fast settling times and low frequency operation and to select the low voltage modes of operation.

The DC holding circuit 7000 also includes a current limiting circuit block 7050, a distortion adjustment circuit block 7100, and a voltage selection circuit block 7150. As discussed further below, the current limiting circuit block 7050 operates in conjunction with proper selection of switches to implement the higher effective impedance of the DC holding circuit to achieve the desired current limiting effect at a selected current limiting crossover point. The external transistor Q4 is controlled so that in the current limiting mode of operation current may be steered to both resistors RB (which as described above may each be formed from multiple resistors) so that power may be dissipated external to the integrated circuit 1802B. The distortion adjustment circuit block 7100 operates to lower the total harmonic distortion at the crossover point. The voltage selection circuit block 7150 is utilized to select either of the low voltage modes (modes 0 and 1) or the standard voltage mode (mode 2 or 3). The remaining portions of the DC holding circuit 7000 operate in both current limiting and non-current limiting modes as a second order (two pole) system with external capacitors C12 and C5 affecting the frequency of the poles. The components of the DC holding circuit may be configured in a wide variety of manners to obtain the advantages of the invention disclosed herein and the embodiment of FIG. 24 is merely exemplary. Likewise a wide variety of component values may be utilized. In one embodiment, the component values may be selected as shown below in Table 2. The transistors may be sized as labeled "$_{13}$ X" in FIG. 24.

TABLE 2

| Internal Component Values | |
|---|---|
| Symbol | Value |
| R101, R102 | 98 kΩ, |
| R103 | 60 kΩ, |
| R104 | 30 kΩ, |

TABLE 2-continued

Internal Component Values

| Symbol | Value |
| --- | --- |
| R105 | 50 kΩ, |
| R108 | 10 kΩ, |
| R109 | 2 MΩ, |
| R110 | 2 kΩ, |
| R111, R112 | 50 kΩ, |
| R113 | 12.5 kΩ, |
| R114 | 4.16 kΩ, |
| R115 | 2.32 kΩ, |
| I1 | 430 µA |
| I2 | 60 µA |

When the DC holding circuit 7000 of FIG. 24 is operating in the non-current limiting mode (modes 0, 1, or 2), switch S3 is open. During the current limiting mode of operation (mode 3) switch S3 is closed. As will be described in more detail below, switches S1, S2, and S4 operate to selectably control time constants of the DC holding circuit 7000 for use with PTT specifications which may conflict with very low frequency operations. Switches S5 and S6 are utilized to select the low voltage modes of operation (modes 0 and 1). More particularly, in standard voltage level operation (modes 2 and 3) both switches S5 and S6 are closed. In low voltage mode 0, switches S5 and S6 are both opened. In low voltage mode 1, switch S5 is open and switch S6 is closed. In operation, the selection of the state of the switches S5 and S6 will vary the resistance seen at the negative input of op amp OA2, thus changing the DC voltage at the DCT pin, which in turn changes the voltage between the TIP and RING lines for a given amount of DC loop current. In mode 0 the DC voltage at the DCT pin is 2.8V, in mode 1 3.1V and in modes 2 and 3 4.0V.

Current Limiting

As mentioned above, in the current limiting mode of operation (mode 3) switch S3 is closed and in the non-current limiting modes (modes 0-3) switch S3 is opened. The operation of the current limiting mode is discussed below with the time constant control switches set to a operate in S1 open, S2 closed and S4 open (time constant phase 1) for illustrative purposes. However, the current limiting mode may also be operated with the time constant phase 2 (S1 closed, S2 open and S4 closed) selected.

During non-current limiting modes of operation (transistor Q4 is fully turned), the DC impedance of the DC holding circuit 7000 of FIG. 24 is approximately 50Ω when utilizing the illustrative component values of Tables 1 and 2. This impedance value is obtained as explained below. The op amp circuitry of OA1 and OA2 attempt to force the DCT pin to track the AC signal on the TIP and RING lines with the resistor ratios selected in the illustrative embodiment. The op amp circuitry also attempts to prevent the AC current component in the current through transistor M1 (and transistor M3 which is tied to the gate of transistor M1). The resulting DC current through transistor M1, I(M1), will thus be proportional to the DC line voltage since $I(M1)=(V_{line}(DC)-V_{hookswitch}(DC)-V_{diode\ bridge}(DC)-V_{DCT}(DC))/RA$, where $V_{hookswitch}(DC)$ is the DC drop across the hookswitch circuitry, $V_{diode\ bridge}(DC)$ is the DC drop across the diode bridge circuitry and $V_{DCT}$ is the DC voltage at the DCT pin.

Further, the DC current at pin QE2 (and thus transistor Q4), will be a function of the current mirror transistors M6 and M7. More particularly with the 1X:63X sizing of the current mirror transistors shown in FIG. 24, the DC current at pin QE2, I(QE2), will be approximately 64×I(M3). Since I(M3)=I(M1)/2, I(QE2)=32×I(M1). Further since $I(M1)=V_{line}/RA+k$, $I(QE2)=V_{line}/(RA/32)+k$, wherein k is a constant. Thus, with RA chosen to be 1600Ω the desired DC termination impedance of 50Ω will result in the non-current limiting mode of operation.

When the current limiting mode of operation is entered, the switch S3 will be closed. This will allow current to sink through resistor R108 and transistor M10. Thus, the gate voltage on transistors M1 and M3 will not necessarily be the same. More particularly, when switch S3 is closed the current limiting effect will begin to occur as a function of the value of the DC current source I1 since the current limiting circuit block 7050 will attempt to maintain I1≧I(M2)+I(M4). When the loop current is low, and thus the gate voltages on transistors M2 and M4 is at a level such that I1>I(M2)+I(M4), current is not sunk through transistor M10 and the current limiting block 7050 does not have an effect. At this point the circuit will be operating in the region of segment A of the mode 3 operation shown in FIG. 22D.

However, as the DC loop current increases, the current through transistors M2 and M4 will increase. When the total current I(M2)+(M4) reaches the value of I1, the current limiting effect will begin by reducing I(M4) as I(M2) increases by sinking current through resistor R108 and transistor M10. In this manner the relationship I1=I(M2)+I(M4) may be maintained. This has the effect of reducing the current through transistor M3 and thus actively steering current out of the QE2 pin and into resistors RA and RB. At this point the circuit will be operating in the region of segment B of the mode 3 operation shown in FIG. 22D. The location of the crossover point C (the point of change of DC impedance) of FIG. 22D is thus dependent upon the value of I1. In the illustrative embodiment shown, I1 may be 430 µA to achieve a current limiting crossover point at approximately 45 mA of DC loop current.

Distortion Limiting at Current Crossover

Figure 25:
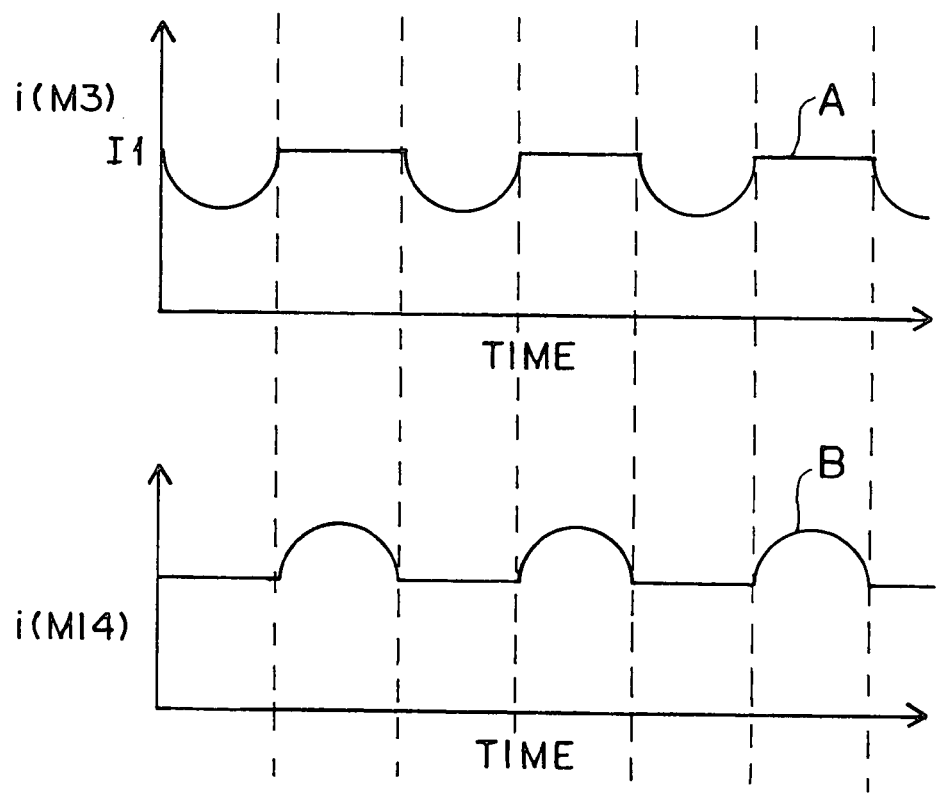
FIG. 25 is graph of current characteristics of a distortion limiting technique according to the present invention.

The current limiting technique discussed above has potential to increase the harmonic distortion at the crossover (or "knee") point of the DC I-V curve of FIG. 22D. More particularly, though ideally the current through transistor M3 has no AC component, in practice non-ideal circuit components, mismatches, etc. will result in some AC component of the current through M3 Thus, the total phone line current $i_{LINE}$, will include the DC loop current of the holding circuit, the AC phone signal, and AC component of the current in M3. Distortion in the AC component of the current in M3 will therefore add harmonic distortion to the phone line signal. The current limiting techniques discussed above will add distortion to the AC component of the M3 current when the DC loop current is located at the crossover point or close to it. More particularly, in such situations the AC component of the transistor M3 current will have result of repeatedly turning on and off the current limiting effect. This will result in the AC component of the current in transistor M3 to also be repeatedly limited or not limited, thus distorting the AC component. For example, when the DC loop current is located at the crossover point and a low frequency sine wave is applied on the phone line, the AC component of the current through transistor M3 may be clipped as shown by curve A of FIG. 25. As shown in FIG. 25, the clipping of curve A will occur when the total current through M3 exceeds the value of the current limit level, I1. This distortion will be most significant for relatively low frequency signals (about less than 100 Hz) due to the low pass filtering effect of capacitor C5 on the output of OA2 which tends to remove higher frequency components (note that C5 provides a high pass filter to node RX which in turn performs a low pass filtering effect on the gate of transistor M1 through the use of OA1 and OA2).

The distortion adjustment circuit block 7100 of FIG. 24 compensates for this clipping effect through control of transistor M14 which is also coupled to the QE2 pin. The distortion adjustment circuit block 7100 operates in the mode 3 current limiting mode through the closure of switch S7. In other modes, switch S7 is opened and the distortion adjustment circuit block 7100 does not affect the DC holding circuitry. The distortion adjustment circuit block 7100 operates such that the current through transistor M14 has a response opposite to that of the current through transistor M3 such as shown by curve B of FIG. 25. Because both transistors M3 and M14 are coupled to the QE2 pin, the total AC component effect of the current through transistors M3 and M14 will sum together. Since curves A and B FIG. 25 demonstrate opposite clipping effects, the summation of these currents will be relatively free of clipping and the associated distortion, at least to a first order. The current response of curve B is obtained through the current steering relationship of transistors M3, M12, M11 and M14. Thus, with the transistor sizing shown in FIG. 24, the relationship $i(M14)=(10 \times I2)-i(M3)$ will result and the resulting AC component seen by the phone line due to the AC component of the current in transistors M3 and M4 will be $10 \times I2$. The value of I2 may be chosen such that I2 is greater than $I(M3)/10$ at the crossover point.

$2^{nd}$ Order DC Holding Circuit

The DC holding circuit 7000 of FIG. 24 is further advantageous in that it is a second order DC holding circuit. More particularly, a first and second pole in the frequency response of the circuit is provided through the use of capacitors C5 and C12 respectively. The first pole results from the filtering action at the RX pin resulting from capacitor C5 and the associated resistors coupled to the RX pin. This filtering action is relatively sufficient at high frequencies (for example 100 Hz or greater) to result in very little AC signals on the common gate line of transistors M1 and M3 (and thus low AC current components through those transistors). However, at low frequencies more AC current components will be present in transistors M1 and M3 which would result in distortion at low frequencies. Improved frequency response may be obtained by adding a second frequency pole to the system. For example, another stage of low pass filtering could be added between the gates of transistor M1 and M3 to more heavily filter the gate signal on transistor M3. Alternatively, as shown in FIG. 24 the additional low pass filtering may be provided through the use capacitor C12 coupled to the QE2 pin. The use of the filter capacitor C12 coupled to the QE2 pin also provides noise filtering of the large PMOS device M7 which is used as a large current sinking device.

Thus, a second order DC holding circuit is provided. The use of a second order frequency response circuit provides a DC holding circuit which may have greater than 60 dB THD at 100 Hz, 20 mA, −1 dBm. The second order DC holding circuit is shown in one implementation to have two filter capacitors (C5 and C12) placed external to the phone side integrated circuit 1802B, however, other circuit techniques may be utilized to achieve a second order DC holding circuit. It is desirable that the frequency poles by low frequency poles, such as at or below 300 Hz, and more particularly below 50 Hz. In the illustrative implementation, the first filter resulting from capacitor C5 provides a first pole at 16 Hz (a low pass filter effect on the gate of transistor M1). The second filter resulting from capacitor C12 provides a second pole at 0.44 Hz.

Switchable Time Constants

It is generally desirable that the DC holding circuit present a impedance at DC and at AC frequencies the DC circuitry is removed from the signal path. One way to achieve such performance would be to provide a DC circuit which operates very slowly such that it is cut off at frequencies above several hertz. This may be particularly important when transmitting very low frequency modem signals (down to approximately 10 hertz) which have low distortion requirements such as greater than 75 dB THD for frequencies greater than 300 Hz (full scale), 60 dB THD for frequencies greater than 100 Hz (full scale), and), and 80 dB THD for frequencies greater than 100 Hz (at −9 dBm) However, the use of very slow DC holding circuitry would conflict with phone line interface standards in many PTT specifications. For example, some interface standards which require rapid on-hook and off-hook switching. For example, the settling time for switching between on-hook and off-hook conditions may be required to be greater than 90% loop current settling in 20 msec from an off hook event. Such time constraints may be particularly important for pulse dialing.

The present invention may include the use of switchable time constants which affect the speed of the DC holding circuitry. Thus, the DC holding circuitry may be operated in a first phase (phase 1) which has a fast settling time and in a second phase (phase 2) which has slow settling time to allow low frequency operation. Thus, the DC holding circuit may be utilized to meet the standards for rapid on/off-hook operation (such as in pulse dialing) and then after the phone line goes off-hook the DC holding circuit may be switched to slower circuit operation to allow low frequency phone line signal operation. In this manner a DC holding circuit having a variable operating frequency is provided.

The phase of operation, high speed phase 1 or low speed phase 2, is controlled by switches S1, S2, and S4. During high speed phase 1, switch S1 is closed, S2 opened and S4 closed. Closing switch S1 and opening switch S2 results in removing the first frequency pole (caused by capacitor C5) from the DC holding circuit. Further, closing switch 4 increasing the second frequency pole to 360 Hz since the time constant of the loop current settling is now set by capacitor C12 and resistor 110 in parallel with resistor R109. The value of the capacitor and resistors may be selected (as shown above) to provide proper settling within a few milliseconds to give fast pulse dialing settling. It is noted that during phase 1, capacitors C5 and C12 will charge to their appropriate values. This charging will help minimize transient glitches when switching from phase 1 to phase 2. When the DC holding circuit is switched to phase 2, the standard second order DC holding circuit operation described above results. Phase 2 may be set to activate at approximately 200 msec after off-hook conditions occur. The switching between phase 1 and phase 2 conditions may be utilized with all of the modes of operation (modes 0-3) described above.

Thus, a DAA DC holding circuit operable in two phases is provided. The first phase may be a fast mode of operation used during the transmission of signaling information such as establishment of off-hook conditions or pulse dialing. The second phase may be a slow mode of operation used for the transmission of phone user data (such as, for example, voice data or modem data). The DC holding circuit may be in the first phase until some time period after off-hook conditions are last detected (for example 200 msec). Thereafter the DC holding circuit may be switched to the second phase. The time constant of the circuit for establishing off-hook conditions (the first phase) may be relatively fast or short, typically less than 10 msec, more preferably less than 5 msec and in the illustrative embodiment less than 1 msec. The time constant of the circuit during user data transmission (the second phase) may be relatively slow or long, typically greater than 100 msec, more preferably greater than 200 msec and in the illustrative embodiment approximately 400 msec.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention. Moreover, the various aspects of the inventions disclosed herein may be used in combination or separately as will also be apparent to those skilled in the art. For example, though the current steering is shown herein with regard to a programmable DAA, the use of external devices to dissipate substantial amounts of power for DC current limited standards may be utilized in a non-programmable DAA.

We claim:

1. A communication system, comprising:
    phone line side circuitry configured for coupling to phone lines;
    powered side circuitry configured for coupling to the phone line side circuitry through an isolation barrier comprised of a plurality of isolation elements; and
    a DC holding circuit within the phone line side circuitry, the DC holding circuit being programmable in response to data transmitted across the isolation barrier to operate the DC holding circuit in a plurality of modes, the DC holding circuit operates in at least a first mode to meet a first phone line interface standard and a second mode to meet a second phone line interface standard, the second phone line interface standard having a DC current limit requirement;
    wherein the powered side circuitry is configured to communicate a first digital differential signal to at least two of the plurality of isolation elements, the at least two isolation elements comprising at least a first isolation capacitor and a second isolation capacitor;
    wherein the phone line side circuitry is configured to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
    wherein the powered side circuitry is further configured to provide a clock signal to the phone line side circuitry through at least one of the plurality of isolation elements; and
    wherein the powered side circuitry and the phone line side circuitry are configured so that power is provided from the powered side circuitry to the phone line side circuitry while still maintaining the isolation required by the phone line isolation regulatory standards.

2. The communication system of claim 1, the DC holding circuit comprising a phone line side integrated circuit and at least one external device, the external device dissipating more power in the second mode than in the first mode.

3. The communication system of claim 2, wherein a substantial portion of the power dissipated by the DC holding circuit in the second mode is dissipated external to the phone line side integrated circuit.

4. The communication system of claim 3, wherein 50% or more of the power dissipated by the DC holding circuit is dissipated external to the phone line side integrated circuit.

5. The communication system of claim 1, further comprising the isolation barrier coupled between the phone line side circuitry and the powered side circuitry.

6. The communication system of claim 1, wherein the powered side circuitry is further configured to provide the clock signal to the phone line side circuitry through an isolation element that is separate from the first isolation capacitor and the second isolation capacitor.

7. The communication system of claim 1, wherein at least one of the first digital differential signal and the second digital differential signal includes both data information and control information.

8. The communication system of claim 1, wherein each of said plurality of isolation elements of said isolation barrier comprises a capacitor.

9. The communication system of claim 1, wherein at least a portion of said plurality of isolation elements of said isolation barrier each comprises a capacitor.

10. A communication system, comprising:
    phone line side circuitry configured for coupling to phone lines;
    powered side circuitry configured for coupling to the phone line side circuitry through an isolation barrier comprised of a plurality of isolation elements; and
    a DC holding circuit within the phone line side circuitry, the DC holding circuit being programmable in response to data transmitted across the isolation barrier to operate the DC holding circuit in a plurality of modes, the DC holding circuit operates in at least a first mode to meet a first phone line interface standard and a second mode to meet a second phone line interface standard, the second phone line interface standard having a DC current limit requirement;
    wherein said powered side circuitry is configured to communicate a first digital differential signal to at least two of the plurality of isolation elements, the at least two isolation elements comprising at least a first isolation capacitor and a second isolation capacitor;
    wherein said phone line side circuitry is configured to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
    wherein the powered side circuitry is further configured to provide a clock signal to the phone line side circuitry through at least one of the plurality of isolation elements that is separate from the first isolation capacitor and the second isolation capacitor;
    wherein the powered side circuitry and the phone line side circuitry are configured so that power is provided from the powered side circuitry to the phone line side circuitry while still maintaining the isolation required by the phone line isolation regulatory standards; and wherein at least one of the first digital differential signal and the second digital differential signal includes both data information and control information.

11. The communication system of claim 10, the DC holding circuit comprising a phone line side integrated circuit and at least one external device, the external device dissipating more power in the second mode than in the first mode.

12. The communication system of claim 11, wherein a substantial portion of the power dissipated by the DC holding circuit in the second mode is dissipated external to the phone line side integrated circuit.

13. The communication system of claim 12, wherein 50% or more of the power dissipated by the DC holding circuit is dissipated external to the phone line side integrated circuit.

14. The communication system of claim 10, further comprising the isolation barrier coupled between the phone line side circuitry and the powered side circuitry.

15. The communication system of claim 10, wherein each of said plurality of isolation elements of said isolation barrier comprises a capacitor.

16. The communication system of claim 10, wherein at least a portion of said plurality of isolation elements of said isolation barrier each comprises a capacitor.

17. A method of providing a communication system configured for coupling to a phone line, comprising:
    coupling an isolation barrier between powered side circuitry and phone line side circuitry, the isolation baffler comprising a plurality of isolation elements;
    configuring the powered side circuitry to communicate a first digital differential signal to at least two of the isolation baffler elements, the at least two isolation baffler elements comprising at least a first isolation capacitor and a second isolation capacitor;
    configuring the phone line side circuitry to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
    configuring the powered side circuitry to provide a clock signal to the phone line side circuitry through at least one of the plurality of isolation elements;
    configuring the powered side circuitry and the phone line side circuitry so that power is provided from the phone line side circuitry to the phone line side circuitry while still maintaining the isolation required by the phone line isolation regulatory standards;
    forming a DC holding circuit within the phone line side circuitry, the DC holding circuit comprising a phone line side integrated circuit and external circuitry external to the integrated circuit;
    providing a programmable circuit for switching the DC holding circuit between at least a first and second mode of operation, the first mode of operation for at least a first phone line interface standard and the second mode of operation for at least a second phone line interface standard, the second standard having a DC termination current limit; and
    coupling the internal circuitry and external circuitry so that if the DC holding circuit is operated in the second mode of operation more power may be dissipated in the external circuitry during the second mode of operation than during the first mode of operation.

18. The method of claim 17, further comprising dissipating more power during the second mode of operation in the external circuitry than in the internal circuitry.

19. The method of claim 17, wherein the clock signal is provided from the powered side circuitry to the phone line side circuitry through an isolation element that is separate from the first isolation capacitor and the second isolation capacitor.

20. The method of claim 17, wherein at least one of the first digital differential signal and the second digital differential signal includes both data information and control information.

21. The method of claim 17, wherein each of said plurality of isolation elements of said isolation barrier comprises a capacitor.

22. The method of claim 17, wherein at least a portion of said plurality of isolation elements of said isolation barrier each comprises a capacitor.

23. A method of providing a communication system configured for coupling to a phone line, comprising:
    coupling an isolation barrier between powered side circuitry and phone line side circuitry, the isolation barrier comprising a plurality of isolation elements;
    configuring the powered side circuitry to communicate a first digital differential signal to at least two of the isolation barrier elements, the at least two isolation barrier elements comprising at least a first isolation capacitor and a second isolation capacitor;
    configuring the phone line side circuitry to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals, wherein at least one of the first digital differential signal and the second digital differential signal includes both data and control information;
    configuring the powered side circuitry to provide a clock signal to the phone line side circuitry through at least one of the plurality of isolation elements, wherein the clock signal is provided from the powered side circuitry to the phone line side circuitry through an isolation element that is separate from the first isolation capacitor and the second isolation capacitor;
    configuring the powered side circuitry and the phone line side circuitry so that power is provided from the phone line side circuitry to the phone line side circuitry while still maintaining the isolation required by the phone line isolation regulatory standards;
    forming a DC holding circuit within the phone line side circuitry, the DC holding circuit comprising a phone line side integrated circuit and external circuitry external to the integrated circuit;
    providing a programmable circuit for switching the DC holding circuit between at least a first and second mode of operation, the first mode of operation for at least a first phone line interface standard and the second mode of operation for at least a second phone line interface standard, the second standard having a DC termination current limit; and
    coupling the internal circuitry and external circuitry so that if the DC holding circuit is operated in the second mode of operation more power may be dissipated in the external circuitry during the second mode of operation than during the first mode of operation.

24. The method of claim 23, further comprising dissipating more power during the second mode of operation in the external circuitry than in the internal circuitry.

25. The method of claim 23, wherein each of said plurality of isolation elements of said isolation baffler comprises a capacitor.

26. The method of claim 23, wherein at least a portion of said plurality of isolation elements of said isolation barrier each comprises a capacitor.

27. A communication system, comprising:
phone line side circuitry configured for coupling to phone lines;
powered side circuitry configured for coupling to the phone line side circuitry through an isolation barrier comprised of a plurality of isolation elements;
a DC holding circuit within the phone line side circuitry for reducing power dissipation requirements of an integrated circuit within the communication system, the DC holding circuit comprising:
at least one switchable circuit, the switchable circuit having a first state for a non-current limiting mode of operation and a second state for a current limiting mode of operation,
external circuitry external to the integrated circuit, and
internal circuitry within the integrated circuit, the external circuitry and the internal circuitry being coupled together wherein the external circuitry dissipates more power in the current limiting mode than in the non-current limiting mode;
wherein the powered side circuitry is configured to communicate a first digital differential signal to at least two of the plurality of isolation elements, the at least two isolation elements comprising at least a first isolation capacitor and a second isolation capacitor;
wherein the phone line side circuitry is configured to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
wherein the powered side circuitry is further configured to provide a clock signal to the phone line side circuitry through at least one of the plurality of isolation elements; and
wherein the powered side circuitry and the phone line side circuitry are configured so that power is provided from the powered side circuitry to the phone line side circuitry while still maintaining the isolation required by the phone line isolation regulatory standards.

28. The communication system of claim 27, the external circuitry comprising at least one power dissipation resistor.

29. The communication system of claim 27, wherein when the switchable circuit is in the second state, the external circuitry dissipates more power than the internal circuitry.

30. The communication system of claim 29, wherein when the switchable circuit is in the second state, one or more resistors in the external dissipate more power than the internal circuitry.

31. The communication system of claim 27, wherein the powered side circuitry is further configured to provide the clock signal to the phone line side circuitry through an isolation element that is separate from the first isolation capacitor and the second isolation capacitor.

32. The communication system of claim 27, wherein at least one of the first digital differential signal and the second digital differential signal includes both data information and control information.

33. The communication system of claim 27, wherein each of said plurality of isolation elements of said isolation barrier comprises a capacitor.

34. The communication system of claim 27, wherein at least a portion of said plurality of isolation elements of said isolation barrier each comprises a capacitor.

35. A communication system comprising:
phone line side circuitry configured for coupling to phone lines;
powered side circuitry configured for coupling to the phone line side circuitry through an isolation barrier comprised of a plurality of isolation elements;
a DC holding circuit within the phone line side circuitry for reducing power dissipation requirements of an integrated circuit within the communication system, the DC holding circuit comprising:
at least one switchable circuit, the switchable circuit having a first state for a non-current limiting mode of operation and a second state for a current limiting mode of operation,
external circuitry external to the integrated circuit, and
internal circuitry within the integrated circuit, the external circuitry and the internal circuitry being coupled together wherein the external circuitry dissipates more power in the current limiting mode than in the non-current limiting mode;
wherein the powered side circuitry is configured to communicate a first digital differential signal to at least two of the plurality of isolation elements, the at least two isolation elements comprising at least a first isolation capacitor and a second isolation capacitor;
wherein the phone line side circuitry is configured to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
wherein the powered side circuitry is further configured to provide a clock signal to the phone line side circuitry through at least one of the plurality of isolation elements that is separate from the first isolation capacitor and the second isolation capacitor;
wherein the powered side circuitry and the phone line side circuitry are configured so that power is provided from the powered side circuitry to the phone line side circuitry while still maintaining the isolation required by the phone line isolation regulatory standards; and
wherein at least one of the first digital differential signal and the second digital differential signal includes both data information and control information.

36. The communication system of claim 35, the external circuitry comprising at least one power dissipation resistor.

37. The communication system of claim 35, wherein when the switchable circuit is in the second state, the external circuitry dissipates more power than the internal circuitry.

38. The communication system of claim 37, wherein when the switchable circuit is in the second state, one or more resistors in the external circuitry dissipate more power than the internal circuitry.

39. The communication system of claim 35, wherein each of said plurality of isolation elements of said isolation barrier comprises a capacitor.

40. The communication system of claim 35, wherein at least a portion of said plurality of isolation elements of said isolation barrier each comprises a capacitor.

41. A communication system comprising:
phone line side circuitry configured for coupling to phone lines;
powered side circuitry configured for coupling to the phone line side circuitry through an isolation barrier comprised of a plurality of isolation elements;
a DC holding circuit compatible with a phone line standard having current limit requirements for reducing power dissipation requirements of an integrated circuit within the communication system, the DC holding circuit comprising:
external circuitry external to the integrated circuit, and internal circuitry within the integrated circuit, the external circuitry and the internal circuitry being coupled together wherein the external circuitry dissipates more power than the internal circuitry in at least one mode of operation;
wherein the powered side circuitry is configured to communicate a first digital differential signal to at least two of the plurality of isolation elements, the at least two isolation elements comprising at least a first isolation capacitor and a second isolation capacitor;
wherein the phone line side circuitry is configured to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
wherein the powered side circuitry of the communication system is further configured to provide a clock signal to the phone line side circuitry through at least one of the plurality of isolation elements; and
wherein the powered side circuitry and the phone line side circuitry are configured so that power is provided from the powered side circuitry of the communication system to the phone line side circuitry while still maintaining the isolation required by the phone line isolation regulatory standards.

42. The communication system of claim 41, the external circuitry comprising at least one power dissipation resistor.

43. The communication system of claim 41, wherein one or more resistors in the external circuitry dissipate more power than the internal circuitry in at least one mode of operation.

44. The communication system of claim 41, wherein the powered side circuitry is further configured to provide the clock signal to the phone line side circuitry through an isolation element that is separate from the first isolation capacitor and the second isolation capacitor.

45. The communication system of claim 41, wherein at least one of the first digital differential signal and the second digital differential signal includes both data information and control information.

46. The communication system of claim 41, wherein each of said plurality of isolation elements of said isolation baffler comprises a capacitor.

47. The communication system of claim 41, wherein at least a portion of said plurality of isolation elements of said isolation baffler each comprises a capacitor.

48. A communication system comprising:
phone line side circuitry configured for coupling to phone lines;
powered side circuitry configured for coupling to the phone line side circuitry through an isolation baffler comprised of a plurality of isolation elements;
a DC holding circuit compatible with a phone line standard having current limit requirements for reducing power dissipation requirements of an integrated circuit within the communication system, the DC holding circuit comprising:
external circuitry external to the integrated circuit, and internal circuitry within the integrated circuit, the external circuitry and the internal circuitry being coupled together wherein the external circuitry dissipates more power than the internal circuitry in at least one mode of operation;
wherein the powered side circuitry is configured to communicate a first digital differential signal to at least two of the plurality of isolation elements, the at least two isolation elements comprising at least a first isolation capacitor and a second isolation capacitor;
wherein the phone line side circuitry is configured to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
wherein the powered side circuitry is further configured to provide a clock signal to the phone line side circuitry through at least one of the plurality of isolation elements that is separate from the first isolation capacitor and the second isolation capacitor;
wherein the powered side circuitry and the phone line side circuitry are configured so that power is provided from the powered side circuitry to the phone line side circuitry while still maintaining the isolation required by the phone line isolation regulatory standards and
wherein at least one of the first digital differential signal and the second digital differential signal includes both data information and control information.

49. The communication system of claim 48, the external circuitry comprising at least one power dissipation resistor.

50. The communication system of claim 48, wherein one or more resistors in the external circuitry dissipate more power than the internal circuitry in at least one mode of operation.

51. The communication system of claim 48, wherein each of said plurality of isolation elements of said isolation barrier comprises a capacitor.

52. The communication system of claim 48, wherein at least a portion of said plurality of isolation elements of said isolation barrier each comprises a capacitor.

53. A method of providing a communication system configured for coupling to a phone line, comprising:
coupling an isolation barrier between powered side circuitry and phone line side circuitry, the isolation barrier comprising a plurality of isolation elements;
configuring the powered side circuitry to communicate a first digital differential signal to at least two of the isolation barrier elements, the at least two isolation barrier elements comprising at least a first isolation capacitor and a second isolation capacitor;
configuring the phone line side circuitry to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;

configuring the powered side circuitry to provide a clock signal to the phone line side circuitry through at least one of the plurality of isolation elements;

configuring the powered side circuitry and the phone line side circuitry so that power is provided from the phone line side circuitry to the phone line side circuitry while still maintaining the isolation required by the phone line isolation regulatory standards;

forming a DC holding circuit within the phone line side circuitry, the DC holding circuit being formed with internal circuitry internal to an integrated circuit and external circuitry external to the integrated circuit, the DC holding circuit compatible with at least one phone line interface standard having a DC current limit requirement; and coupling the internal circuitry and external circuitry so that more power is dissipated in the external circuitry than in the internal circuitry.

54. The method of claim 53, wherein the clock signal is provided from the powered side circuitry to the phone line side circuitry through an isolation element that is separate from the first isolation capacitor and the second isolation capacitor.

55. The method of claim 53, wherein at least one of the first digital differential signal and the second digital differential signal includes both data information and control information.

56. The method of claim 53, wherein each of said plurality of isolation elements of said isolation barrier comprises a capacitor.

57. The method of claim 53, wherein at least a portion of said plurality of isolation elements of said isolation barrier each comprises a capacitor.

58. A method of providing a communication system configured for coupling to a phone line, comprising:
    coupling an isolation barrier between powered side circuitry and phone line side circuitry, the isolation barrier comprising a plurality of isolation elements;
    configuring the powered side circuitry to communicate a first digital differential signal to at least two of the isolation barrier elements, the at least two isolation barrier elements comprising at least a first isolation capacitor and a second isolation capacitor;
    configuring the phone line side circuitry to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals, wherein at least one of the first digital differential signal and the second digital differential signal includes both data and control information;
    configuring the powered side circuitry to provide a clock signal to the phone line side circuitry through at least one of the plurality of isolation elements, wherein the clock signal is provided from the powered side circuitry to the phone line side circuitry through an isolation element that is separate from the first isolation capacitor and the second isolation capacitor;
    configuring the powered side circuitry and the phone line side circuitry so that power is provided from the phone line side circuitry to the phone line side circuitry while still maintaining the isolation required by the phone line isolation regulatory standards;
    forming a DC holding circuit within the phone line side circuitry, the DC holding circuit being formed with internal circuitry internal to an integrated circuit and external circuitry external to the integrated circuit, the DC holding circuit compatible with at least one phone line interface standard having a DC current limit requirement; and
    coupling the internal circuitry and external circuitry so that more power is dissipated in the external circuitry than in the internal circuitry.

59. The method of claim 58, wherein each of said plurality of isolation elements of said isolation barrier comprises a capacitor.

60. The method of claim 58, wherein at least a portion of said plurality of isolation elements of said isolation barrier each comprises a capacitor.

61. A method of operating a communication system configured for coupling to a phone line, comprising:
    providing phone line side circuitry configured for coupling to phone lines;
    providing powered side circuitry configured for coupling to the phone line side circuitry through an isolation barrier comprised of a plurality of isolation elements;
    providing integrated circuitry and nonintegrated circuitry to comprise a DC holding circuit within the phone line side circuitry;
    coupling the integrated circuitry and the non-integrated circuitry; and
    dissipating more power in the external circuitry than in the internal circuitry if the DC holding circuit is utilized for a phone line interface standard having a DC current limit requirement;
    wherein the powered side circuitry is configured to communicate a first digital differential signal to at least two of the plurality of isolation elements, the at least two isolation elements comprising at least a first isolation capacitor and a second isolation capacitor;
    wherein the phone line side circuitry is configured to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
    wherein the powered side circuitry is further configured to provide a clock signal to the phone line side circuitry through at least one of the plurality of isolation elements; and
    wherein the powered side circuitry and the phone line side circuitry are configured so that power is provided from the powered side circuitry to the phone line side circuitry while still maintaining the isolation required by the phone line isolation regulatory standards.

62. The method of claim 61, wherein the powered side circuitry is further configured to provide the clock signal to the phone line side circuitry through an isolation element that is separate from the first isolation capacitor and the second isolation capacitor.

63. The method of claim 61, wherein at least one of the first digital differential signal and the second digital differential signal includes both data information and control information.

64. The method of claim 61, wherein each of said plurality of isolation elements of said isolation baffler comprises a capacitor.

65. The method of claim 61, wherein at least a portion of said plurality of isolation elements of said isolation barrier each comprises a capacitor.

66. A method of operating a communication system configured for coupling to a phone line, comprising:
   providing phone line side circuitry configured for coupling to phone lines;
   providing powered side circuitry configured for coupling to the phone line side circuitry through an isolation barrier comprised of a plurality of isolation elements;
   providing integrated circuitry and nonintegrated circuitry to comprise a DC holding circuit within the phone line side circuitry;
   coupling the integrated circuitry and the non-integrated circuitry; and
   dissipating more power in the external circuitry than in the internal circuitry if the DC holding circuit is utilized for a phone line interface standard having a DC current limit requirement;
   wherein the powered side circuitry is configured to communicate a first digital differential signal to at least two of the plurality of isolation elements, the at least two isolation elements comprising at least a first isolation capacitor and a second isolation capacitor;
   wherein the phone line side circuitry is configured to communicate a second digital differential signal to the first isolation capacitor and the second isolation capacitor so that the first and second digital differential signals are communicated across the same first and second isolation capacitors and so that the first and second isolation capacitors bidirectionally transfer the first and second digital differential signals;
   wherein the powered side circuitry is further configured to provide a clock signal to the phone line side circuitry through at least one of the plurality of isolation elements that is separate from the first isolation capacitor and the second isolation capacitor;
   wherein the powered side circuitry and the phone line side circuitry are configured so that power is provided from the powered side circuitry to the phone line side circuitry while still maintaining the isolation required by the phone line isolation regulatory standards; and
   wherein at least one of the first digital differential signal and the second digital differential signal includes both data information and control information.

67. The method of claim 66, wherein each of said plurality of isolation elements of said isolation barrier comprises a capacitor.

68. The method of claim 66, wherein at least a portion of said plurality of isolation elements of said isolation baffler each comprises a capacitor.

* * * * *

UNITED STATES PATENT AND TRADEMARK OFFICE
CERTIFICATE OF CORRECTION

| | |
|---|---|
| PATENT NO. | : 7,515,672 B2 |
| APPLICATION NO. | : 10/679013 |
| DATED | : April 7, 2009 |
| INVENTOR(S) | : Timothy Dupuis et al. |

Page 1 of 1

It is certified that error appears in the above-identified patent and that said Letters Patent is hereby corrected as shown below:

In claim 17, column 35, line 27, delete "baffler," and insert --barrier--.

In claim 17, column 35, line 31, delete "baffler elements," and insert --barrier elements--.

In claim 17, column 35, line 31, delete "isolation baffler," and insert --isolation barrier--.

In claim 25, column 37, line 5, delete "baffler," and insert --barrier--.

In claim 46, column 39, line 62, delete "baffler," and insert --barrier--.

In claim 47, column 39, line 66, delete "baffler," and insert --barrier--.

In claim 48, column 40, line 5, delete "baffler," and insert --barrier--.

In claim 64, column 43, line 2, delete "baffler," and insert --barrier--.

In claim 68, column 44, line 26, delete "baffler," and insert --barrier--.

Signed and Sealed this

Twelfth Day of May, 2009

JOHN DOLL
*Acting Director of the United States Patent and Trademark Office*